United States Patent
Wu et al.

(10) Patent No.: US 12,374,937 B2
(45) Date of Patent: Jul. 29, 2025

(54) WIRELESS CHARGING APPARATUS, POSITION DETECTION METHOD, AND SYSTEM

(71) Applicant: Huawei Digital Power Technologies Co., Ltd., Shenzhen (CN)

(72) Inventors: Baoshan Wu, Shenzhen (CN); Donghao Wu, Shenzhen (CN); Wei Zhou, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 217 days.

(21) Appl. No.: 17/471,867

(22) Filed: Sep. 10, 2021

(65) Prior Publication Data

US 2021/0408846 A1 Dec. 30, 2021

Related U.S. Application Data

(63) Continuation of application No. PCT/CN2020/081503, filed on Mar. 26, 2020.

(30) Foreign Application Priority Data

Aug. 7, 2019 (WO) ............... PCT/US2019/045471
Dec. 31, 2019 (CN) .......................... 201911424812.8

(51) Int. Cl.
*H02J 50/90* (2016.01)
*H02J 50/12* (2016.01)
(Continued)

(52) U.S. Cl.
CPC .............. *H02J 50/90* (2016.02); *H02J 50/12* (2016.02); *H02J 50/60* (2016.02); *H02J 50/80* (2016.02)

(58) Field of Classification Search
CPC ...................................................... H02J 50/90
See application file for complete search history.

(56) References Cited

U.S. PATENT DOCUMENTS

| | | | |
|---|---|---|---|
| 9,570,231 B2 | 2/2017 | Miyamoto et al. | |
| 9,929,605 B2 * | 3/2018 | Nakano ................. | H04B 5/005 |

(Continued)

FOREIGN PATENT DOCUMENTS

| | | | |
|---|---|---|---|
| CN | 101425703 A | 5/2009 | |
| CN | 102157990 A | 8/2011 | |

(Continued)

OTHER PUBLICATIONS

Qianhong Chen et al.,"Analysis, Design, and Control of a Transcutaneous Power Regulator for Artificial Hearts", IEEE Transactions on Biomedical Circuits and Systems, vol. 3, No. 1, Feb. 2009, total 9 pages.

*Primary Examiner* — Daniel Kessie
(74) *Attorney, Agent, or Firm* — Womble Bond Dickinson (US) LLP

(57) ABSTRACT

A wireless charging apparatus is provided, which includes a transmit end or a receive end. The transmit end includes a transmit end resonant network and an inverter circuit, and the transmit end resonant network includes a transmitting coil. The receive end includes a receive end resonant network and a rectifier circuit, and the receive end resonant network includes a receiving coil. The apparatus further includes a controller which is configured to obtain a relative position between the transmit end and the receive end based on a self-inductance of the transmitting coil and at least one parameter. The at least one parameter includes a current of the transmitting coil, efficiency of a wireless charging system formed by the transmit end and the receive end, and a direct current output voltage at the receive end. There is a (Continued)

single change relationship between the at least one parameter and the relative position.

12 Claims, 15 Drawing Sheets

(51) Int. Cl.
*H02J 50/60* (2016.01)
*H02J 50/80* (2016.01)

(56) References Cited

U.S. PATENT DOCUMENTS

| | | | |
|---|---|---|---|
| 10,072,947 | B1 | 9/2018 | Mantler |
| 10,079,508 | B2 | 9/2018 | Mehas et al. |
| 2010/0219696 | A1 | 9/2010 | Kojima |
| 2012/0001493 | A1 | 1/2012 | Kudo et al. |
| 2012/0262002 | A1* | 10/2012 | Widmer ............ H02J 7/0013 307/104 |
| 2013/0094598 | A1 | 4/2013 | Bastami |
| 2014/0300196 | A1 | 10/2014 | Bunsen |
| 2015/0001955 | A1* | 1/2015 | Yamada ............ H02J 50/005 307/104 |
| 2015/0073642 | A1* | 3/2015 | Widmer ............ G01C 21/3635 701/22 |
| 2016/0079951 | A1 | 3/2016 | Oosumi et al. |
| 2017/0229926 | A1 | 8/2017 | Oettinger et al. |
| 2018/0287434 | A1 | 10/2018 | Ii et al. |
| 2019/0248251 | A1 | 8/2019 | Park |
| 2020/0083754 | A1* | 3/2020 | Tian ............ H02J 50/60 |

FOREIGN PATENT DOCUMENTS

| | | |
|---|---|---|
| CN | 102315698 A | 1/2012 |
| CN | 104079081 A | 10/2014 |
| CN | 104167823 A | 11/2014 |
| CN | 105305657 A | 2/2016 |
| CN | 105334539 A | 2/2016 |
| CN | 105515218 A | 4/2016 |
| CN | 106340974 A | 1/2017 |
| CN | 106740220 A | 5/2017 |
| CN | 206406776 U | 8/2017 |
| CN | 108363108 A | 8/2018 |
| CN | 108604834 A | 9/2018 |
| CN | 108736581 A | 11/2018 |
| CN | 108736588 A | 11/2018 |
| CN | 108802835 A | 11/2018 |
| CN | 109412280 A | 3/2019 |
| CN | 208874367 U | 5/2019 |
| CN | 109895643 A | 6/2019 |
| CN | 111030318 A | 4/2020 |
| DE | 112019001196 T5 | 12/2020 |
| EP | 3393009 A1 | 10/2018 |
| EP | 3553915 A1 | 10/2019 |
| JP | 2015223009 A | 12/2015 |
| KR | 20140139348 A | 12/2014 |
| KR | 20180117512 A | 10/2018 |
| WO | 2014041863 A1 | 3/2014 |
| WO | 2017165549 A1 | 9/2017 |
| WO | 2018074804 A1 | 4/2018 |
| WO | 2018105915 A1 | 6/2018 |
| WO | 2018159732 A1 | 9/2018 |
| WO | 2019088760 A1 | 5/2019 |
| WO | 2019171786 A1 | 9/2019 |

* cited by examiner

WIRELESS CHARGING APPARATUS, POSITION DETECTION METHOD, AND SYSTEM

CROSS-REFERENCE TO RELATED APPLICATIONS

This application is a continuation of International Application No. PCT/CN2020/081503, filed on Mar. 26, 2020, which claims priority to Chinese Patent Application No. 201911424812.8, filed on Dec. 31, 2019 and claims priority to International Patent Application No. PCT/US2019/045471, filed on Aug. 7, 2019. All of the aforementioned patent applications are hereby incorporated by reference in their entireties.

TECHNICAL FIELD

This application relates to the field of wireless charging technologies, and in particular, to a wireless charging apparatus, a position detection method, and a system.

BACKGROUND

With continuous development of technologies, many terminal devices currently use a wireless charging mode. For example, a mobile phone may use the wireless charging mode to charge a battery in the mobile phone.

A principle of a wireless charging technology is to transmit electric energy through magnetic field coupling between a transmitting coil at a transmit end and a receiving coil at a receive end. For example, for wireless charging of the mobile phone, the transmit end is a wireless charger, and the receive end is the mobile phone. The transmitting coil is located at the transmit end, and the receiving coil is located inside the mobile phone. However, when a metal foreign object exists between the transmit end and the receive end, a changing magnetic field generated between the transmit end and the receive end may generate eddy current losses and heat in the metal foreign object, and further cause safety problems such as overheating or even fire. Therefore, foreign object detection (FOD) is a technical problem that needs to be resolved in the wireless charging technology.

However, a current foreign object detection technology does not consider impact of a relative position between the transmit end and the receive end, and currently, no method for accurately obtaining the relative position between the transmit end and the receive end is provided.

SUMMARY

This application provides a wireless charging apparatus, a position detection method, and a system, to accurately detect a relative position between a transmit end and a receive end of a wireless charging system.

According to a first aspect, an embodiment of this application provides a wireless charging apparatus. The apparatus includes a transmit end or a receive end. The transmit end includes a transmit end resonant network and an inverter circuit, and the transmit end resonant network includes a transmitting coil. The receive end includes a receive end resonant network and a rectifier circuit, and the receive end resonant network includes a receiving coil. The apparatus further includes a controller, and the controller is configured to obtain a relative position between the transmit end and the receive end based on a self-inductance of the transmitting coil and at least one parameter. The at least one parameter includes a current of the transmitting coil, efficiency of a wireless charging system formed by the transmit end and the receive end, and a direct current (DC) output voltage at the receive end.

Each of the following parameters included in the wireless charging apparatus varies homogeneously with a change in the relative position between the transmit end and the receive end. The following parameters include the self-inductance of the transmitting coil, the current of the transmitting coil before charging, the efficiency of the wireless charging system, and the direct current output voltage at the receive end. Before performing wireless power transmission, the wireless charging apparatus may directly or indirectly obtain the self-inductance of the transmitting coil, the current of the transmitting coil, the efficiency of the wireless charging system, and the direct current output voltage at the receive end. Then, the relative position between the transmit end and the receive end can be accurately obtained based on a pre-obtained relationship between a change in the foregoing parameter and the relative position.

In an embodiment, the relative position includes a horizontal relative position and a vertical relative position; and the controller is configured to obtain the vertical relative position based on the self-inductance of the transmitting coil, and obtain the horizontal relative position based on the at least one parameter.

The self-inductance of the transmitting coil is more affected by a change in the vertical relative position between the transmit end and the receive end, and is less affected by a change in the horizontal relative position. Therefore, the controller may pre-obtain a correspondence between the self-inductance of the transmitting coil and the vertical relative position. With reference to the correspondence pre-obtained by the controller, the vertical relative position is obtained by using the self-inductance of the transmitting coil. At a same vertical relative position, there are a single change relationship between the current of the transmitting coil before charging and the horizontal relative position, a single change relationship between the efficiency of the wireless charging system and the horizontal relative position, and a single change relationship between the direct current output voltage at the receive end and the horizontal relative position. Therefore, the controller may pre-obtain a correspondence between the current of the transmitting coil before charging, the efficiency of the wireless charging system, or the direct current output voltage at the receive end and the horizontal relative position. With reference to the correspondence pre-obtained by the controller, the horizontal relative position is obtained by using the obtained current of the transmitting coil before charging, the obtained efficiency of the wireless charging system, or the obtained direct current output voltage at the receive end.

In an embodiment, the controller is configured to directly obtain the relative position between the transmit end and the receive end through three-dimensional positioning based on the self-inductance of the transmitting coil and the at least one parameter.

Both the self-inductance of the transmitting coil and the current of the transmitting coil before charging are affected by the relative position between the transmit end and the receive end. Therefore, the controller may pre-obtain a three-dimensional (3D) correspondence between the self-inductance of the transmitting coil, the current of the transmitting coil before charging, and the relative position. With reference to the three-dimensional correspondence, after obtaining the self-inductance of the transmitting coil and the current of the transmitting coil, the controller may determine the relative position corresponding to the self-inductance of the transmitting coil and the current of the transmitting coil. Based on a similar principle, the controller may alternatively determine the relative position by using the self-inductance of the transmitting coil and the efficiency of the wireless charging system before charging. The controller may alternatively determine the relative position by using the self-inductance of the transmitting coil and the direct current output voltage at the receive end before charging. This further improves relative position detection efficiency.

In an embodiment, the controller is configured to: obtain an alternating current (AC) impedance of the transmitting coil based on the horizontal relative position and the vertical relative position; obtain a power loss at the transmit end based on the alternating current impedance of the transmitting coil and a current of the transmitting coil in a charging process; obtain a transmit power based on an input power at the transmit end and the power loss at the transmit end; obtain a foreign object loss based on the transmit power and a receive power at the receive end; and when the foreign object loss is greater than a power threshold, determine that a foreign object exists between the transmit end and the receive end.

In an embodiment, the controller is further configured to: obtain an alternating current impedance of the receiving coil based on the horizontal relative position and the vertical relative position; obtain a power loss at the receive end based on the alternating current impedance of the receiving coil and a current of the receiving coil in the charging process; and obtain the receive power at the receive end based on the power loss at the receive end and an output power at the receive end.

The controller obtains the power loss at the transmit end based on the alternating current impedance of the transmitting coil and the current of the transmitting coil in the charging process. The alternating current impedance of the transmitting coil is obtained based on the relative position between the transmit end and the receive end, instead of directly using a coil resistance at the transmit end as an alternating current impedance at the transmit end. Therefore, an error of obtaining the alternating current impedance at the transmit end by the controller is reduced, an error of the power loss at the transmit end is further reduced, and an error of the transmit power is further reduced. In addition, the controller obtains the alternating current impedance of the receiving coil based on the horizontal relative position and the vertical relative position, obtains the power loss at the receive end based on the alternating current impedance of the receiving coil and the current of the receiving coil in the charging process, and obtains the receive power at the receive end based on the power loss at the receive end and the output power at the receive end. This further reduces an error of the receive power. The controller obtains a foreign object loss based on a transmit power with a relatively low error and a receive power with a relatively low error, so that an error of the foreign object loss is also relatively low. This further improves foreign object detection accuracy.

In an embodiment, the controller is further configured to: obtain a Q value at the transmit end; and when the Q value at the transmit end is less than a minimum Q threshold, determine that the foreign object exists between the transmit end and the receive end, where the minimum Q threshold is obtained based on a Q value at the transmit end when the foreign object does not exist in a charging degree of freedom range.

In a process in which the controller obtains the relative position between the transmit end and the receive end, a metal foreign object may affect accuracy of obtaining the relative position between the transmit end and the receive end by the controller, especially when the metal foreign object is located at a central part of the transmit end. Therefore, before determining the relative position between the transmit end and the receive end, the controller may first obtain the Q value at the transmit end, to further determine whether a metal foreign object close to the central part of the transmit end or a relatively large metal foreign object exists between the transmit end and the receive end. Specifically, the minimum Q threshold may be pre-obtained. If the obtained Q value at the transmit end 101 is less than the minimum Q threshold, it may be directly determined that the metal foreign object exists between the transmit end 101 and the receive end 102. This improves foreign object detection efficiency.

In an embodiment, the controller is further configured to: obtain a Q value at the transmit end; obtain a corresponding Q value threshold based on the horizontal relative position and the vertical relative position; and when the Q value at the transmit end is less than or equal to the Q value threshold, determine that a foreign object exists between the transmit end and the receive end.

In an embodiment, the controller is further configured to: when the Q value at the transmit end is greater than the Q value threshold, obtain an alternating current impedance of the transmitting coil based on the horizontal relative position and the vertical relative position; obtain a power loss at the transmit end based on the alternating current impedance of the transmitting coil and a current of the transmitting coil in a charging process; obtain a transmit power based on an input power at the transmit end and the power loss at the transmit end; obtain a power difference between the transmit power and a receive power based on the transmit power and the receive power at the receive end; perform power consumption calibration based on the power difference; obtain a foreign object loss by using calibrated power consumption; and when the foreign object loss is greater than a power threshold, determine that the foreign object exists between the transmit end and the receive end.

To prevent all obtained Q values at the transmit end from being compared with a same Q value threshold, the controller uses a Q value at the transmit end obtained when the foreign object does not exist between the transmit end and the receive end as the Q value threshold at the horizontal relative position and the vertical relative position. That is, different relative positions correspond to different Q value thresholds. The controller obtains the Q value threshold at the relative position based on the relative position, and compares the Q value at the transmit end 101 with the Q value threshold at the relative position. This improves foreign object detection accuracy. When the foreign object is not detected through Q-value FOD, the controller obtains the alternating current impedance at the transmit end corresponding to the relative position based on the relative position, instead of a coil impedance at the transmit end. Different relative positions correspond to different alternating current impedances at the transmit end. An alternating current impedance with a relatively small error at the transmit end is used, to improve accuracy of obtaining a power loss at the transmit end, so that an error of an obtained foreign object loss is relatively small, and the foreign object detection accuracy is further improved.

In an embodiment, the wireless charging apparatus further includes a driving apparatus. The controller is further configured to: control, based on the vertical relative position and the horizontal relative position, the driving apparatus to drive the transmitting coil to move, so that the geometric center of the transmitting coil coincides with the geometric center of the receiving coil at the receive end; obtain a Q value threshold obtained after the geometric center of the transmitting coil coincides with the geometric center of the receiving coil at the receive end by using a horizontal relative position obtained after the geometric center of the transmitting coil coincides with the geometric center of the receiving coil at the receive end and a vertical relative position obtained after the geometric center of the transmitting coil coincides with the geometric center of the receiving coil at the receive end; and when a Q value at the transmit end is less than or equal to the Q value threshold obtained after the geometric center of the transmitting coil coincides with the geometric center of the receiving coil at the receive end, determine that a foreign object exists between the transmit end and the receive end.

Further, impact of a relatively low error generated by the Q value threshold obtained after the geometric center of the transmitting coil coincides with the geometric center of the receiving coil at the receive end in a coincidence process on foreign object detection is avoided, and accuracy of determining whether the foreign object exists between the transmit end and the receive end by the controller is further improved.

In an embodiment, the controller is further configured to: control, based on the vertical relative position and the horizontal relative position, the driving apparatus to drive the transmitting coil to move, so that the geometric center of the transmitting coil coincides with the geometric center of the receiving coil at the receive end; obtain an alternating current impedance that is of the transmitting coil and that is obtained after the geometric center of the transmitting coil coincides with the geometric center of the receiving coil at the receive end by using a horizontal relative position obtained after the geometric center of the transmitting coil coincides with the geometric center of the receiving coil at the receive end and a vertical relative position obtained after the geometric center of the transmitting coil coincides with the geometric center of the receiving coil at the receive end; obtain a power loss at the transmit end based on the alternating current impedance that is of the transmitting coil and that is obtained after the geometric center of the transmitting coil coincides with the geometric center of the receiving coil at the receive end and a current of the transmitting coil in a charging process; obtain a transmit power based on an input power at the transmit end and the power loss at the transmit end; obtain a foreign object loss based on the transmit power and a receive power at the receive end; and when the foreign object loss is greater than a power threshold, determine that a foreign object exists between the transmit end and the receive end.

Further, impact of a relatively low error generated by the alternating current impedance obtained after the geometric center of the transmitting coil coincides with the geometric center of the receiving coil at the receive end in a coincidence process on foreign object detection is avoided, and accuracy of determining whether the foreign object exists between the transmit end and the receive end by the controller is further improved.

After obtaining the relative position between the transmit end and the receive end, the controller may control, based on the relative position, the driving apparatus to drive the transmitting coil to move, so that the geometric center of the transmitting coil coincides with the geometric center of the receiving coil. Therefore, a Q value threshold corresponding to each relative position, an alternating current impedance of the receiving coil, and an alternating current impedance of the transmitting coil do not need to be set based on the relative position. The controller may perform foreign object detection based on a unified Q value threshold, the alternating current impedance of the receiving coil, and the alternating current impedance of the transmitting coil. This improves a capability and efficiency of foreign object detection.

In an embodiment, the controller is further configured to control the direct current output voltage at the receive end to be fixed, to obtain the current of the transmitting coil in the at least one parameter, where the current of the transmitting coil is positively correlated with the horizontal relative position.

Because the current of the transmitting coil is positively correlated with the horizontal relative position, the horizontal relative position may be obtained by using the current of the transmitting coil.

In an embodiment, the controller is further configured to control the direct current output voltage at the receive end to be fixed, to obtain the efficiency of the wireless charging system in the at least one parameter, where the efficiency of the wireless charging system is negatively correlated with the horizontal relative position.

Because the efficiency of the wireless charging system is negatively correlated with the horizontal relative position, the horizontal relative position may be obtained by using the efficiency of the wireless charging system.

In an embodiment, the controller is further configured to control the current of the transmitting coil to be fixed, to obtain the direct current output voltage at the receive end in the at least one parameter, where the direct current output voltage at the receive end is negatively correlated with the horizontal relative position.

Because the direct current output voltage at the receive end is negatively correlated with the horizontal relative position, the horizontal relative position may be obtained by using the direct current output voltage at the receive end.

In an embodiment, the controller is further configured to obtain the self-inductance of the transmitting coil based on a resonance frequency of the transmit end resonant network and a resonance capacitance of the transmit end resonant network.

The self-inductance of the transmitting coil is more affected by the change in the vertical relative position between the transmit end and the receive end, and is less affected by the change in the horizontal relative position. Further, after the self-inductance of the transmitting coil is obtained by using the resonance frequency and the resonance capacitance, the vertical relative position may be obtained.

According to a second aspect, an embodiment of this application further provides a position detection method, applied to a transmit end or a receive end of a wireless charging apparatus. The transmit end includes a transmit end resonant network and an inverter circuit, and the transmit end resonant network includes a transmitting coil. The receive end includes a receive end resonant network and a rectifier circuit, and the transmit end resonant network includes a receiving coil. The method includes: obtaining a relative position between the transmit end and the receive end based on a self-inductance of the transmitting coil and at least one parameter. The at least one parameter includes a current of the transmitting coil, efficiency of a wireless charging system formed by the transmit end and the receive end, and a direct current output voltage at the receive end.

Each of the following parameters included in the wireless charging apparatus varies homogeneously with a change in the relative position between the transmit end and the receive end. The following parameters include the self-inductance of the transmitting coil, the current of the transmitting coil before charging, the efficiency of the wireless charging system, and the direct current output voltage at the receive end. Before performing wireless power transmission, the wireless charging apparatus may directly or indirectly obtain the self-inductance of the transmitting coil, the current of the transmitting coil, the efficiency of the wireless charging system, and the direct current output voltage at the receive end. Then, the relative position between the transmit end and the receive end can be accurately obtained based on a pre-obtained relationship between a change in the foregoing parameter and the relative position.

In an embodiment, the relative position includes a horizontal relative position and a vertical relative position. The obtaining a relative position between the transmit end and the receive end based on a self-inductance of the transmitting coil and at least one parameter includes: obtaining the vertical relative position based on the self-inductance of the transmitting coil, and obtaining the horizontal relative position based on the at least one parameter.

The self-inductance of the transmitting coil is more affected by a change in the vertical relative position between the transmit end and the receive end, and is less affected by a change in the horizontal relative position. Therefore, a correspondence between the self-inductance of the transmitting coil and the vertical relative position may be pre-obtained. With reference to the pre-obtained correspondence, the vertical relative position is obtained by using the self-inductance of the transmitting coil. At a same vertical relative position, there are a single change relationship between the current of the transmitting coil before charging and the horizontal relative position, a single change relationship between the efficiency of the wireless charging system and the horizontal relative position, and a single change relationship between the direct current output voltage at the receive end and the horizontal relative position. Therefore, a correspondence between the current of the transmitting coil before charging, the efficiency of the wireless charging system, or the direct current output voltage at the receive end and the horizontal relative position may be pre-obtained. With reference to the pre-obtained correspondence, the horizontal relative position is obtained by using the obtained current of the transmitting coil before charging, the obtained efficiency of the wireless charging system, or the obtained direct current output voltage at the receive end.

In an embodiment, the obtaining a relative position between the transmit end and the receive end based on a self-inductance of the transmitting coil and at least one parameter includes: directly obtaining the relative position between the transmit end and the receive end through three-dimensional positioning based on the self-inductance of the transmitting coil and the at least one parameter.

Both the self-inductance of the transmitting coil and the current of the transmitting coil before charging are affected by the relative position between the transmit end and the receive end. Therefore, a relationship between the self-inductance of the transmitting coil, the current of the transmitting coil before charging, and the relative position may be pre-obtained. With reference to the relationship, after the self-inductance of the transmitting coil and the current of the transmitting coil are obtained, the relative position corresponding to the self-inductance of the transmitting coil and the current of the transmitting coil may be determined.

Based on a similar principle, the relative position may alternatively be determined by using the self-inductance of the transmitting coil and the efficiency of the wireless charging system before charging. The relative position may alternatively be determined by using the self-inductance of the transmitting coil and the direct current output voltage at the receive end before charging. This further improves relative position detection efficiency.

In an embodiment, the method further includes: obtaining an alternating current impedance of the transmitting coil based on the horizontal relative position and the vertical relative position; obtaining a power loss at the transmit end based on the alternating current impedance of the transmitting coil and a current of the transmitting coil in a charging process; obtaining a transmit power based on an input power at the transmit end and the power loss at the transmit end; obtaining a foreign object loss based on the transmit power and a receive power at the receive end; and when the foreign object loss is greater than a power threshold, determining that a foreign object exists between the transmit end and the receive end.

In an embodiment, the method further includes: obtaining an alternating current impedance of the receiving coil based on the horizontal relative position and the vertical relative position; obtaining a power loss at the receive end based on the alternating current impedance of the receiving coil and a current of the receiving coil in the charging process; and obtaining the receive power at the receive end based on the power loss at the receive end and an output power at the receive end.

The power loss at the transmit end is obtained based on the alternating current impedance of the transmitting coil and the current of the transmitting coil in the charging process. The alternating current impedance of the transmitting coil is obtained based on the relative position between the transmit end and the receive end, instead of directly using a coil resistance at the transmit end as an alternating current impedance at the transmit end. In this way, an error of obtaining the alternating current impedance at the transmit end is reduced, an error of the power loss at the transmit end is further reduced, and an error of the transmit power is further reduced. In addition, the alternating current impedance of the receiving coil is obtained based on the horizontal relative position and the vertical relative position, the power loss at the receive end is obtained based on the alternating current impedance of the receiving coil and the current of the receiving coil in the charging process, and the receive power at the receive end is obtained based on the power loss at the receive end and the output power at the receive end. This further reduces an error of the receive power. A foreign object loss is obtained based on a transmit power with a relatively low error and a receive power with a relatively low error, so that an error of the foreign object loss is also relatively low. This further improves foreign object detection accuracy.

In an embodiment, the method further includes: obtaining a Q value at the transmit end; and when the Q value at the transmit end is less than a minimum Q threshold, determining that the foreign object exists between the transmit end and the receive end, where the minimum Q threshold is obtained based on a Q value at the transmit end when the foreign object does not exist in a charging degree of freedom range.

In a process of obtaining the relative position between the transmit end and the receive end, a metal foreign object may affect accuracy of obtaining the relative position between the transmit end and the receive end, especially when the metal foreign object is located at a central part of the transmit end. Therefore, before the relative position between the transmit end and the receive end is determined, the Q value at the transmit end may be first obtained, to further determine whether a metal foreign object close to the central part of the transmit end or a relatively large metal foreign object exists between the transmit end and the receive end. Specifically, the minimum Q threshold may be pre-obtained. If the obtained Q value at the transmit end is less than the minimum Q threshold, it may be directly determined that the metal foreign object exists between the transmit end and the receive end. This improves foreign object detection efficiency.

In an embodiment, the method further includes: obtaining a Q value at the transmit end; obtaining a corresponding Q value threshold based on the horizontal relative position and the vertical relative position; and when the Q value at the transmit end is less than or equal to the Q value threshold, determining that a foreign object exists between the transmit end and the receive end.

In an embodiment, the method further includes: when the Q value at the transmit end is greater than the Q value threshold, obtaining an alternating current impedance of the transmitting coil based on the horizontal relative position and the vertical relative position; obtaining a power loss at the transmit end based on the alternating current impedance of the transmitting coil and a current of the transmitting coil in a charging process; obtaining a transmit power based on an input power at the transmit end and the power loss at the transmit end; obtaining a power difference between the transmit power and a receive power based on the transmit power and the receive power at the receive end; performing power consumption calibration based on the power difference; obtaining a foreign object loss by using calibrated power consumption; and when the foreign object loss is greater than a power threshold, determining that a foreign object exists between the transmit end and the receive end.

To prevent all obtained Q values at the transmit end from being compared with a same Q value threshold, a Q value at the transmit end obtained when the foreign object does not exist between the transmit end and the receive end is used as the Q value threshold at the horizontal relative position and the vertical relative position. That is, different relative positions correspond to different Q value thresholds. The Q value threshold at the relative position is obtained based on the relative position, and the Q value at the transmit end is compared with the Q value threshold at the relative position. This improves foreign object detection accuracy. When the foreign object is not detected through Q-value FOD, the alternating current impedance at the transmit end corresponding to the relative position is obtained based on the relative position, instead of a coil impedance at the transmit end. Different relative positions correspond to different alternating current impedances at the transmit end. An alternating current impedance with a relatively small error at the transmit end is used, to improve accuracy of obtaining a power loss at the transmit end, so that an error of an obtained foreign object loss is relatively small, and the foreign object detection accuracy is further improved.

In an embodiment, the method further includes: coinciding the geometric center of the transmitting coil with the geometric center of the receiving coil at the receive end based on the vertical relative position and the horizontal relative position; obtaining a Q value threshold obtained after the geometric center of the transmitting coil coincides with the geometric center of the receiving coil at the receive end by using a horizontal relative position obtained after the geometric center of the transmitting coil coincides with the geometric center of the receiving coil at the receive end and a vertical relative position obtained after the geometric center of the transmitting coil coincides with the geometric center of the receiving coil at the receive end; and when a Q value at the transmit end is less than or equal to the Q value threshold obtained after the geometric center of the transmitting coil coincides with the geometric center of the receiving coil at the receive end, determining that a foreign object exists between the transmit end and the receive end.

Further, impact of a relatively low error generated by the Q value threshold obtained after the geometric center of the transmitting coil coincides with the geometric center of the receiving coil at the receive end in a coincidence process on foreign object detection is avoided, and accuracy of determining whether the foreign object exists between the transmit end and the receive end is further improved.

In an embodiment, the method further includes: coinciding the geometric center of the transmitting coil with the geometric center of the receiving coil at the receive end based on the vertical relative position and the horizontal relative position; obtaining an alternating current impedance that is of the transmitting coil and that is obtained after the geometric center of the transmitting coil coincides with the geometric center of the receiving coil at the receive end by using a horizontal relative position obtained after the geometric center of the transmitting coil coincides with the geometric center of the receiving coil at the receive end and a vertical relative position obtained after the geometric center of the transmitting coil coincides with the geometric center of the receiving coil at the receive end; obtaining a power loss at the transmit end based on the alternating current impedance that is of the transmitting coil and that is obtained after the geometric center of the transmitting coil coincides with the geometric center of the receiving coil at the receive end and a current of the transmitting coil in a charging process; obtaining a transmit power based on an input power at the transmit end and the power loss at the transmit end; obtaining a foreign object loss based on the transmit power and a receive power at the receive end; and when the foreign object loss is greater than a power threshold, determining that a foreign object exists between the transmit end and the receive end.

Further, impact of a relatively low error generated by the alternating current impedance obtained after the geometric center of the transmitting coil coincides with the geometric center of the receiving coil at the receive end in a coincidence process on foreign object detection is avoided, and accuracy of determining whether the foreign object exists between the transmit end and the receive end by the controller is further improved.

After the relative position between the transmit end and the receive end is obtained, the transmitting coil may be driven based on the relative position to move, so that the geometric center of the transmitting coil coincides with the geometric center of the receiving coil. Therefore, a Q value threshold corresponding to each relative position, an alternating current impedance of the receiving coil, and an alternating current impedance of the transmitting coil do not need to be set based on the relative position. Foreign object detection may be performed based on a unified Q value threshold, the alternating current impedance of the receiving coil, and the alternating current impedance of the transmitting coil. This improves a capability and efficiency of foreign object detection.

In an embodiment, the method further includes: controlling the direct current output voltage at the receive end to be fixed, to obtain the current of the transmitting coil in the at least one parameter, where the current of the transmitting coil is positively correlated with the horizontal relative position.

Because the current of the transmitting coil is positively correlated with the horizontal relative position, the horizontal relative position may be obtained by using the current of the transmitting coil.

In an embodiment, the method further includes: controlling the direct current output voltage at the receive end to be fixed, to obtain the efficiency of the wireless charging system in the at least one parameter, where the efficiency of the wireless charging system is negatively correlated with the horizontal relative position.

Because the efficiency of the wireless charging system is negatively correlated with the horizontal relative position, the horizontal relative position may be obtained by using the efficiency of the wireless charging system.

In an embodiment, the method further includes: controlling the current of the transmitting coil to be fixed, to obtain the direct current output voltage at the receive end in the at least one parameter, where the direct current output voltage at the receive end is negatively correlated with the horizontal relative position.

Because the direct current output voltage at the receive end is negatively correlated with the horizontal relative position, the horizontal relative position may be obtained by using the direct current output voltage at the receive end.

In an embodiment, the method further includes: obtaining the self-inductance of the transmitting coil based on a resonance frequency of the transmit end resonant network and a resonance capacitance of the transmit end resonant network.

The self-inductance of the transmitting coil is more affected by the change in the vertical relative position between the transmit end and the receive end, and is less affected by the change in the horizontal relative position. Further, after the self-inductance of the transmitting coil is obtained by using the resonance frequency and the resonance capacitance, the vertical relative position may be obtained.

According to a third aspect, an embodiment of this application further provides a wireless charging system, including at least one wireless charging apparatus described above. When the wireless charging apparatus includes a transmit end, the system further includes a receive end. When the wireless charging apparatus includes a receive end, the system further includes a transmit end. The transmit end is configured to wirelessly charge the receive end. The wireless charging system can accurately detect a relative position between the transmit end and the receive end of the wireless charging system.

It can be learned from the foregoing technical solutions that the embodiments of this application has the following advantages: The self-inductance of the transmitting coil is more affected by the change in the vertical relative position between the transmit end and the receive end, and is less affected by the change in the horizontal relative position. Therefore, the controller may pre-obtain the correspondence between the self-inductance of the transmitting coil and the vertical relative position. With reference to the correspondence pre-obtained by the controller, the vertical relative position is obtained by using the self-inductance of the transmitting coil. At the same vertical relative position, there are the single change relationship between the current of the transmitting coil before charging and the horizontal relative position, the single change relationship between the effi-ciency of the wireless charging system formed by the transmit end and the receive end and the horizontal relative position, and the single change relationship between the direct current output voltage at the receive end and the horizontal relative position. Therefore, the controller may pre-obtain the correspondence between the current of the transmitting coil before charging, the efficiency of the wireless charging system, or the direct current output voltage at the receive end and the horizontal relative position. With reference to the correspondence pre-obtained by the controller, the horizontal relative position is obtained by using the obtained current of the transmitting coil before charging, the obtained efficiency of the wireless charging system, or the obtained direct current output voltage at the receive end. After obtaining the vertical relative position and the horizontal relative position, the controller can accurately obtain the relative position between the transmit end and the receive end.

DESCRIPTION OF EMBODIMENTS

To make a person skilled in the art better understand technical solutions provided in embodiments of this application, the following first describes an application scenario of the solutions.

The technical solutions provided in the embodiments of this application are not only applicable to a relatively long-distance wireless power transmission scenario, but also applicable to a relatively short-distance wireless charging scenario. In the following embodiments, the relatively short-distance wireless charging scenario is used as an example for description.

A transmit end is generally a wireless charging device, for example, a wireless charger, and a receive end may be located in an electronic device. For example, the electronic device may be any device that supports wireless charging, for example, a mobile phone, a tablet computer, or a wearable device. The wireless charging device and the electronic device are not limited in the embodiments of this application.

Figure 1:
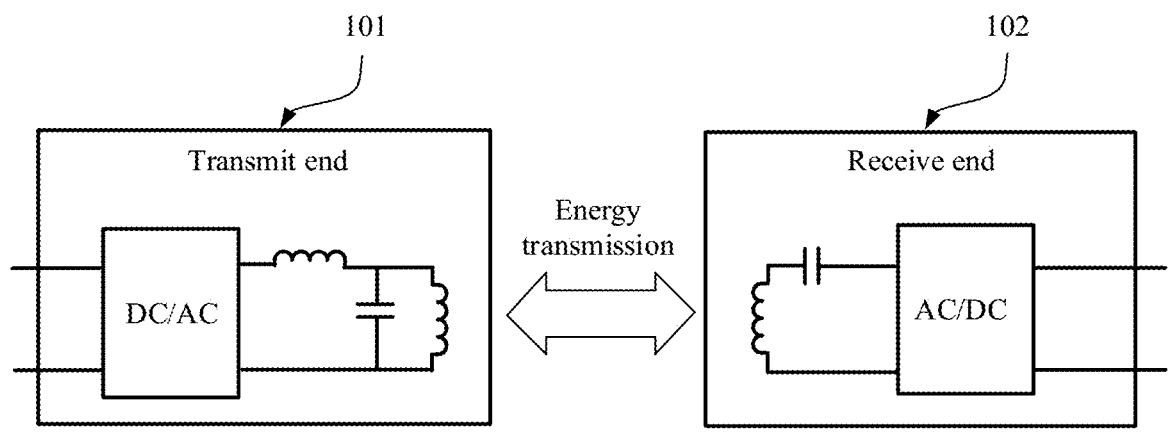
FIG. 1 is a schematic diagram of a wireless power transmission process.

FIG. 1 is a schematic diagram of a wireless power transmission process.

As shown in the figure, a transmit end 101 is configured to emit magnetic field energy, and a receive end 102 is configured to receive the magnetic field energy emitted by the transmit end 101.

The transmit end 101 may be located in a wireless charging device, and the receive end 102 may be located in an electronic device. After converting input electric energy into the magnetic field energy, the wireless charging device emits the magnetic field energy by using the transmit end 101. When the electronic device is located near the wireless charging device, the electronic device receives, by using the receive end 102, the magnetic field energy emitted by the wireless charging device, and converts the magnetic field energy into electric energy, to charge the electronic device. In this way, wireless transmission of the electric energy from the wireless charging device to the electronic device is implemented.

In wireless power transmission, the electric energy is wirelessly transmitted from the transmit end 101 to the receive end 102 through magnetic field coupling between a transmitting coil and a receiving coil. However, a foreign object, for example, a metal foreign object, may exist between the transmit end 101 and the receive end 102. A changing magnetic field generated between the transmitting coil and the receiving coil generates eddy current losses and heat in the metal foreign object. With development of technologies and upgrade of wireless charging devices and electronic devices, a wireless charging power between the wireless charging device and the electronic device gradually increases, and the eddy current losses and the heat generated by the metal foreign object also increase proportionally. In this case, not only lots of energy losses are caused, but also a large amount of heat generated by the metal foreign object may cause potential safety hazards such as fire.

Therefore, foreign object detection (FOD) is a technical problem that needs to be resolved in a wireless charging technology. Foreign object detection methods generally include a power loss method (Ploss) and Q-value FOD. The following describes the power loss method and the Q-value FOD.

Power Loss Method:

The power loss method is a foreign object detection method defined by the Wireless Power Consortium (WPC) in the Qi protocol. A power loss is a power difference between a transmit power and a receive power, and may be calculated by using the following formula:

$P_{loss} = P_{tx} - P_{rx}$, where $P_{loss}$ is the power loss; $P_{tx}$ is the transmit power, and the transmit power is the magnetic field energy emitted by the transmit end 101; and $P_{rx}$ is the receive power, and the receive power is the magnetic field energy received by the receive end 102 of the electronic device.

The transmit power $P_{tx}$ may be calculated by using the following formula:

$P_{tx} = P_{in} - P_{tx\ loss}$, where $P_{in}$ is an input power at the transmit end 101, and $P_{tx\ loss}$ is power losses at the transmit end 101, including a loss of a circuit at the transmit end 101 and a loss of the transmitting coil.

The receive power $P_{rx}$ may be calculated by using the following formula:

$P_{rx} = P_{out} + P_{rx\ loss}$, where $P_{out}$ is an output power at the receive end 102, and $P_{rx\ loss}$ is power losses at the receive end 102, including a loss of a circuit at the receive end 102 and a loss of the receiving coil.

In the wireless power transmission process, the wireless charging device may detect a power loss at a current moment periodically or at an interval of a preset period. When the power loss is greater than a power threshold and duration exceeds a time threshold, it is determined that the metal foreign object exists between the wireless charging device and the electronic device, and current electric energy transmission is stopped. Therefore, the potential safety hazards caused by the large amount of heat generated by the magnetic field energy on the metal foreign object are avoided.

The power loss at the transmit end 101 needs to be indirectly obtained by using a coil resistance at the transmit end 101 in a wireless charging space range. The loss power at the receive end 102 needs to be indirectly obtained by using a coil resistance at the receive end 102 in the wireless charging space range. However, values of the coil resistance at the transmit end 101 and the coil resistance at the receive end 102 vary with relative positions between the transmit end 101 and the receive end 102. In other words, when the transmitting coil and the receiving coil are in different relative positions, the values of the coil resistance at the transmit end 101 and the coil resistance at the receive end 102 are different. It can be learned that a linear fitting method based on power level classification may cause a relatively large error in the calculated power loss at the transmit end 101 and a relatively large error in the calculated power loss at the receive end 102. The following uses the coil resistance at the transmit end 101 as an example for specific description.

Figure 2:
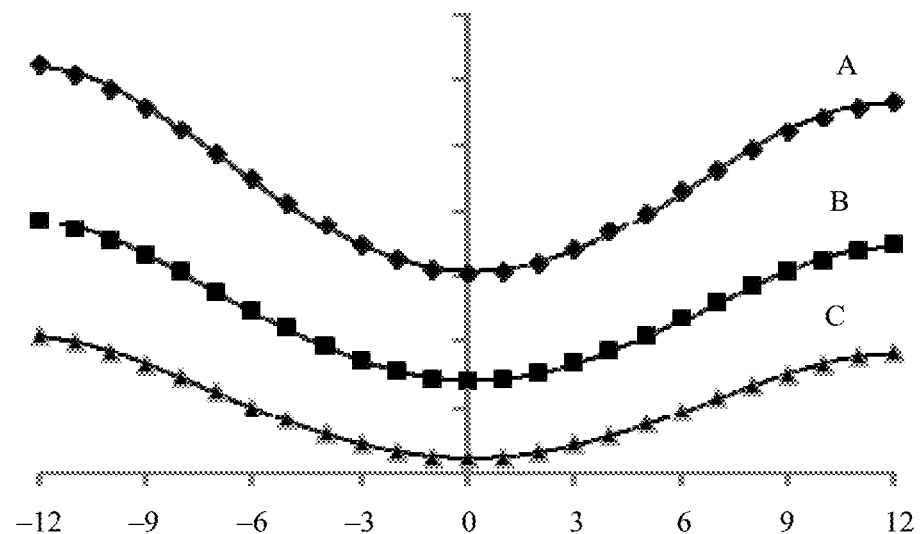
FIG. 2 is a schematic diagram in which an alternating current impedance of a transmitting coil varies with a relative position.

FIG. 2 is a schematic diagram in which an alternating current impedance of the transmitting coil varies with the relative position.

A horizontal axis indicates a horizontal relative position (unit: millimeter), and a vertical axis indicates the alternating current impedance (unit: milliohm) of the transmitting coil.

As shown in FIG. 2, the alternating current impedance of the transmitting coil varies with relative positions between the transmit end 101 and the receive end 102. A curve A, a curve B, and a curve C in the figure are curves in which alternating current impedances of the transmitting coil vary with the horizontal relative position when vertical relative positions are 3.6 mm, 4.6 mm, and 5.6 mm, respectively.

It can be learned from the figure that a maximum error of the alternating current impedance of the transmitting coil may reach ±30 mΩ. When the wireless charging device wirelessly charges the electronic device, a current of the transmitting coil may be greater than 5 A. It can be learned that a calculation error of only the power loss at the transmit end 101 may reach 750 mW. A maximum power loss on the metal foreign object is only 900 mW when a safety regulation is met. Therefore, when the vertical relative position and the horizontal relative position are relatively large, it is difficult to ensure foreign object detection accuracy, and the potential safety hazards caused by the large amount of heat generated by the metal foreign object cannot be effectively avoided.

Q-Value FOD:

When the Q-value FOD is used to detect the metal foreign object between the wireless charging device and the electronic device, the following operations may be included.

Operation 1: Detect a Q value at the transmit end 101.

Figure 3:
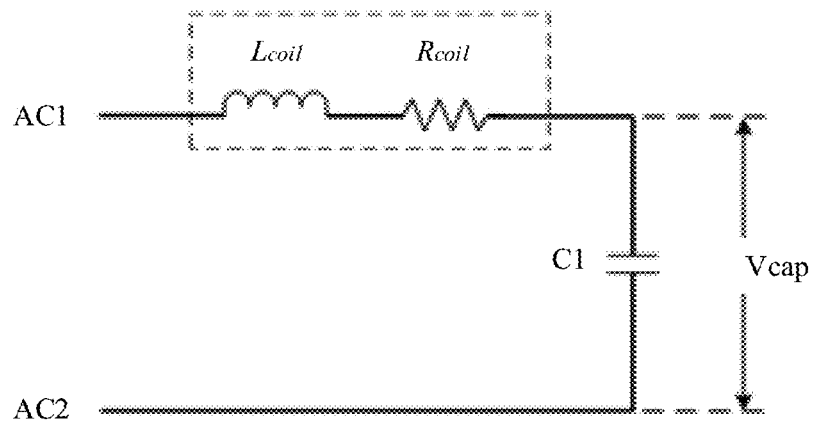
FIG. 3 is a schematic diagram of a Q-value detection circuit.

FIG. 3 is a schematic diagram of a Q-value detection circuit.

The Q-value detection circuit includes an inductor $L_{coil}$, a resistor $R_{coil}$, and a capacitor C1. The Q value is defined as the following formula:

$$Q = \frac{2\pi f \times L_{coil}}{R_{coil}},$$

where f is a resonance frequency of a resonant network including the inductor $L_{coil}$, the resistor $R_{coil}$, and the capacitor C1, $L_{coil}$ is an inductor, and $R_{coil}$ is a resistor.

When the metal foreign object exists between or near the transmitting coil and the receiving coil, values of the inductor $L_{coil}$ and the resistor $R_{coil}$ change. According to the definition formula of the Q value, the Q value also changes accordingly.

A specific process of obtaining the Q value may be as follows: applying excitation to charge the capacitor C1, then controlling an AC1 end and an AC2 end to ground to release electric energy stored in the capacitor C1, detecting a voltage Vcap at both ends of the capacitor C1, and obtaining an oscillation attenuation waveform diagram of the voltage Vcap.

Figure 4:
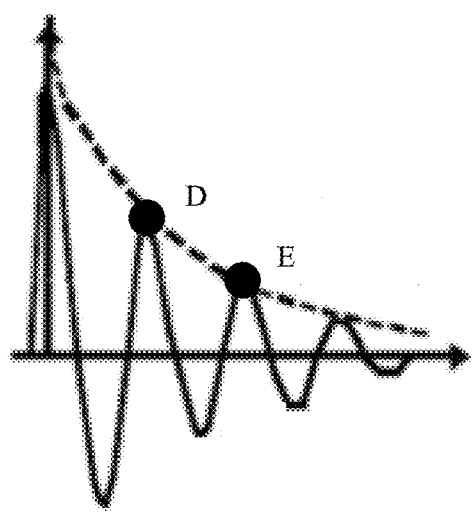
FIG. 4 is an oscillation attenuation curve diagram of a voltage Vcap.

FIG. 4 is an oscillation attenuation curve diagram of the voltage Vcap.

A horizontal axis indicates a time, and a vertical axis indicates a voltage. According to the figure, the Q value may be calculated by using the following formula:

$$Q = \frac{f_0 \times (t_2 - t_1)}{2 \times \ln\frac{v_1}{v_2}},$$

where $t_1$ and $v_1$ are coordinates corresponding to any wave crest point D on the oscillation attenuation curve in the figure, $t_2$ and $v_2$ are coordinates corresponding to a wave crest point E on the oscillation attenuation curve in the figure, the point D and the point E are two adjacent wave crest points, and $f_0$ is a resonance frequency. $f_0$ may be calculated based on a quantity of zero crossing times of the oscillation attenuation curve of a voltage Vcap between the point D and the point E and a time interval between the point D and the point E. In addition, for coordinates of any two adjacent wave trough points on the oscillation attenuation curve in the figure, $f_0$ may alternatively be calculated based on a quantity of zero crossing times of the oscillation attenuation curve of a voltage Vcap between the any two adjacent wave trough points and a time interval between the any two adjacent wave trough points.

Operation 2: Determine whether the Q value at the transmit end 101 is greater than a Q value threshold; and if the Q value at the transmit end 101 is greater than the Q value threshold, perform operation 3, or if the Q value at the transmit end 101 is not greater than the Q value threshold, perform operation 4.

Operation 3: Correct the power loss at the transmit end 101 based on the Q value at the transmit end 101; calculate the power loss based on a corrected power loss at the transmit end 101 by using the foregoing power loss method; determine whether the power loss $P_{loss}$ is greater than a preset threshold in a preset time period; and if the power loss $P_{loss}$ is greater than the preset threshold in the preset time period, perform operation 5, or if the power loss $P_{loss}$ is not greater than the preset threshold in the preset time period, perform operation 4.

Operation 4: Determine that the metal foreign object exists between the wireless charging device and the electronic device.

Operation 5: Determine that the metal foreign object does not exist between the wireless charging device and the electronic device, and start electric energy transmission.

However, in operation 1 and operation 2, in addition to being affected by the metal foreign object, the Q value at the transmit end 101 is further affected by the relative position between the transmit end 101 and the receive end 102. In other words, when the transmitting coil and the receiving coil are in different relative positions, Q values at the transmit end 101 are different.

Figure 5:
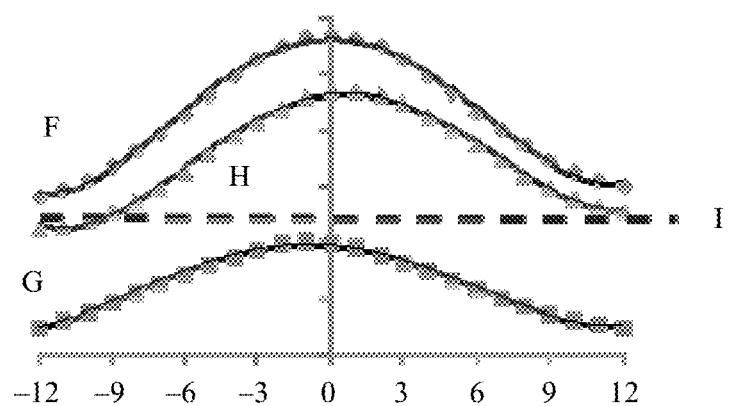
FIG. 5 is a schematic diagram in which a Q value at a transmit end varies with a relative position.

FIG. 5 is a schematic diagram in which the Q value at the transmit end varies with the relative position.

A horizontal axis indicates a horizontal relative position (unit: millimeter), and a vertical axis indicates the Q value at the transmit end 101.

In the figure, a curve F, a curve G, and a curve H are respectively curves in which Q values at the transmit end 101 in the following three cases when a vertical relative position is 3.6 mm:
a case that the metal foreign object does not exist; a case that a distance between the metal foreign object and the geometric center of the transmitting coil is 15 mm; and a case that the distance between the metal foreign object and the geometric center of the transmitting coil is 25 mm.

A dashed line I in the figure is a straight line corresponding to a Q value threshold. It can be learned that when the distance between the metal foreign object and the geometric center of the transmitting coil is 25 mm or more, the Q value at the transmit end 101 is always higher than the Q value threshold. Therefore, the foreign object cannot be accurately detected through the Q-value FOD.

In addition, when the distance between the metal foreign object and the geometric center of the transmitting coil is 25 mm or more, after the metal foreign object is not detected in operation 1 and operation 2, operation 3 is performed. In operation 3, the power loss at the transmit end 101 is corrected. Then, operation 5 is performed to start electric power transmission. After electric power transmission is performed, the Q value at the transmit end 101 is no longer detected, and the eddy current losses caused by the metal foreign object are used as normal power losses at the transmit end 101. Therefore, when the vertical relative position and the horizontal relative position are relatively large, it is difficult to ensure foreign object detection accuracy, and the potential safety hazards caused by the large amount of heat generated by the metal foreign object cannot be effectively avoided.

As the wireless charging power between the wireless charging device and the electronic device gradually increases, a requirement for foreign object detection accuracy also needs to be correspondingly improved. Neither the power loss method nor the Q-value FOD described above can meet a requirement for foreign object detection.

In the power loss method, parameters such as the alternating current impedance of the transmitting coil used for the power loss at the transmit end 101 and the alternating current impedance of the receiving coil used for the power loss at the receive end 102 are affected by the relative position between the transmit end 101 and the receive end 102. Therefore, when the relative position between the transmit end 101 and the receive end 102 is uncertain, a power loss is obtained by using parameters in an uncoupled state, such as the coil resistance at the transmit end 101 and the coil resistance at the receive end 102, resulting in an inaccurate foreign object detection result. Even the relative position between the transmit end 101 and the receive end 102 may have greater impact on the alternating current impedance of the transmitting coil and the alternating current impedance of the receiving coil than impact of the metal foreign object.

In the Q-value FOD, a parameter, for example, the Q value at the transmit end 101, is also affected by the relative position between the transmit end 101 and the receive end 102. Therefore, when the relative position between the transmit end 101 and the receive end 102 is uncertain, foreign object detection is performed by using a Q value in the uncoupled state at the transmit end 101, resulting in an inaccurate foreign object detection result. Even the relative position between the transmit end 101 and the receive end 102 may have greater impact on the Q value at the transmit end 101 than the impact of the metal foreign object.

Therefore, both the power loss method and the Q-value FOD described above make it impossible to determine whether the foreign object exists.

In an embodiment of this application, to improve foreign object detection accuracy, before the foreign object between the wireless charging device and the electronic device is detected, a relative position between the wireless charging device and the electronic device is detected in advance. Impact of the relative position between the transmit end 101 and the receive end 102 on the parameters involved in the power loss method and on the parameters involved in the Q-value FOD are reduced, thereby improving the foreign object detection accuracy.

To make a person skilled in the art better understand the technical solutions provided in the embodiments of this application, the following provides specific descriptions with reference to the accompanying drawings.

Apparatus Embodiment 1

Figure 6:
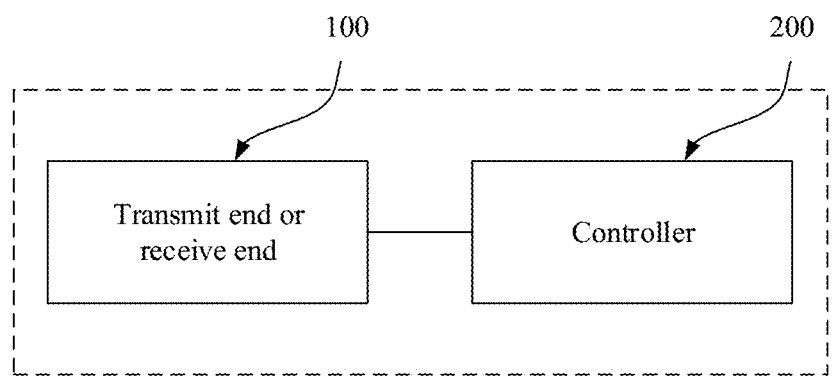
FIG. 6 is a schematic diagram of a wireless charging apparatus according to an embodiment of this application.

FIG. 6 is a schematic diagram of a wireless charging apparatus according to an embodiment of this application.

The wireless charging apparatus includes a transmit end 101 or a receive end 102.

The transmit end 101 includes a transmit end resonant network and an inverter circuit, and the transmit end resonant network includes a transmitting coil.

The receive end 102 includes a receive end resonant network and a rectifier circuit, and the receive end resonant network includes a receiving coil.

The apparatus further includes a controller 200.

The controller 200 is configured to obtain a relative position between the transmit end 101 and the receive end 102 based on a self-inductance of the transmitting coil and at least one parameter.

The at least one parameter includes a current of the transmitting coil before charging, efficiency of a wireless charging system formed by the transmit end 101 and the receive end 102, and a direct current output voltage at the receive end 102.

The relative position between the transmit end 101 and the receive end 102 is a spatial offset between the circular center of the transmitting coil and the circular center of the receiving coil.

Note that each of the following parameters included in the wireless charging apparatus varies homogeneously with a change in the relative position between the transmit end 101 and the receive end 102. The following parameters include the self-inductance of the transmitting coil, the current of the transmitting coil before charging, the efficiency of the wireless charging system, and the direct current output voltage at the receive end 102. Before performing wireless power transmission, the wireless charging apparatus may directly or indirectly obtain the self-inductance of the transmitting coil, the current of the transmitting coil, the efficiency of the wireless charging system, and the direct current output voltage at the receive end 102. Then, the relative position between the transmit end 101 and the receive end 102 is obtained based on a pre-obtained relationship between a change in the foregoing parameter and the relative position.

The following describes in detail how the wireless charging apparatus in this embodiment of this application obtains the relative position between the transmit end 101 and the receive end 102.

In an embodiment of this application, the controller 200 of the wireless charging apparatus obtains the relative position between the transmit end and the receive end in the following two manners:

In a first manner, the controller 200 is configured to obtain a vertical relative position based on the self-inductance of the transmitting coil, and obtain a horizontal relative position based on the current of the transmitting coil before charging, the efficiency of the wireless charging system, or the direct current output voltage at the receive end 102. Detailed descriptions are described later. The vertical relative position refers to a height difference formed in a spatial vertical direction by the circular center of the transmitting coil and the circular center of the receiving coil, and the horizontal relative position refers to a distance difference formed in a spatial horizontal direction by the circular center of the transmitting coil and the circular center of the receiving coil.

In a second manner, the controller 200 is configured to directly obtain the relative position between the transmit end 101 and the receive end 102 through three-dimensional positioning based on the self-inductance of the transmitting coil and the at least one parameter.

The at least one parameter includes the current of the transmitting coil before charging, the efficiency of the wireless charging system formed by the transmit end 101 and the receive end 102, and the direct current output voltage at the receive end 102.

The following provides detailed descriptions by using an example in which the controller 200 obtains the relative position between the transmit end 101 and the receive end 102 based on the self-inductance of the transmitting coil and the current of the transmitting coil before charging.

A three-dimensional correspondence between the self-inductance of the transmitting coil, the current of the transmitting coil, and the relative position may be pre-obtained. After obtaining the self-inductance of the transmitting coil and the current of the transmitting coil, the controller 200 obtains, from the three-dimensional correspondence, the relative position corresponding to the self-inductance of the transmitting coil and the current of the transmitting coil.

A principle in which the controller 200 obtains the relative position based on the self-inductance of the transmitting coil and the efficiency of the wireless charging system before charging, and a principle in which the controller 200 obtains the relative position based on the self-inductance of the transmitting coil and the direct current output voltage at the receive end 102 are similar to the foregoing process, and details are not described herein again.

In an embodiment of this application, both the self-inductance of the transmitting coil and the current of the transmitting coil before charging are affected by the relative position between the transmit end 101 and the receive end 102. Therefore, the controller 200 may pre-obtain the three-dimensional correspondence between the self-inductance of the transmitting coil, the current of the transmitting coil before charging, and the relative position. With reference to the three-dimensional correspondence, after obtaining the self-inductance of the transmitting coil and the current of the transmitting coil, the controller 200 may determine the relative position corresponding to the self-inductance of the transmitting coil and the current of the transmitting coil. Based on a similar principle, the controller 200 may alternatively determine the relative position by using the self-inductance of the transmitting coil and the efficiency of the wireless charging system before charging. The controller 200 may alternatively determine the relative position by using the self-inductance of the transmitting coil and the direct current output voltage at the receive end 102 before charging. This further improves relative position detection efficiency.

The following describes the first manner.

The following describes how the controller 200 obtains the vertical relative position based on the self-inductance of the transmitting coil.

Figure 7:
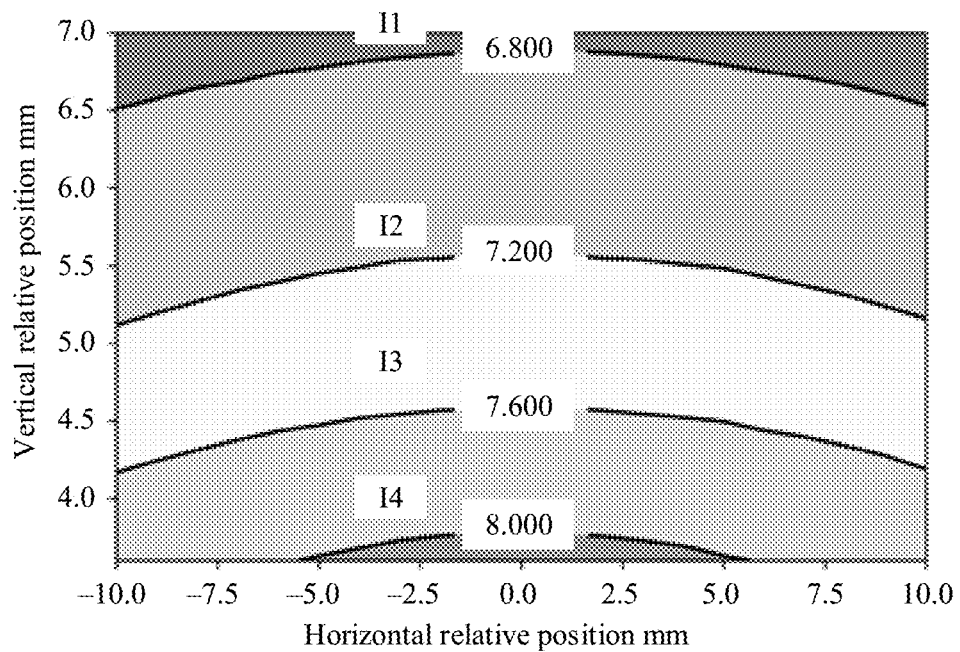
FIG. 7 is an equipotential diagram in which a self-inductance of a transmitting coil varies with a relative position between a transmit end and a receive end according to an embodiment of this application.

A process in which the controller 200 obtains the vertical relative position between the transmit end 101 and the receive end 102 based on the self-inductance of the transmitting coil is as follows:

FIG. 7 is an equipotential diagram in which the self-inductance of the transmitting coil varies with the relative position between the transmit end and the receive end according to an embodiment of this application.

A horizontal axis indicates the horizontal relative position (unit: millimeter), and a vertical axis indicates the vertical relative position (unit: millimeter).

Curves I1 to I4 in the figure are equipotential lines obtained when self-inductances of the transmitting coil are 6.8 uH, 7.2 uH, 7.6 uH, and 8.0 uH, respectively.

It can be seen from the figure that the self-inductance of the transmitting coil varies slightly with the horizontal relative position and varies more with the vertical relative position. Therefore, the vertical relative position may be obtained by using the self-inductance of the transmitting coil.

A correspondence between the self-inductance of the transmitting coil and the vertical relative position may be pre-obtained. In an embodiment, the correspondence may be obtained through an experiment, and formed data is stored in the controller 200. After the self-inductance of the transmitting coil is obtained, the vertical relative position corresponding to the self-inductance of the transmitting coil is obtained from the correspondence. The controller 200 is further configured to obtain the self-inductance of the transmitting coil based on a resonance frequency of the transmit end resonant network and a resonance capacitance of the transmit end resonant network.

The following describes how to obtain the self-inductance of the transmitting coil based on the resonance frequency of the transmit end resonant network and the resonance capacitance of the transmit end resonant network.

Figure 8:
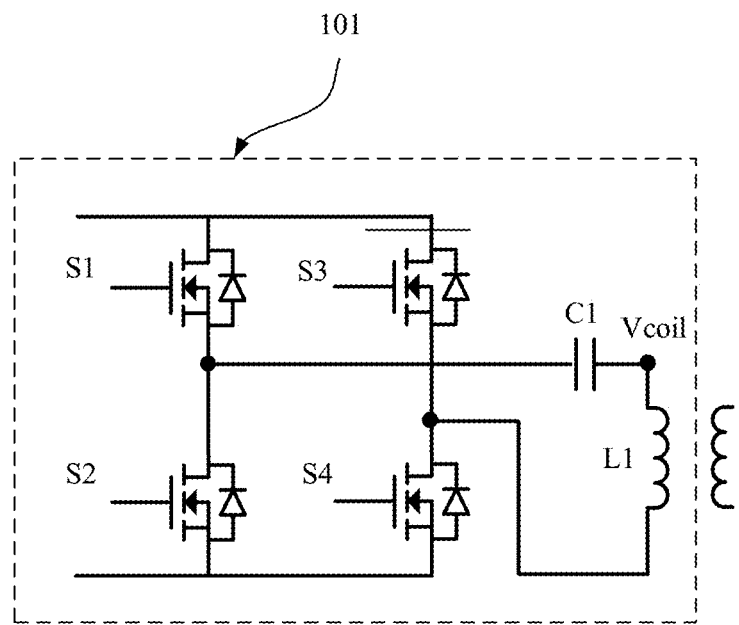
FIG. 8 is a schematic diagram of a resonance parameter detection circuit according to an embodiment of this application.

FIG. 8 is a schematic diagram of a resonance parameter detection circuit according to an embodiment of this application.

An inverter circuit DC/AC at the transmit end 101 includes a full-bridge circuit formed by switching transistors S1 to S4. The full-bridge circuit includes two bridge arms that are connected in parallel. A first bridge arm includes S1 and S2 that are connected in series, where S1 is an upper transistor of the first bridge arm, and S2 is a lower transistor of the first bridge arm. A second bridge arm includes S3 and S4 that are connected in series, where S3 is an upper transistor of the second bridge arm, and S4 is a lower transistor of the second bridge arm.

The transmit end resonant network includes a capacitor $C_1$ and a transmitting coil $L_1$.

The controller 200 supplies a direct current voltage to an input end of the full-bridge circuit at the transmit end 101, turns on S1 and S4, turns off S2 and S3, and charges $C_1$, so that $C_1$ stores energy.

After determining that the circuit reaches a stable state, the controller 200 turns off S1 and turns on S2. The energy stored in $C_1$ is released in a resonant circuit formed by $L_1$ and $C_1$, and a loop formed by S2 and S4. A voltage oscillation curve is obtained by detecting a voltage change between $C_1$ and $L_1$, and a resonance frequency $f_0$ may be obtained by using the oscillation curve.

Figure 9:
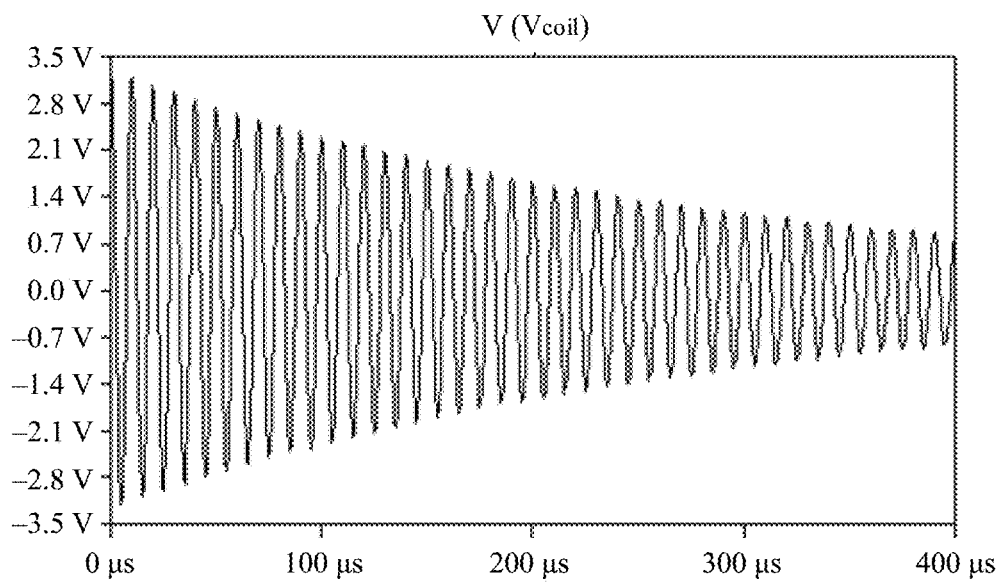
FIG. 9 is a schematic diagram of a voltage oscillation curve according to an embodiment of this application.

FIG. 9 is a schematic diagram of the voltage oscillation curve according to an embodiment of this application.

A horizontal axis indicates a time (unit: microsecond), and a vertical axis indicates a voltage (unit: volt).

A specific principle of obtaining the resonance frequency $f_0$ by using the oscillation curve is similar to a process of obtaining the resonance frequency in the Q-value FOD, and details are not described herein again.

After the resonance frequency $f_0$ is obtained, the self-inductance $L_1$ of the transmitting coil may be obtained by using the following formula:

$$L_1 = \frac{1}{(2\pi f_0)^2 C_1},$$

where $C_1$ is the capacitor and is known, $L_1$ is the self-inductance of the transmitting coil, and $f_0$ is the resonance frequency.

After obtaining the self-inductance $L_1$ of the transmitting coil, the controller 200 may obtain the vertical relative position between the transmit end 101 and the receive end 102 with reference to the correspondence between the self-inductance of the transmitting coil and the vertical relative position in FIG. 7.

The following describes how the controller 200 obtains the horizontal relative position based on the current of the transmitting coil before charging, the efficiency of the wireless charging system, or the direct current output voltage at the receive end 102.

The controller 200 is further configured to obtain the horizontal relative position between the transmit end 101 and the receive end 102 based on the current of the transmitting coil before charging, the efficiency of the wireless charging system, or the direct current output voltage at the receive end 102.

Figure 10:
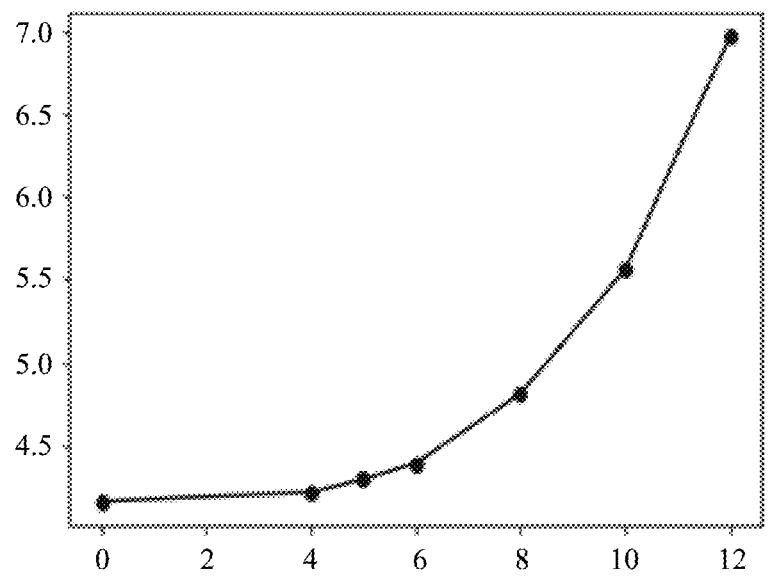
FIG. 10 is a curve in which a current of a transmitting coil varies with a horizontal relative position according to an embodiment of this application.

A process in which the controller 200 obtains the horizontal relative position between the transmit end 101 and the receive end 102 based on the current of the transmitting coil before charging is as follows:

FIG. 10 is a curve in which the current of the transmitting coil varies with the horizontal relative position according to an embodiment of this application.

A horizontal axis indicates the horizontal relative position (unit: millimeter), and a vertical axis indicates the current (unit: ampere) of the transmitting coil. It can be seen from the figure that, at a same vertical relative position, after the direct current output voltage at the receive end 102 is fixed, the current of the transmitting coil is positively correlated with the horizontal relative position. In other words, a larger horizontal relative position indicates a larger current of the transmitting coil. Therefore, the horizontal relative position may be obtained by measuring the current of the transmitting coil.

A correspondence between the current of the transmitting coil and the horizontal relative position may be pre-obtained. Specifically, the correspondence may be obtained through an experiment, and formed data is stored in the controller 200. When controlling the direct current output voltage at the receive end 102 to be fixed, the controller 200 obtains the current of the transmitting coil, and obtains, from the correspondence, the horizontal relative position corresponding to the current of the transmitting coil. When the direct current output voltage is controlled to be in a preset voltage range, it is considered that the direct current output voltage is fixed.

Figure 11A:
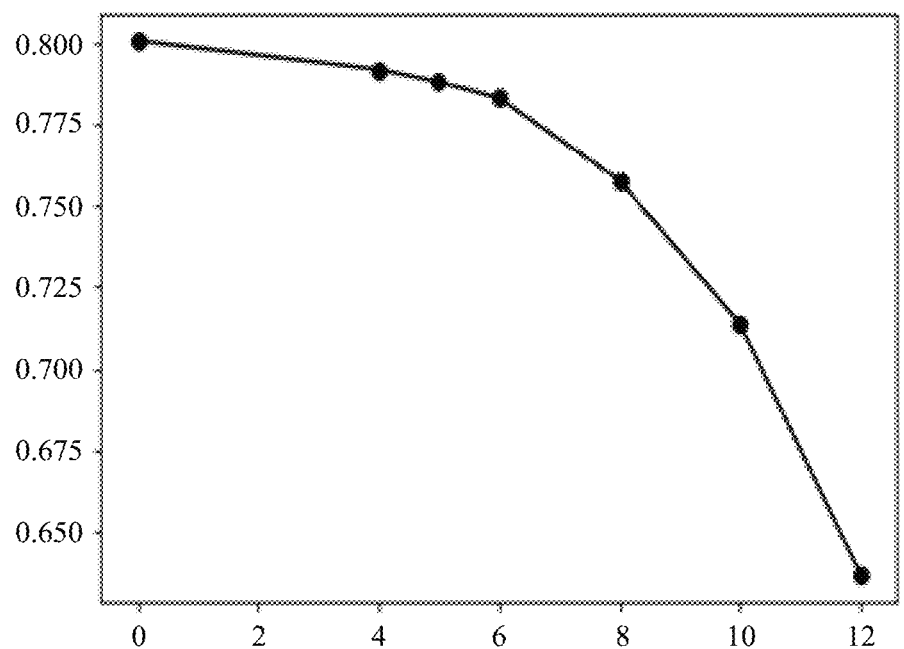
FIG. 11a is a curve in which efficiency of a wireless charging system varies with a horizontal relative position according to an embodiment of this application.

A process in which the controller 200 obtains the horizontal relative position between the transmit end 101 and the receive end 102 based on the efficiency of the wireless charging system before charging is as follows:

FIG. 11a is a curve in which the efficiency of the wireless charging system varies with the horizontal relative position according to an embodiment of this application.

A horizontal axis indicates the horizontal relative position (unit: millimeter), and a vertical axis indicates the efficiency of the wireless charging system. It can be seen from the figure that, at a same vertical relative position, after the direct current output voltage at the receive end 102 is fixed, the efficiency of the wireless charging system is negatively correlated with the horizontal relative position. In other words, a larger horizontal relative position indicates lower efficiency of the wireless charging system. Therefore, the horizontal relative position may be obtained by calculating the efficiency of the wireless charging system.

A correspondence between the efficiency of the wireless charging system and the horizontal relative position may be pre-obtained. Specifically, the correspondence may be obtained through an experiment, and formed data is stored in the controller 200. When controlling the direct current output voltage at the receive end 102 to be fixed, the controller 200 obtains the efficiency of the wireless charging system, and obtains, from the correspondence, the horizontal relative position corresponding to the efficiency of the wireless charging system. When the direct current output voltage is controlled to be in the preset voltage range, it is considered that the direct current output voltage is fixed, and the efficiency of the wireless charging system may be obtained by using a ratio of an output power at the receive end 102 to an input power at the transmit end 101.

Figure 11B:
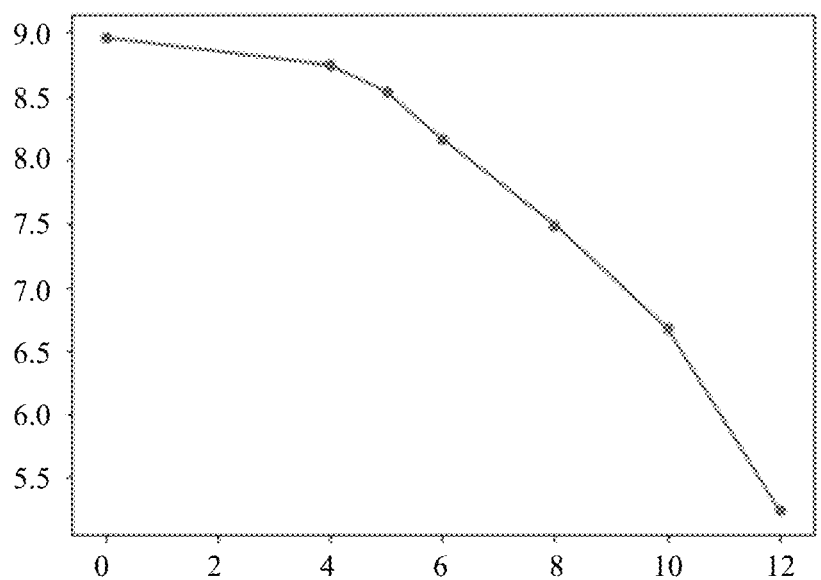
FIG. 11b is a curve in which a direct current output voltage at a receive end varies with a horizontal relative position according to an embodiment of this application.

A process in which the controller 200 obtains the horizontal relative position between the transmit end 101 and the receive end 102 based on the direct current output voltage at the receive end 102 before charging is as follows:

FIG. 11b is a curve in which the direct current output voltage at the receive end varies with the horizontal relative position according to an embodiment of this application.

A horizontal axis indicates the horizontal relative position (unit: millimeter), and a vertical axis indicates the direct current output voltage (unit: volt) at the receive end. It can be seen from the figure that, at a same vertical relative position, after the current of the transmitting coil is fixed, the direct current output voltage at the receive end 102 is negatively correlated with the horizontal relative position. In other words, a larger horizontal relative position indicates a smaller direct current output voltage at the receive end 102. Therefore, the horizontal relative position may be obtained by calculating the direct current output voltage at the receive end 102.

A correspondence between the direct current output voltage at the receive end 102 and the horizontal relative position may be pre-obtained. Specifically, the correspondence may be obtained through an experiment, and formed data is stored in the controller 200. When controlling the current of the transmitting coil to be fixed, the controller 200 obtains the direct current output voltage at the receive end 102, and obtains, from the correspondence, the horizontal relative position corresponding to the direct current output voltage at the receive end 102. When the current of the transmitting coil is controlled to be in a preset current range, it is considered that the current of the transmitting coil is fixed.

In a process in which the controller 200 determines the horizontal relative position, a person skilled in the art may select one or a plurality of the following parameters based on a specific actual application: the current of the transmitting coil before charging, the efficiency of the wireless charging system, and the direct current output voltage at the receive end 102. When the plurality of parameters are selected, after determining a horizontal relative position based on each parameter, the controller 200 performs mutual verification based on the horizontal relative position determined based on each parameter. For example, when selecting the current of the transmitting coil before charging and the efficiency of the wireless charging system to separately determine horizontal relative positions, the controller 200 may perform mutual verification based on the horizontal relative position determined by using the current of the transmitting coil before charging and the horizontal relative position determined by using the efficiency of the wireless charging system before charging.

In an embodiment of this application, the self-inductance of the transmitting coil is more affected by a change in the vertical relative position between the transmit end 101 and the receive end 102, and is less affected by a change in the horizontal relative position. Therefore, the controller 200 may pre-obtain the correspondence between the self-inductance of the transmitting coil and the vertical relative position. With reference to the correspondence pre-obtained by the controller 200, the vertical relative position is obtained by using the self-inductance of the transmitting coil. At the same vertical relative position, there are a single change relationship between the current of the transmitting coil before charging and the horizontal relative position, a single change relationship between the efficiency of the wireless charging system and the horizontal relative position, and a single change relationship between the direct current output voltage at the receive end 102 and the horizontal relative position. Therefore, the controller 200 may pre-obtain the correspondence between the current of the transmitting coil before charging, the efficiency of the wireless charging system, or the direct current output voltage at the receive end 102 and the horizontal relative position. With reference to the correspondence pre-obtained by the controller 200, the horizontal relative position is obtained by using the obtained current of the transmitting coil before charging, the obtained efficiency of the wireless charging system, or the obtained direct current output voltage at the receive end 102. A sequence of obtaining the vertical relative position and the horizontal relative position is not limited, and may be obtained sequentially or simultaneously. The vertical relative position and the horizontal relative position are combined to obtain the relative position between the transmit end 101 and the receive end 102. This further improves relative position detection accuracy.

In an embodiment, the controller 200 may be a transmit end controller, or may be a receive end controller. When the controller 200 is the transmit end controller, a receive end controller may send a parameter obtained at the receive end to the transmit end controller. For example, the receive end controller may send the direct current output voltage obtained at the receive end to the transmit end controller. When the controller 200 is the receive end controller, a transmit end controller may send a parameter obtained at the transmit end to the receive end controller. That is, obtaining the relative position may be completed by the transmit end, or may be completed by the receive end. This is not limited in this embodiment.

Apparatus Embodiment 1 describes how to obtain the relative position between the transmit end 101 and the receive end 102. The following describes a foreign object detection process with reference to the obtained relative position.

In a process in which the wireless charging apparatus performs foreign object detection, a required alternating current impedance of the transmitting coil, a required alternating current impedance of the receiving coil, and parameters such as a Q value at the transmit end 101 are all affected by the relative position between the transmit end 101 and the receive end 102. When a deviation of the relative position between the transmit end 101 and the receive end 102 is relatively large, impact of the relative position on foreign object detection is greater than impact of the alternating current impedance of the transmitting coil, the alternating current impedance of the receiving coil, and the parameters such as the Q value at the transmit end 101 on foreign object detection. Even if a foreign object exists between the transmit end 101 and the receive end 102, the wireless charging apparatus cannot detect the foreign object. Therefore, after the relative position between the transmit end 101 and the receive end 102 is determined, the wireless charging apparatus performs foreign object detection, so that foreign object detection accuracy can be improved.

The following includes three cases: Apparatus Embodiment 2, Apparatus Embodiment 3, and Apparatus Embodiment 4. For example, the controller 200 may be the transmit end controller or the receive end controller, and foreign object detection may be performed by the transmit end or by the receive end. This is not limited in the following embodiments.

The following describes Apparatus Embodiment 2.

Apparatus Embodiment 2

With reference to Apparatus Embodiment 1 of this application, Apparatus Embodiment 2 of this application provides another wireless charging apparatus. The controller 200 of the wireless charging apparatus is further configured to: obtain an alternating current impedance of the transmitting coil based on the horizontal relative position and the vertical relative position; obtain a power loss at the transmit end 101 based on the alternating current impedance of the transmitting coil and a current of the transmitting coil in a charging process; obtain a transmit power based on an input power at the transmit end 101 and the power loss at the transmit end 101; obtain a foreign object loss based on the transmit power and a receive power at the receive end 102; and when the foreign object loss is greater than a power threshold, determine that a foreign object exists between the transmit end 101 and the receive end 102.

The controller 200 may obtain the relative position between the transmit end 101 and the receive end 102 by using content described in Apparatus Embodiment 1 of this application. Details are not described herein again.

In addition, in a process in which the controller 200 obtains the relative position between the transmit end 101 and the receive end 102, a metal foreign object may affect accuracy of obtaining the relative position between the transmit end 101 and the receive end 102 by the controller 200, especially when the metal foreign object is located at a central part of the transmit end 101. Therefore, before determining the relative position between the transmit end 101 and the receive end 102, the controller 200 may first obtain the Q value at the transmit end 101, to further determine whether a metal foreign object close to the central part of the transmit end 101 or a relatively large metal foreign object exists between the transmit end 101 and the receive end 102. Specifically, a minimum Q threshold may be pre-obtained. If the obtained Q value at the transmit end 101 is less than the minimum Q threshold, it may be directly determined that the metal foreign object exists between the transmit end 101 and the receive end 102. This improves foreign object detection efficiency.

Figure 12:
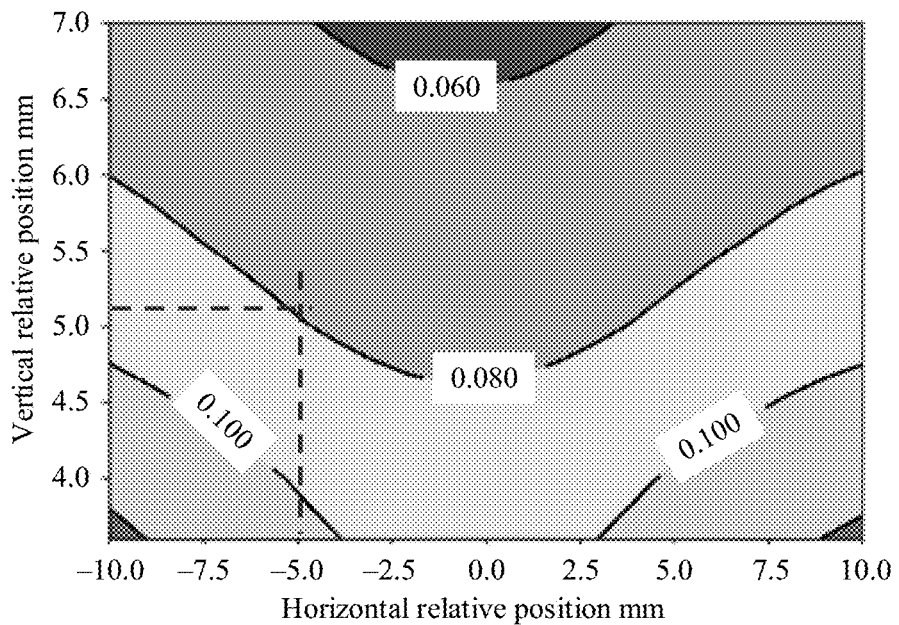
FIG. 12 is an equipotential diagram in which an alternating current impedance of a transmitting coil varies with a relative position according to an embodiment of this application.

FIG. 12 is an equipotential diagram in which the alternating current impedance of the transmitting coil varies with the relative position according to an embodiment of this application.

A horizontal axis indicates the horizontal relative position (unit: millimeter), and a vertical axis indicates the vertical relative position (unit: millimeter). An intersection point of dashed lines in the figure is a known horizontal relative position and a known vertical relative position, and an alternating current impedance of the transmitting coil is determined when the foreign object does not exist between the transmit end 101 and the receive end 102. It can be seen from the figure that the relative position between the transmit end 101 and the receive end 102 affects the alternating current impedance of the transmitting coil. Therefore, the relative position between the transmit end 101 and the receive end 102 needs to be obtained before foreign object detection. Then, the controller 200 obtains the alternating current impedance of the transmitting coil in the relative position based on the relative position, so that the controller 200 obtains the power loss at the transmit end 101 based on the current of the transmitting coil in the charging process and the obtained alternating current impedance of the transmitting coil.

A correspondence between the relative position between the transmit end 101 and the receive end 102 and the alternating current impedance of the transmitting coil may be pre-obtained. Specifically, the correspondence may be obtained through an experiment, and formed data is stored in the controller 200. With reference to the pre-obtained correspondence, after obtaining the relative position between the transmit end 101 and the receive end 102, the controller 200 obtains, from the correspondence, the alternating current impedance of the transmitting coil corresponding to the relative position.

In addition, the relative position between the transmit end 101 and the receive end 102 further affects the alternating current impedance of the receiving coil. Similarly, a correspondence between the relative position between the transmit end 101 and the receive end 102 and the alternating current impedance of the receiving coil may be pre-obtained. In an embodiment, the correspondence may be obtained through an experiment, and formed data is stored in the controller 200. With reference to the pre-obtained correspondence, after obtaining the relative position between the transmit end 101 and the receive end 102, the controller 200 obtains, from the correspondence, the alternating current impedance of the receiving coil corresponding to the relative position.

A process in which the controller 200 obtains the foreign object loss is similar to a process in which the power loss is obtained in the foregoing power loss method. To be specific, the transmit power at the transmit end 101 and the receive power at the receive end 102 are first obtained, and then the foreign object loss is obtained based on a difference between the transmit power and the receive power. Differences lie in a process of obtaining the transmit power and a process of obtaining the receive power.

The following describes the difference between the process in which the controller 200 obtains the transmit power and a process in which the controller 200 obtains the transmit power in the foregoing power loss method.

When the transmit power is calculated in the foregoing power loss method, the transmit power is determined by using the input power at the transmit end 101 and the power loss at the transmit end 101. The power loss at the transmit end 101 is determined by using the coil resistance at the transmit end 101 in the wireless charging space range and the current of the transmitting coil in the charging process. However, an error of the coil resistance at the transmit end 101 is relatively large, and the linear fitting method based on power level classification may cause the relatively large error in the calculated power loss at the transmit end 101.

Therefore, in Apparatus Embodiment 2 of this application, the controller 200 first obtains the alternating current impedance of the receiving coil corresponding to the relative position between the transmit end 101 and the receive end 102, and then obtains the power loss at the transmit end 101 by using the alternating current impedance of the receiving coil and the current of the transmitting coil in the charging process. Because the alternating current impedance of the transmitting coil is obtained by the controller 200 by using the relative position between the transmit end 101 and the receive end 102, the error of the alternating current impedance of the transmitting coil is relatively small, and an error of obtaining the power loss at the transmit end 101 by the controller 200 is relatively small. Therefore, an error of the obtained transmit power can be reduced.

The following describes the difference between the process in which the controller 200 obtains the receive power and a process in which the controller 200 obtains the receive power in the foregoing power loss method.

When the receive power is calculated in the foregoing power loss method, the receive power is determined by using the output power at the receive end 102 and the power loss at the receive end 102. The power loss at the receive end 102 is determined by using the coil resistance at the receive end 102 in the wireless charging space range and the current of the receiving coil in the charging process. However, there may be an error in the coil resistance at the receive end 102.

Therefore, to further improve accuracy of obtaining the foreign object loss by the controller 200, the controller 200 may obtain, based on a pre-obtained correspondence between the relative position between the transmit end 101 and the receive end 102 and the alternating current impedance of the receiving coil, an alternating current impedance with a relatively small error of the receiving coil, and obtain a power loss at the receive end 102 by using the alternating current impedance with the relatively small error of the receiving coil and the current of the receiving coil in the charging process. In this way, an error of the calculated receive power is also relatively small, and an error of an obtained foreign object loss is also relatively small, thereby improving accuracy of the obtained foreign object loss.

Although there may be the error in the coil resistance at the receive end 102, considering that the alternating current impedance of the receiving coil has relatively little impact on calculation of the power loss at the receive end 102, there is also relatively little impact on calculation of the receive power.

Therefore, to further improve efficiency of obtaining the power loss by the controller 200, the controller 200 may directly use the coil resistance at the receive end 102 as the alternating current impedance of the receiving coil, thereby simplifying a process of obtaining the receive power and improving efficiency of obtaining the receive power.

After obtaining the transmit power and the receive power, the controller 200 obtains the foreign object loss based on the transmit power and the receive power, and when the foreign object loss is greater than the power threshold, it is determined that the foreign object exists between the transmit end 101 and the receive end 102.

In an embodiment of this application, the controller 200 obtains the power loss at the transmit end 101 based on the alternating current impedance of the transmitting coil and the current of the transmitting coil in the charging process. The alternating current impedance of the transmitting coil is obtained based on the relative position between the transmit end 101 and the receive end 102, instead of directly using the coil resistance at the transmit end 101 as an alternating current impedance at the transmit end 101. In this way, an error of obtaining the alternating current impedance at the transmit end 101 by the controller 200 is reduced, the error of the power loss at the transmit end 101 is further reduced, and the error of the transmit power is further reduced. In addition, the controller 200 obtains the alternating current impedance of the receiving coil based on the horizontal relative position and the vertical relative position, obtains the power loss at the receive end 102 based on the alternating current impedance of the receiving coil and the current of the receiving coil in the charging process, and obtains the receive power at the receive end 102 based on the power loss at the receive end 102 and the output power at the receive end 102. This further reduces the error of the receive power. The controller 200 obtains a foreign object loss based on a transmit power with a relatively low error and a receive power with a relatively low error, so that an error of the foreign object loss is also relatively low. This further improves foreign object detection accuracy.

The following describes Apparatus Embodiment 3.

Apparatus Embodiment 3

With reference to Apparatus Embodiment 1 of this application, Apparatus Embodiment 3 of this application provides still another wireless charging apparatus.

The controller 200 of the wireless charging apparatus is further configured to: obtain the Q value at the transmit end 101; obtain a corresponding Q value threshold based on the horizontal relative position and the vertical relative position; and when the Q value at the transmit end 101 is less than or equal to the Q value threshold, determine that the foreign object exists between the transmit end 101 and the receive end 102. A process in which the controller 200 obtains the Q value at the transmit end 101 is similar to a process in which the Q value is obtained in the foregoing Q value method, and details are not described herein again.

The following describes in detail a process in which the controller 200 obtains the corresponding Q value threshold based on the horizontal relative position and the vertical relative position.

Figure 13A:
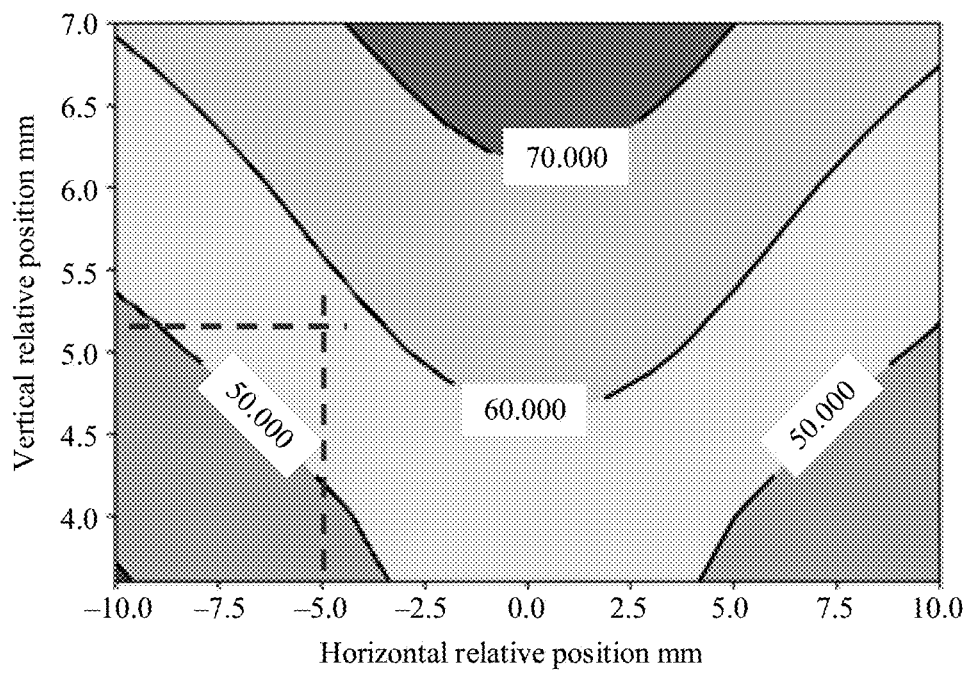
FIG. 13a is an equipotential diagram in which a Q value at a transmit end varies with a relative position when a foreign object does not exist according to an embodiment of this application.

FIG. 13a is an equipotential diagram in which the Q value at the transmit end varies with the relative position when the foreign object does not exist according to an embodiment of this application.

A horizontal axis indicates the horizontal relative position (unit: millimeter), and a vertical axis indicates the vertical relative position (unit: millimeter). An intersection point of dashed lines in the figure is a known horizontal relative position and a known vertical relative position, and the Q value at the transmit end 101 is determined when the foreign object does not exist between the transmit end 101 and the receive end 102. It can be seen from the figure that when the foreign object does not exist between the transmit end 101 and the receive end 102, different relative positions correspond to different Q values at the transmit end 101. Therefore, when the foreign object does not exist between the transmit end 101 and the receive end 102, a Q value at the transmit end 101 corresponding to a current relative position may be detected, and the Q value is used as a Q value threshold corresponding to the current relative position. To further improve accuracy of a set Q value threshold and reduce a detection error, the detected Q value at the transmit end 101 may be further corrected, and a corrected Q value at the transmit end 101 is used as the Q value threshold.

A correspondence between the relative position between the transmit end 101 and the receive end 102 and the Q value threshold may be pre-obtained. Specifically, the correspondence may be obtained through an experiment, and formed data is stored in the controller 200. With reference to the pre-obtained correspondence, after obtaining the relative position, the controller 200 obtains, from the correspondence, the Q value threshold corresponding to the relative position.

After obtaining the Q value threshold at the current relative position, if the Q value at the transmit end 101 is less than or equal to the Q value threshold, the controller 200 may determine that the foreign object exists between the transmit end 101 and the receive end 102. It is because of existence of the foreign object that eddy current losses caused by the foreign object cause the Q value at the transmit end 101 to decrease.

When the Q value at the transmit end 101 is greater than the Q value threshold, the alternating current impedance of the transmitting coil is obtained based on the horizontal relative position and the vertical relative position. A power loss at the transmit end 101 is obtained based on the alternating current impedance of the transmitting coil and a current of the transmitting coil in a charging process. A transmit power is obtained based on the input power at the transmit end 101 and the power loss at the transmit end 101. A power difference between the transmit power and a receive power is obtained based on the transmit power and the receive power at the receive end 102. Power consumption calibration is performed based on the power difference. A foreign object loss is obtained by using calibrated power consumption. A process in which the controller 200 obtains the foreign object loss is similar to the process described in Apparatus Embodiment 2 of this application, and details are not described herein again. A difference between obtaining the foreign object loss by the controller 200 in Apparatus Embodiment 3 of this application and obtaining the foreign object loss by the controller 200 in Apparatus Embodiment 2 of this application lies in: performing the power consumption calibration by using the power difference between the transmit power and the receive power, and obtaining the foreign object loss by using the calibrated power consumption. The power consumption calibration performed based on the power difference is a relatively mature technology, and a power consumption calibration process is not described herein in detail.

After obtaining the foreign object loss, if the foreign object loss is greater than a power threshold, the controller 200 may determine that the foreign object exists between the transmit end 101 and the receive end 102. It is because of the existence of the foreign object that the foreign object generates the eddy current losses and the eddy current losses cause the foreign object loss to be higher than a normal value and further be greater than the power threshold.

In an embodiment of this application, this prevents all obtained Q values at the transmit end 101 from being compared with a same Q value threshold. The controller 200 uses a Q value at the transmit end 101 obtained when the foreign object does not exist between the transmit end 101 and the receive end 102 as the Q value threshold at the horizontal relative position and the vertical relative position. That is, different relative positions correspond to different Q value thresholds. The controller 200 obtains the Q value threshold at the relative position based on the relative position, and compares the Q value at the transmit end 101 with the Q value threshold at the relative position. This improves foreign object detection accuracy. When the foreign object is not detected through Q-value FOD, the controller 200 obtains an alternating current impedance at the transmit end 101 corresponding to the relative position based on the relative position, instead of a coil impedance at the transmit end 101. Different relative positions correspond to different alternating current impedances at the transmit end 101. An alternating current impedance with a relatively small error at the transmit end 101 is used, to improve accuracy of obtaining a power loss at the transmit end 101, so that an error of an obtained foreign object loss is relatively small, and the foreign object detection accuracy is further improved.

The following describes Apparatus Embodiment 4.

Apparatus Embodiment 4

With reference to Apparatus Embodiment 1 of this application, Apparatus Embodiment 4 of this application provides yet another wireless charging apparatus.

Figure 13B:
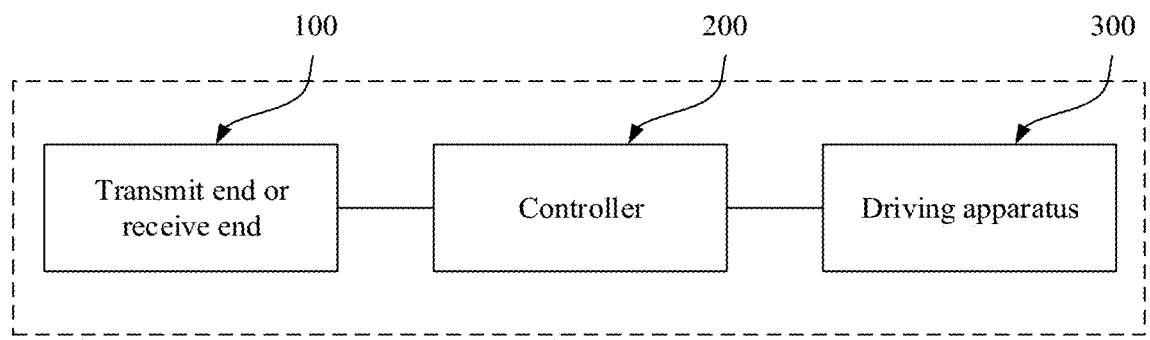
FIG. 13b is a schematic diagram of another wireless charging apparatus according to an embodiment of this application.

FIG. 13b is a schematic diagram of another wireless charging apparatus according to an embodiment of this application.

The wireless charging apparatus further includes a driving apparatus 300.

The controller 200 is further configured to: before determining that the foreign object exists between the transmit end 101 and the receive end 102, control, based on the vertical relative position and the horizontal relative position, the driving apparatus 300 to drive the transmitting coil to move, so that the geometric center of the transmitting coil coincides with the geometric center of the receiving coil at the receive end 102.

The following describes in detail a process in which the controller 200 controls the driving apparatus 300 to drive the geometric center of the transmitting coil to coincide with the geometric center of the receiving coil.

After obtaining the relative position between the transmit end 101 and the receive end 102, the controller 200 may send an instruction to the driving apparatus 300, to control the driving apparatus 300 to drive the transmitting coil to move based on the vertical relative position and the horizontal relative position, so as to reduce a deviation of the relative position between the transmitting coil and the receiving coil and enable the geometric center of the transmitting coil to coincide with the geometric center of the receiving coil as much as possible.

The controller 200 controls the driving apparatus 300 to enable the geometric center of the transmitting coil to coincide with the geometric center of the receiving coil, and then performs foreign object detection through Q-value FOD or by using a power loss method.

After the geometric center of the transmitting coil coincides with the geometric center of the receiving coil, there are two manners for performing foreign object detection through the Q-value FOD.

The following describes a first manner. In a process in which the controller 200 controls the driving apparatus 300 for coincidence, a relatively small error may exist, and it may be impossible to ensure that the geometric center of the transmitting coil completely coincides with the geometric center of the receiving coil. Therefore, to further improve accuracy of determining whether the foreign object exists between the transmit end 101 and the receive end 102 by the controller 200, the controller 200 may further obtain a Q value threshold obtained after the geometric center of the transmitting coil coincides with the geometric center of the receiving coil at the receive end based on a horizontal relative position obtained after the geometric center of the transmitting coil coincides with the geometric center of the receiving coil at the receive end and a vertical relative position obtained after the geometric center of the transmitting coil coincides with the geometric center of the receiving coil at the receive end after obtaining the Q value at the transmit end 101, and compare the Q value at the transmit end 101 with the Q value threshold obtained after the geometric center of the transmitting coil coincides with the geometric center of the receiving coil at the receive end. Further, impact of the relatively small error generated in the coincidence process on foreign object detection is avoided, and the accuracy of determining whether the foreign object exists between the transmit end 101 and the receive end 102 by the controller 200 is further improved.

The following describes a second manner.

Because the geometric center of the transmitting coil nearly coincides with the geometric center of the receiving coil, impact of the relative position between the transmitting coil and the receiving coil on foreign object detection performed through the Q-value FOD may not be considered. Therefore, the controller 200 may alternatively directly compare the Q value at the transmit end 101 with a Q value threshold obtained after the geometric center of the transmitting coil coincides with the geometric center of the receiving coil at the receive end that is uniformly calibrated. There is no need to obtain the Q value threshold obtained after the geometric center of the transmitting coil coincides with the geometric center of the receiving coil at the receive end corresponding to the relative position based on a correspondence between the relative position between the transmit end 101 and the receive end 102 and the Q value threshold obtained after the geometric center of the transmitting coil coincides with the geometric center of the receiving coil at the receive end, and then compare the Q value at the transmit end 101 with the Q value threshold obtained after the geometric center of the transmitting coil coincides with the geometric center of the receiving coil at the receive end corresponding to the relative position. A process of obtaining the Q value threshold obtained after the geometric center of the transmitting coil coincides with the geometric center of the receiving coil at the receive end is simplified, a determining operation in the Q-value FOD is simplified, and efficiency of determining whether the foreign object exists between the transmit end 101 and the receive end 102 by the controller 200 is further improved.

After the geometric center of the transmitting coil coincides with the geometric center of the receiving coil, there are two manners for performing foreign object detection by using the power loss method. The following describes a first manner.

In a process in which the controller 200 controls the driving apparatus 300 for coincidence, a relatively small error may exist, and it may be impossible to ensure that the geometric center of the transmitting coil completely coincides with the geometric center of the receiving coil. Therefore, to further improve accuracy of determining whether the foreign object exists between the transmit end 101 and the receive end 102 by the controller 200, the controller 200 may further obtain, based on a horizontal relative position obtained after the geometric center of the transmitting coil coincides with the geometric center of the receiving coil at the receive end and a vertical relative position obtained after the geometric center of the transmitting coil coincides with the geometric center of the receiving coil at the receive end, an alternating current impedance that is of the transmitting coil and that is obtained after the geometric center of the transmitting coil coincides with the geometric center of the receiving coil at the receive end, and obtain a power loss at the transmit end 101 based on the alternating current impedance that is of the transmitting coil and that is obtained after the geometric center of the transmitting coil coincides with the geometric center of the receiving coil at the receive end and the current of the transmitting coil. Further, impact of the relatively small error generated in the coincidence process on foreign object detection is avoided, and the accuracy of determining whether the foreign object exists between the transmit end 101 and the receive end 102 by the controller 200 is further improved.

The following describes a second manner.

Because the geometric center of the transmitting coil nearly coincides with the geometric center of the receiving coil, impact of the relative position between the transmitting coil and the receiving coil on foreign object detection performed by using the power loss method may not be considered. Therefore, when obtaining the power loss at the transmit end 101, the controller 200 may further directly use a coil resistance at the transmit end 101 as the alternating current impedance of the transmitting coil. There is no need to obtain an alternating current impedance of the transmitting coil corresponding to a current relative position based on a correspondence between the relative position between the transmit end 101 and the receive end 102 and the alternating current impedance of the transmitting coil, and obtain the power loss at the transmit end 101 based on the alternating current impedance of the transmitting coil and the current of the transmitting coil. A process of obtaining the power loss at the transmit end 101 is simplified, a determining process of the power loss method is simplified, and efficiency of determining whether the foreign object exists between the transmit end 101 and the receive end 102 by the controller 200 is further improved.

A process in which the controller 200 obtains the power loss at the receive end 102 is similar to a process in which the controller 200 obtains the power loss at the transmit end 101, and details are not described herein again.

In an embodiment of this application, after obtaining the relative position between the transmit end 101 and the receive end 102, the controller 200 may control, based on the relative position, the driving apparatus 300 to drive the transmitting coil to move, so that the geometric center of the transmitting coil coincides with the geometric center of the receiving coil. Therefore, a Q value threshold corresponding to each relative position, an alternating current impedance of the receiving coil, and an alternating current impedance of the transmitting coil do not need to be set based on the relative position. The controller 200 may perform foreign object detection based on the unified Q value threshold, the alternating current impedance of the receiving coil, and the alternating current impedance of the transmitting coil. This improves a capability and efficiency of foreign object detection.

In all of the foregoing embodiments, the process of performing foreign object detection before charging is described. In Apparatus Embodiment 5 of this application, how to perform foreign object detection after the wireless charging apparatus enters a power transmission phase is described in detail below.

Apparatus Embodiment 5

If the relative position between the transmit end 101 and the receive end 102 changes after the wireless charging apparatus enters the power transmission phase, an error in performing foreign object detection by the controller 200 based on parameters such as the alternating current impedance of the transmitting coil and the alternating current impedance of the receiving coil at the original position is relatively large. A case in which the controller 200 falsely reports the foreign object or the foreign object exists but cannot be detected may occur.

Therefore, the controller 200 detects, at an interval of a preset period or in real time, whether the relative position between the transmit end 101 and the receive end 102 changes.

The following describes in detail how the controller 200 determines that the relative position between the transmit end 101 and the receive end 102 changes.

The controller 200 determines, based on the current of the transmitting coil before charging, the efficiency of the wireless charging system before charging, or the direct current output voltage at the receive end 102 before charging, and a current of the transmitting coil in the power transmission phase, efficiency of the wireless charging system in the power transmission phase, or a direct current output voltage at the receive end 102 in the power transmission phase, whether the relative position between the transmit end 101 and the receive end 102 changes. The following provides specific descriptions by using an example in which the controller 200 determines, based on the current of the transmitting coil before charging and the current of the transmitting coil in the power transmission phase, whether the relative position between the transmit end 101 and the receive end 102 changes.

The controller 200 may record the current of the transmitting coil before charging corresponding to the relative position between the transmit end 101 and the receive end 102. After the wireless charging apparatus enters the power transmission phase, the controller 200 obtains the current of the transmitting coil at the interval of the preset period or in real time, and when a difference between the current of the transmitting coil detected in the power transmission phase and the current of the transmitting coil before charging exceeds a preset current threshold, determines that the relative position between the transmit end 101 and the receive end 102 changes.

A process in which the controller 200 determines, based on the efficiency of the wireless charging system before charging and the efficiency of the wireless charging system in the power transmission phase, whether the relative position between the transmit end 101 and the receive end 102 changes or a process in which the controller 200 determines, based on the direct current output voltage at the receive end 102 before charging and the direct current output voltage at the receive end 102 in the power transmission phase is similar to the foregoing process, and details are not described herein again.

After determining that the relative position between the transmit end 101 and the receive end 102 changes, the controller 200 stops power transmission, and re-determines a relative position between the transmit end 101 and the receive end 102. A specific process of determining the relative position between the transmit end 101 and the receive end 102 is similar to the process in Apparatus Embodiment 1 of this application, and details are not described herein again.

A parameter used by the controller 200 to determine whether the relative position between the transmit end 101 and the receive end 102 changes is the current of the transmitting coil in the power transmission phase, the efficiency of the wireless charging system in the power transmission phase, or the direct current output voltage at the receive end 102 in the power transmission phase. However, the foregoing parameters may also be affected by the foreign object between the transmit end 101 and the receive end 102. Therefore, the controller 200 compares the re-determined relative position with the relative position determined before charging. If the controller 200 determines that the re-determined relative position is consistent with the relative position determined before charging, the controller 200 determines that the foreign object exists between the transmit end 101 and the receive end 102. If the controller 200 determines that the re-determined relative position is inconsistent with the relative position determined before charging, the controller 200 performs foreign object detection according to the process in Apparatus Embodiment 2, 3, or 4 of this application.

In an embodiment of this application, after the wireless charging apparatus enters the power transmission phase, the controller 200 detects, at the interval of the preset period or in real time, whether the relative position between the transmit end 101 and the receive end 102 changes, to avoid still using the parameters such as the alternating current impedance of the transmitting coil and the alternating current impedance of the receiving coil at the original position to perform foreign object detection when the relative position between the transmit end 101 and the receive end 102 changes in the power transmission phase, thereby avoiding a case in which the foreign object cannot be detected or foreign object detection accuracy is poor. The controller 200 re-determines the relative position between the transmit end 101 and the receive end 102, and determines whether the foreign object exists based on the re-determined relative position and the relative position determined before charging. This effectively avoids a case in which foreign object detection cannot be performed after the wireless charging apparatus enters the power transmission phase, and further improves a foreign object detection capability and accuracy in a wireless charging process.

In addition, the process in which the controller 200 of the wireless charging apparatus obtains the relative position between the transmit end 101 and the receive end 102 may further include the following two manners. The following separately describes in detail the two manners in Apparatus Embodiment 6 and Apparatus Embodiment 8.

Apparatus Embodiment 6

The controller 200 of the wireless charging apparatus is further configured to obtain the relative position between the transmit end 101 and the receive end 102 based on the self-inductance of the transmitting coil and at least one parameter.

The at least one parameter includes a coupling coefficient between the transmitting coil and the receiving coil before charging and a coil mutual inductance between the transmitting coil and the receiving coil before charging.

The Applicant finds, through research, that each of the following parameters included in the wireless charging apparatus varies homogeneously with the change in the relative position between the transmit end 101 and the receive end 102. The following parameters include the coupling coefficient between the transmitting coil and the receiving coil, and the coil mutual inductance between the transmitting coil and the receiving coil. Before performing wireless power transmission, the wireless charging apparatus may directly or indirectly obtain the coupling coefficient between the transmitting coil and the receiving coil and the coil mutual inductance between the transmitting coil and the receiving coil. Then, the relative position between the transmit end 101 and the receive end 102 is obtained based on a pre-obtained relationship between a change in the foregoing parameter and the relative position.

In an embodiment of this application, the controller 200 of the wireless charging apparatus obtains the relative position between the transmit end and the receive end in the following two manners:

In a first manner, the controller 200 is configured to obtain the vertical relative position based on the self-inductance of the transmitting coil, and obtain the horizontal relative position based on the coupling coefficient between the transmitting coil and the receiving coil before charging or the coil mutual inductance between the transmitting coil and the receiving coil before charging. A process in which the controller 200 obtains the vertical relative position between the transmit end 101 and the receive end 102 based on the self-inductance of the transmitting coil is similar to the process in Apparatus Embodiment 1 of this application, and details are not described herein again. A specific process in which the controller 200 obtains the horizontal relative position between the transmit end 101 and the receive end 102 based on the coupling coefficient between the transmitting coil and the receiving coil before charging, and a specific process in which the controller 200 obtains the horizontal relative position between the transmit end 101 and the receive end 102 based on the coil mutual inductance between the transmitting coil and the receiving coil before charging are described in detail later.

In a second manner, the controller 200 is configured to directly obtain the relative position between the transmit end 101 and the receive end 102 through three-dimensional positioning based on the self-inductance of the transmitting coil and at least one parameter.

The at least one parameter includes a coupling coefficient between the transmitting coil and the receiving coil before charging and a coil mutual inductance between the transmitting coil and the receiving coil before charging.

The following provides detailed descriptions by using an example in which the controller 200 obtains the relative position between the transmit end 101 and the receive end 102 based on the self-inductance of the transmitting coil before charging and the coupling coefficient between the transmitting coil and the receiving coil.

A three-dimensional correspondence between the self-inductance of the transmitting coil, the coupling coefficient between the transmitting coil and the receiving coil, and the relative position may be pre-obtained. After obtaining the self-inductance of the transmitting coil and the coupling coefficient between the transmitting coil and the receiving coil, the controller 200 obtains, from the three-dimensional correspondence, the relative position corresponding to the self-inductance of the transmitting coil and the coupling coefficient between the transmitting coil and the receiving coil.

A principle in which the controller 200 obtains the relative position based on the self-inductance of the transmitting coil and the coil mutual inductance between the transmitting coil and the receiving coil is similar to the foregoing process, and details are not described herein again.

In an embodiment of this application, both the self-inductance of the transmitting coil and the coupling coefficient between the transmitting coil and the receiving coil before charging are affected by the relative position between the transmit end 101 and the receive end 102. Therefore, the controller 200 may pre-obtain a relationship between the self-inductance of the transmitting coil, the coupling coefficient between the transmitting coil and the receiving coil before charging, and the relative position. With reference to the relationship, after obtaining the self-inductance of the transmitting coil and the coupling coefficient between the transmitting coil and the receiving coil before charging, the controller 200 may determine the relative position corresponding to the self-inductance of the transmitting coil and the coupling coefficient. Based on a similar principle, the controller 200 may alternatively determine the relative position by using the self-inductance of the transmitting coil and the mutual inductance. This further improves the relative position detection efficiency.

The following describes the first manner.

Figure 14:
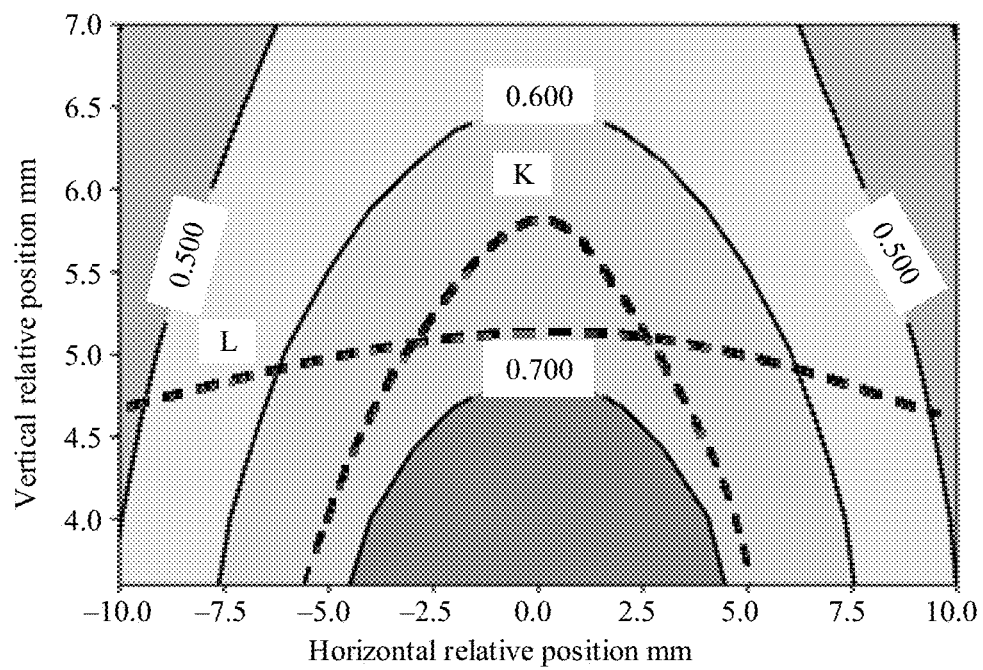
FIG. 14 is an equipotential diagram in which a coupling coefficient between a transmitting coil and a receiving coil varies with a relative position according to an embodiment of this application.

A process in which the controller 200 obtains the horizontal relative position between the transmit end 101 and the receive end 102 based on the coupling coefficient between the transmitting coil and the receiving coil before charging is as follows:

FIG. 14 is an equipotential diagram in which the coupling coefficient between the transmitting coil and the receiving coil varies with the relative position according to an embodiment of this application.

A horizontal axis indicates the horizontal relative position (unit: millimeter), and a vertical axis indicates the vertical relative position (unit: millimeter). A dashed line L and a dashed line K in the figure respectively indicates self-inductances of the transmitting coil and coupling coefficients between the transmitting coil and the receiving coil that are obtained at a same relative position. It can be seen from the figure that the coupling coefficient between the transmitting coil and the receiving coil varies slightly with the vertical relative position, and varies more with the horizontal relative position. The coupling coefficient between the transmitting coil and the receiving coil is negatively correlated with the horizontal relative position, and a larger horizontal relative position indicates a smaller coupling coefficient between the transmitting coil and the receiving coil. Therefore, the horizontal relative position may be obtained by obtaining the coupling coefficient between the transmitting coil and the receiving coil.

A correspondence between the coupling coefficient and the horizontal relative position may be pre-obtained. Specifically, the correspondence may be obtained through an experiment, and formed data is stored in the controller. After obtaining the coupling coefficient, the controller 200 obtains, from the correspondence, the horizontal relative position corresponding to the coupling coefficient.

Figure 15:
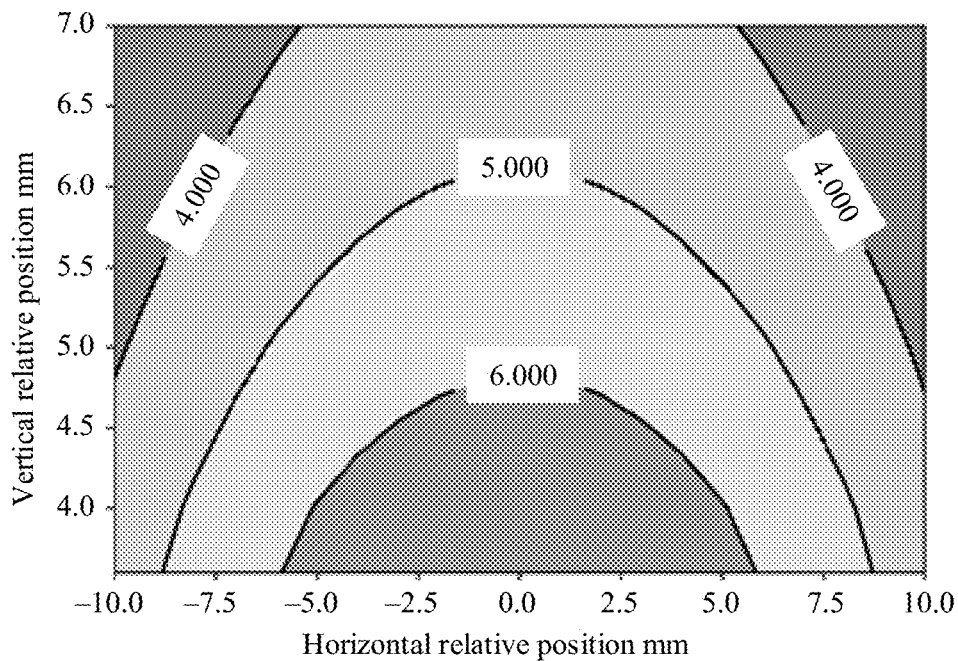
FIG. 15 is an equipotential diagram in which a coil mutual inductance between a transmitting coil and a receiving coil varies with a relative position according to an embodiment of this application.

A process in which the controller 200 obtains the horizontal relative position between the transmit end 101 and the receive end 102 based on the coil mutual inductance between the transmitting coil and the receiving coil before charging is as follows:

FIG. 15 is an equipotential diagram in which the coil mutual inductance between the transmitting coil and the receiving coil varies with the relative position according to an embodiment of this application.

A horizontal axis is the horizontal relative position (unit: millimeter), and a vertical axis indicates the vertical relative position (unit: millimeter). It can be seen from the figure that the coil mutual inductance between the transmitting coil and the receiving coil varies slightly with the vertical relative position, and varies more with the horizontal relative position. The coil mutual inductance between the transmitting coil and the receiving coil is negatively correlated with the horizontal relative position, and a larger horizontal relative position indicates a smaller coil mutual inductance between the transmitting coil and the receiving coil. Therefore, the horizontal relative position may be obtained by obtaining the coil mutual inductance between the transmitting coil and the receiving coil.

A correspondence between the coil mutual inductance and the horizontal relative position may be pre-obtained. Specifically, the correspondence may be obtained through an experiment, and formed data is stored in the controller 200. After obtaining the coil mutual inductance, the controller 200 obtains, from the correspondence, the horizontal relative position corresponding to the coil mutual inductance.

The following describes in detail how the controller 200 obtains the coupling coefficient between the transmitting coil and the receiving coil and the coil mutual inductance between the transmitting coil and the receiving coil.

Figure 16:
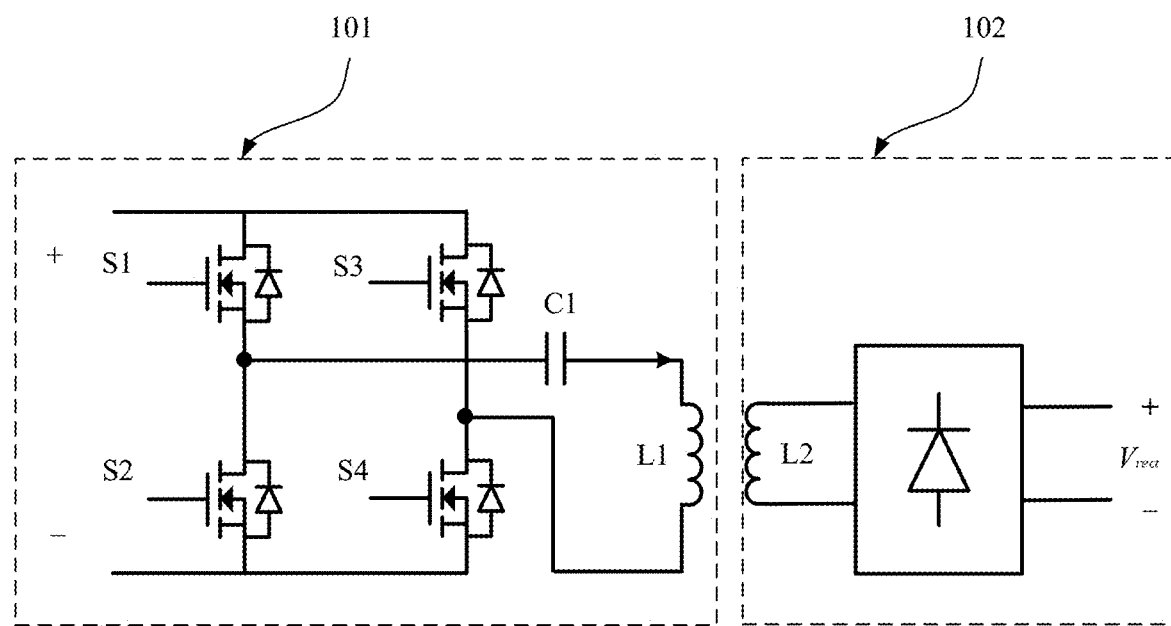
FIG. 16 is a schematic diagram of a coupling coefficient detection circuit according to an embodiment of this application.

FIG. 16 is a schematic diagram of a coupling coefficient detection circuit according to an embodiment of this application.

The coupling coefficient detection circuit includes the transmit end 101 shown in FIG. 8.

A receive end 102 of the coupling coefficient detection circuit includes a receive end resonant network and a rectifier circuit.

The receive end resonant network includes a receiving coil $L_2$.

The controller 200 supplies the direct current voltage to the input end of the full-bridge circuit at the transmit end 101, so that the full-bridge circuit is in an inverter working state; controls the receive end 102 to be in a no-load state; and obtains a direct current voltage output by the rectifier circuit and a current of the transmitting coil. A coupling coefficient between the transmitting coil and the receiving coil may be obtained by using the following formula:

$$k = \frac{V_{rect}}{\omega \sqrt{L_1 L_2}\, I_1} \cdot \alpha,$$

where $V_{rect}$ is the direct current voltage output by the rectifier circuit; $I_1$ is the current of the transmitting coil, $\omega$ is a working frequency and is known, and $\alpha$ is a coefficient and may be obtained through an experiment. There is a preset proportional coefficient between the self-inductance $L_1$ of the transmitting coil and the self-inductance $L_2$ of the receiving coil. After the self-inductance $L_1$ of the transmitting coil is obtained, the self-inductance $L_2$ of the receiving coil may be directly obtained by using the preset proportional coefficient.

After obtaining the coupling coefficient between the transmitting coil and the receiving coil, the controller 200 may obtain a coil mutual inductance $M_1$ between the transmitting coil and the receiving coil by using the following formula:

$$M_1 = \frac{V_{rect}}{\omega I_1} \cdot \alpha,$$

where $V_{rect}$ is the direct current voltage output by the rectifier circuit, $I_1$ is the current of the transmitting coil, $\omega$ is the working frequency and is known, and $\alpha$ is the coefficient and may be obtained through the experiment.

In the foregoing calculation formulas for the coupling coefficient between the transmitting coil and the receiving coil and the coil mutual inductance between the transmitting coil and the receiving coil, $\alpha$ may be measured through the experiment. To reduce impact of factors such as a harmonic generated in the circuit in a process of detecting the coupling coefficient, $\alpha$ may be set to $\pi/2\sqrt{2}$. A person skilled in the art may further correct a value of $\alpha$ to further improve accuracy of detecting the coupling coefficient.

In the process in which the controller 200 determines the horizontal relative position, a person skilled in the art may select one or a plurality of the following parameters based on a specific actual application: the coupling coefficient between the transmitting coil and the receiving coil and the coil mutual inductance between the transmitting coil and the receiving coil. When the plurality of parameters are selected, after determining a horizontal relative position based on each parameter, the controller 200 performs mutual verification based on the horizontal relative position determined based on each parameter. For example, when selecting the coupling coefficient and the coil mutual inductance to separately determine horizontal relative positions, the controller 200 may perform mutual verification based on the horizontal relative position determined by using the coupling coefficient and the horizontal relative position determined by using the coil mutual inductance.

In an embodiment of this application, the self-inductance of the transmitting coil is more affected by the change in the vertical relative position between the transmit end 101 and the receive end 102, and is less affected by the change in the horizontal relative position. Therefore, the controller 200 may pre-obtain the correspondence between the self-inductance of the transmitting coil and the vertical relative position. With reference to the correspondence pre-obtained by the controller 200, the vertical relative position is obtained by using the self-inductance of the transmitting coil. The coupling coefficient between the transmitting coil and the receiving coil before charging is more affected by the horizontal relative position between the transmit end 101 and the receive end 102, and is less affected by the vertical relative position. Therefore, the controller 200 may pre-obtain a correspondence between the coupling coefficient before charging and the horizontal relative position. With reference to the correspondence pre-obtained by the controller 200, the horizontal relative position is obtained by using the coupling coefficient before charging. The controller 200 may alternatively obtain the horizontal relative position based on the coil mutual inductance between the transmitting coil and the receiving coil before charging. A sequence of obtaining the vertical relative position and the horizontal relative position is not limited, and may be obtained sequentially or simultaneously. The vertical relative position and the horizontal relative position are combined to obtain the relative position between the transmit end 101 and the receive end 102. This further improves the relative position detection accuracy.

After the relative position between the transmit end 101 and the receive end 102 is obtained by using Apparatus Embodiment 6, foreign object detection before charging is performed. The following describes in detail how to perform foreign object detection after the wireless charging apparatus enters the power transmission phase in Apparatus Embodiment 7 of this application.

Apparatus Embodiment 7

If the relative position between the transmit end 101 and the receive end 102 changes after the wireless charging apparatus enters the power transmission phase, the error in performing foreign object detection by the controller 200 based on the parameters such as the alternating current impedance of the transmitting coil and the alternating current impedance of the receiving coil at the original position is relatively large. The case in which the controller 200 falsely reports the foreign object or the foreign object exists but cannot be detected may occur.

Therefore, the controller 200 detects, at an interval of a preset period or in real time, whether the relative position between the transmit end 101 and the receive end 102 changes.

The following describes in detail how the controller 200 determines that the relative position between the transmit end 101 and the receive end 102 changes.

The controller 200 may record the self-inductance of the transmitting coil before charging, the self-inductance of the receiving coil, the coupling coefficient k between the transmitting coil and the receiving coil, and the coil mutual inductance $M_1$, and obtain the direct current voltage $V_{rect}$ output by the rectifier circuit at the receive end 102. After the wireless charging apparatus enters the power transmission phase, the controller 200 calculates, at the interval of the preset period or in real time by using a parameter recorded before charging, a direct current voltage output by the rectifier circuit at the receive end 102. The controller 200 detects, at the interval of the preset period or in real time, the direct current voltage output by the rectifier circuit at the receive end 102; and when the calculated direct current voltage is inconsistent with the detected direct current voltage, determines that the relative position between the transmit end 101 and the receive end 102 changes.

The controller 200 may further record a correspondence between the coupling coefficient and the coil mutual inductance that correspond to the relative position between the transmit end 101 and the receive end 102 before charging. After the wireless charging apparatus enters the power transmission phase, the controller 200 detects the coupling coefficient or the coil mutual inductance at the interval of the preset period or in real time. When a difference between a coupling coefficient or a coil mutual inductance detected in the power transmission phase and the coupling coefficient or the coil mutual inductance recorded before charging exceeds a preset threshold, it is determined that the relative position between the transmit end 101 and the receive end 102 changes.

After determining that the relative position between the transmit end 101 and the receive end 102 changes, the controller 200 stops power transmission, and re-determines a relative position between the transmit end 101 and the receive end 102. A specific process of determining the relative position between the transmit end 101 and the receive end 102 is similar to the process in Apparatus Embodiment 6 of this application, and details are not described herein again.

Parameters used by the controller 200 to determine whether the relative position between the transmit end 101 and the receive end 102 changes are a coupling coefficient between the transmitting coil and the receiving coil in the power transmission phase and a coil mutual inductance between the transmitting coil and the receiving coil in the power transmission phase. However, the foregoing parameters may also be affected by the foreign object between the transmit end 101 and the receive end 102. Therefore, the controller 200 compares the re-determined relative position with the relative position determined before charging. If the controller 200 determines that the re-determined relative position is consistent with the relative position determined before charging, the controller 200 determines that the foreign object exists between the transmit end 101 and the receive end 102. If the controller 200 determines that the re-determined relative position is inconsistent with the relative position determined before charging, the controller 200 performs foreign object detection according to the process in Apparatus Embodiment 2, 3, or 4 of this application.

In an embodiment of this application, after the wireless charging apparatus enters the power transmission phase, the controller 200 detects, at the interval of the preset period or in real time, whether the relative position between the transmit end 101 and the receive end 102 changes, to avoid still using the parameters such as the alternating current impedance of the transmitting coil and the alternating current impedance of the receiving coil at the original position to perform foreign object detection when the relative position between the transmit end 101 and the receive end 102 changes in the power transmission phase, thereby avoiding the case in which the foreign object cannot be detected or foreign object detection accuracy is poor. The controller 200 re-detects the relative position between the transmit end 101 and the receive end 102, and determines whether the foreign object exists based on the re-detected relative position and the relative position determined before charging. This effectively avoids the case in which foreign object detection cannot be performed after the wireless charging apparatus enters the power transmission phase, and further improves a foreign object detection capability and accuracy in a wireless charging process.

Apparatus Embodiment 8

The controller 200 of the wireless charging apparatus is further configured to obtain the relative position between the transmit end 101 and the receive end 102 based on the self-inductance of the transmitting coil and at least one parameter.

The at least one parameter includes a coupling coefficient between the transmitting coil and an auxiliary coil before charging and a coil mutual inductance between the transmitting coil and the auxiliary coil. The auxiliary coil is located at the receive end 102 of the wireless charging apparatus.

The Applicant finds, through research, that each of the following parameters included in the wireless charging apparatus varies homogeneously with the change in the relative position between the transmit end 101 and the receive end 102. The following parameters include the coupling coefficient between the transmitting coil and the auxiliary coil, and the coil mutual inductance between the transmitting coil and the auxiliary coil. Before performing wireless power transmission, the wireless charging apparatus may directly or indirectly obtain the coupling coefficient between the transmitting coil and the auxiliary coil and the coil mutual inductance between the transmitting coil and the auxiliary coil. Then, the relative position between the transmit end 101 and the receive end 102 is obtained based on a pre-obtained relationship between a change in the foregoing parameter and the relative position.

In an embodiment of this application, the controller 200 of the wireless charging apparatus obtains the relative position between the transmit end and the receive end in the following two manners:

In a first manner, the controller 200 is configured to obtain the vertical relative position based on the self-inductance of the transmitting coil, and determine the horizontal relative position based on the coupling coefficient between the transmitting coil and the auxiliary coil before charging or the coil mutual inductance between the transmitting coil and the auxiliary coil before charging.

The process in which the controller 200 obtains the vertical relative position between the transmit end 101 and the receive end 102 based on the self-inductance of the transmitting coil is similar to the process in Apparatus Embodiment 1 of this application, and details are not described herein again. A specific process in which the controller 200 obtains the horizontal relative position between the transmit end 101 and the receive end 102 based on the coupling coefficient between the transmitting coil and the auxiliary coil before charging, and a specific process in which the controller 200 obtains the horizontal relative position between the transmit end 101 and the receive end 102 based on the coil mutual inductance between the transmitting coil and the receiving coil before charging are described in detail later.

In a second manner, the controller 200 is configured to directly obtain the relative position between the transmit end 101 and the receive end 102 through three-dimensional positioning based on the self-inductance of the transmitting coil and the at least one parameter:

the coupling coefficient between the transmitting coil and the auxiliary coil before charging and the coil mutual inductance between the transmitting coil and the auxiliary coil before charging.

The following provides detailed descriptions by using an example in which the controller 200 obtains the relative position between the transmit end 101 and the receive end 102 based on the self-inductance of the transmitting coil and the coupling coefficient before charging.

A three-dimensional correspondence between the self-inductance of the transmitting coil, the coupling coefficient between the transmitting coil and the auxiliary coil before charging, and the relative position may be pre-obtained. After obtaining the self-inductance of the transmitting coil and the coupling coefficient between the transmitting coil and the auxiliary coil, the controller 200 obtains, from the three-dimensional correspondence, the relative position corresponding to the self-inductance of the transmitting coil and the coupling coefficient.

A principle in which the controller 200 obtains the relative position based on the self-inductance of the transmitting coil and the coil mutual inductance between the transmitting coil and the auxiliary coil before charging is similar to the foregoing process, and details are not described herein again.

In an embodiment of this application, both the self-inductance of the transmitting coil and the coupling coefficient between the transmitting coil and the auxiliary coil before charging are affected by the relative position between the transmit end 101 and the receive end 102. Therefore, the controller 200 may pre-obtain a relationship between the self-inductance of the transmitting coil, the coupling coefficient between the transmitting coil and the auxiliary coil before charging, and the relative position. With reference to the relationship, after obtaining the self-inductance of the transmitting coil and the coupling coefficient, the controller may determine the relative position corresponding to the self-inductance of the transmitting coil and the coupling coefficient. Based on a similar principle, the controller 200 may alternatively determine the relative position by using the self-inductance of the transmitting coil and the coil mutual inductance. This further improves the relative position detection efficiency.

The following describes the first manner.

A difference between a process in which the controller 200 obtains the horizontal relative position based on the coupling coefficient between the transmitting coil and the auxiliary coil before charging and a process in which the controller 200 obtains the horizontal relative position based on the coupling coefficient between the transmitting coil and the receiving coil before charging lies in that the auxiliary coil is used in Apparatus Embodiment 8 of this application.

The following provides detailed descriptions by using an example in which the controller 200 obtains the horizontal relative position based on the coupling coefficient between the transmitting coil and the auxiliary coil before charging.

Figure 17:
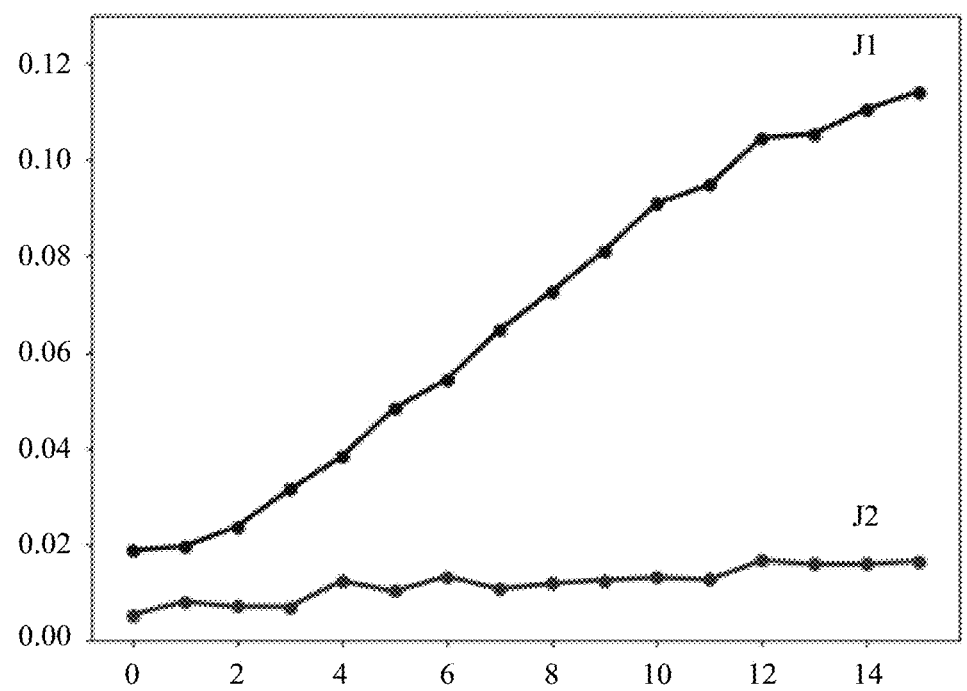
FIG. 17 is a curve diagram in which a coupling coefficient between a transmitting coil and an auxiliary coil and a coupling coefficient between a receiving coil and the auxiliary coil vary with a horizontal relative position according to an embodiment of this application.

FIG. 17 is a curve diagram in which the coupling coefficient between the transmitting coil and the auxiliary coil and a coupling coefficient between the receiving coil and the auxiliary coil vary with the horizontal relative position according to an embodiment of this application.

A horizontal axis indicates the horizontal relative position (unit: millimeter), and a vertical axis indicates the coupling coefficient. The curve is measured when the vertical relative position is 4 millimeters. In the figure, a curve J1 is a variation curve of the coupling coefficient between the transmitting coil and the auxiliary coil, and J2 is a variation curve of the coupling coefficient between the receiving coil and the auxiliary coil. It can be seen from the figure that the coupling coefficient between the receiving coil and the auxiliary coil varies slightly with the horizontal relative position, and the coupling coefficient between the transmitting coil and the auxiliary coil varies more with the horizontal relative position. The coupling coefficient between the transmitting coil and the auxiliary coil is positively correlated with the horizontal relative position, and a larger horizontal relative position indicates a larger coupling coefficient between the transmitting coil and the auxiliary coil. Therefore, the controller 200 may obtain the horizontal relative position between the transmit end 101 and the receive end 102 by using the coupling coefficient between the transmitting coil and the auxiliary coil.

Figure 18:
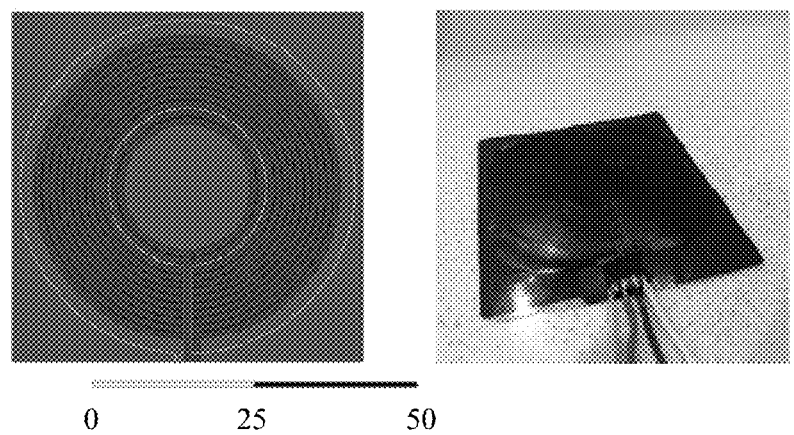
FIG. 18 is a schematic diagram of an auxiliary coil according to an embodiment of this application.

FIG. 18 is a schematic diagram of the auxiliary coil according to an embodiment of this application.

It can be seen from the figure that the auxiliary coil is a two-turn auxiliary coil. To reduce coupling between the auxiliary coil and the receiving coil, and improve accuracy of obtaining the horizontal relative position by the controller 200, a magnetic flux through which a magnetic field generated by a current of the receiving coil is passed in an area covered by the two-turn auxiliary coil is controlled to be close to zero. After the wireless charging apparatus enters the power transmission phase, a direct current output voltage of the auxiliary coil is controlled by the current of the transmitting coil and is not affected by the current of the receiving coil. The accuracy of obtaining the horizontal relative position by the controller 200 is further improved.

A process in which the controller 200 obtains the horizontal relative position based on the coil mutual inductance between the transmitting coil and the auxiliary coil before charging is similar to the process in which the controller 200 obtains the horizontal relative position based on the coupling coefficient between the transmitting coil and the auxiliary coil before charging. After obtaining the coupling coefficient between the transmitting coil and the auxiliary coil, the controller 200 may obtain the coil mutual inductance between the transmitting coil and the auxiliary coil. The coil mutual inductance between the transmitting coil and the auxiliary coil is positively correlated with the horizontal relative position, and a larger horizontal relative position indicates a larger coil mutual inductance between the transmitting coil and the auxiliary coil. Therefore, the controller 200 may obtain the horizontal relative position between the transmit end 101 and the receive end 102 by using the coil mutual inductance between the transmitting coil and the auxiliary coil.

In addition, the controller 200 may further obtain the direct current output voltage of the auxiliary coil when the current of the transmitting coil is controlled to be fixed, and obtain a coupling coefficient between the transmitting coil and the auxiliary coil based on the direct current output voltage, to further obtain the horizontal relative position. When the current of the transmitting coil is controlled to be in the preset current range, it is considered that the current is fixed.

The following describes in detail how the controller 200 obtains the coupling coefficient between the transmitting coil and the auxiliary coil.

Figure 19:
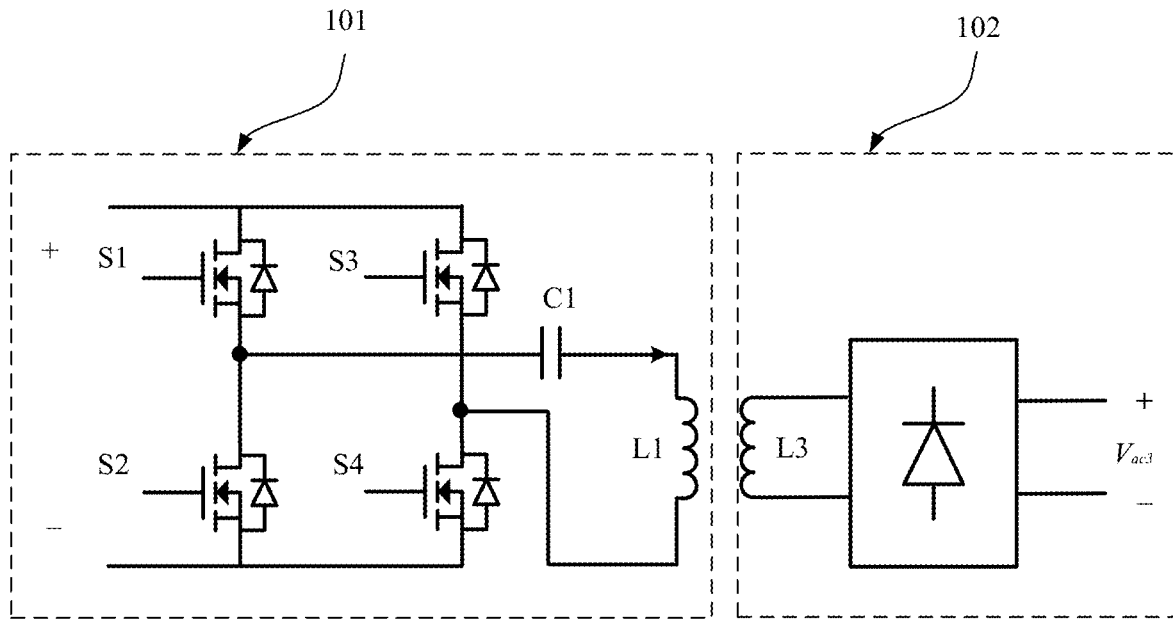
FIG. 19 is a schematic diagram of another coupling coefficient detection circuit according to an embodiment of this application.

FIG. 19 is a schematic diagram of another coupling coefficient detection circuit according to an embodiment of this application.

The coupling coefficient detection circuit includes the transmit end 101 shown in FIG. 8 and FIG. 16.

A receive end 102 includes a self-inductance $L_3$ of an auxiliary coil.

The controller 200 supplies the direct current voltage to the input end of the full-bridge circuit at the transmit end 101, so that the full-bridge is in an inverter working state; controls the receive end 102 to be in a no-load state; and obtains a direct current output voltage of the auxiliary coil and the current of the transmitting coil. A coupling coefficient between the transmitting coil and the auxiliary coil may be obtained by using the following formula:

$$k = \frac{V_{ac3}}{\omega\sqrt{L_1 \cdot \beta L_3}\, I_1},$$

where $V_{ac3}$ is the direct current output voltage of the auxiliary coil, $I_1$ is the current of the transmitting coil, $\omega$ is the working frequency and is known, $L_1$ is the self-inductance of the transmitting coil, $L_3$ is the self-inductance of the auxiliary coil, and $\beta$ is a coefficient and may be obtained through an experiment. $\beta$ may be obtained by measuring a ratio of a current self-inductance $L_1$ of the transmitting coil to a self-inductance of the transmitting coil in an uncoupled state.

After obtaining the coupling coefficient between the transmitting coil and the auxiliary coil, the controller 200 may obtain a coil mutual inductance $M_2$ between the transmitting coil and the auxiliary coil by using the following formula:

$$M_2 = \frac{V_{ac3}}{\omega I_1},$$

where $V_{ac3}$ is the direct current output voltage of the auxiliary coil, $I_1$ is the current of the transmitting coil, and $\omega$ is the working frequency and is known.

In the calculation formula of the coupling coefficient between the transmitting coil and the auxiliary coil, $\beta$ may be measured through the experiment. A person skilled in the art may further correct a value of $\beta$ to further improve accuracy of detecting the coupling coefficient.

In the process in which the controller 200 determines the horizontal relative position, a person skilled in the art may select one or a plurality of the following parameters based on a specific actual application: the coupling coefficient between the transmitting coil and the auxiliary coil and the coil mutual inductance between the transmitting coil and the auxiliary coil. When the plurality of parameters are selected, after determining a horizontal relative position based on each parameter, the controller 200 performs mutual verification based on the horizontal relative position determined based on each parameter. For example, when selecting the coupling coefficient and the coil mutual inductance to separately determine horizontal relative positions, the controller 200 may perform mutual verification based on the horizontal relative position determined by using the coupling coefficient and the horizontal relative position determined by using the coil mutual inductance.

In an embodiment of this application, the self-inductance of the transmitting coil is more affected by the change in the vertical relative position between the transmit end 101 and the receive end 102, and is less affected by the change in the horizontal relative position. Therefore, the controller 200 may pre-obtain the correspondence between the self-inductance of the transmitting coil and the vertical relative position. With reference to the correspondence pre-obtained by the controller 200, the vertical relative position is obtained by using the self-inductance of the transmitting coil. The coupling coefficient between the transmitting coil and the auxiliary coil before charging is more affected by the horizontal relative position between the transmit end 101 and the receive end 102, and is less affected by the vertical relative position. Therefore, the controller 200 may pre-obtain a correspondence between the coupling coefficient and the horizontal relative position. With reference to the correspondence pre-obtained by the controller 200, the horizontal relative position is obtained by using the coupling coefficient. The controller 200 may alternatively obtain the horizontal relative position based on the coil mutual inductance between the transmitting coil and the auxiliary coil before charging. A sequence of obtaining the vertical relative position and the horizontal relative position is not limited, and may be obtained sequentially or simultaneously. The vertical relative position and the horizontal relative position are combined to obtain the relative position between the transmit end 101 and the receive end 102. This further improves the relative position detection accuracy.

After the relative position between the transmit end 101 and the receive end 102 is obtained by using Apparatus Embodiment 8, foreign object detection before charging is performed. The following describes in detail how to perform foreign object detection after the wireless charging apparatus enters the power transmission phase in Apparatus Embodiment 9 of this application.

Apparatus Embodiment 9

If the relative position between the transmit end 101 and the receive end 102 changes after the wireless charging apparatus enters the power transmission phase, the error in performing foreign object detection by the controller 200 based on the parameters such as the alternating current impedance of the transmitting coil and the alternating current impedance of the receiving coil at the original position is relatively large. The case in which the controller 200 falsely reports the foreign object or the foreign object exists but cannot be detected may occur.

Therefore, the controller 200 detects, at an interval of a preset period or in real time, whether the relative position between the transmit end 101 and the receive end 102 changes.

After the wireless charging apparatus enters the power transmission phase, for a process in which the controller 200 detects whether the relative position between the transmit end 101 and the receive end 102 changes, refer to Apparatus Embodiment 7 of this application. A difference lies in: Parameters used in this embodiment are the self-inductance of the transmitting coil, the self-inductance of the auxiliary coil, the coupling coefficient between the transmitting coil and the auxiliary coil, and the coil mutual inductance between the transmitting coil and the auxiliary coil.

After determining that the relative position between the transmit end 101 and the receive end 102 changes, the controller 200 stops power transmission, and re-determines a relative position between the transmit end 101 and the receive end 102. A specific process of determining the relative position between the transmit end 101 and the receive end 102 is similar to the process in Apparatus Embodiment 8 of this application, and details are not described herein again.

Parameters used by the controller 200 to determine whether the relative position between the transmit end 101 and the receive end 102 changes are the coupling coefficient between the transmitting coil and the auxiliary coil in the power transmission phase and the coil mutual inductance between the transmitting coil and the auxiliary coil in the power transmission phase. However, the foregoing parameters may also be affected by the foreign object between the transmit end 101 and the receive end 102. Therefore, the controller 200 compares the re-determined relative position with the relative position determined before charging. If the controller 200 determines that the re-determined relative position is consistent with the relative position determined before charging, the controller 200 determines that the foreign object exists between the transmit end 101 and the receive end 102. If the controller 200 determines that the re-determined relative position is inconsistent with the relative position determined before charging, the controller 200 performs foreign object detection according to the process in Apparatus Embodiment 2, 3, or 4 of this application.

In an embodiment of this application, after the wireless charging apparatus enters the power transmission phase, the controller 200 detects, at the interval of the preset period or in real time, whether the relative position between the transmit end 101 and the receive end 102 changes, to avoid still using the parameters such as the alternating current impedance of the transmitting coil and the alternating current impedance of the receiving coil at the original position to perform foreign object detection when the relative position between the transmit end 101 and the receive end 102 changes in the power transmission phase, thereby avoiding the case in which the foreign object cannot be detected or foreign object detection accuracy is poor. The controller 200 re-detects the relative position between the transmit end 101 and the receive end 102, and determines whether the foreign object exists based on the re-detected relative position and the relative position determined before charging. This effectively avoids the case in which foreign object detection cannot be performed after the wireless charging apparatus enters the power transmission phase, and further improves a foreign object detection capability and accuracy in a wireless charging process.

Method Embodiment 1

Method Embodiment 1 of this application provides a position detection method, applied to a transmit end or a receive end of a wireless charging apparatus. The transmit end includes a transmit end resonant network and an inverter circuit, and the transmit end resonant network includes a transmitting coil. The receive end includes a receive end resonant network and a rectifier circuit, and the receive end resonant network includes a receiving coil.

Figure 20:
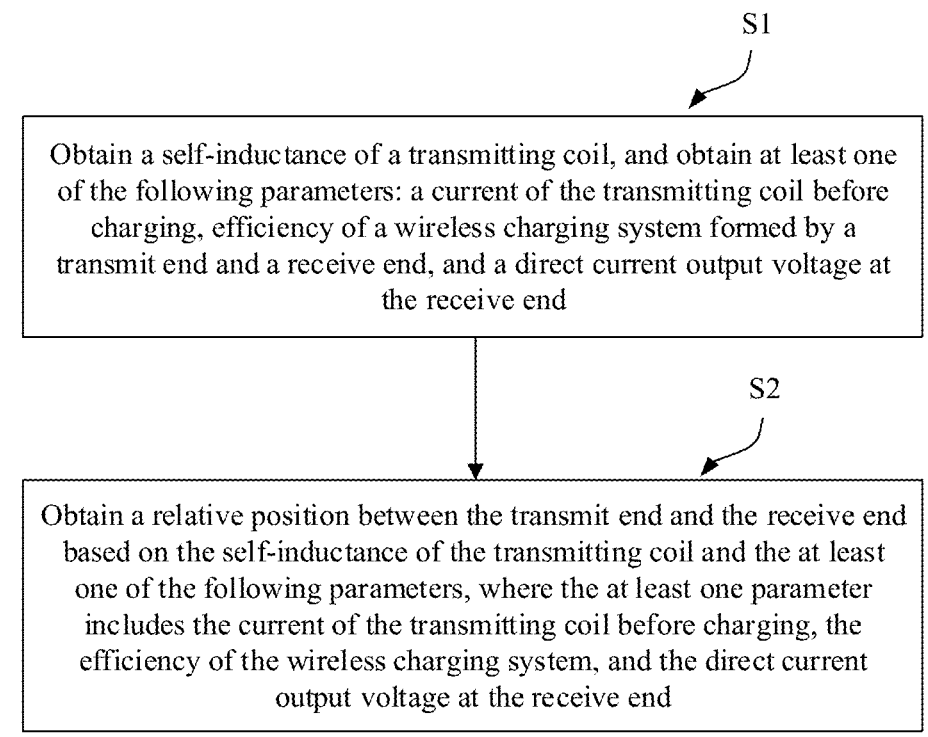
FIG. 20 is a flowchart of a position detection method according to an embodiment of this application.

FIG. 20 is a flowchart of a position detection method according to an embodiment of this application.

The position detection method includes the following operations.

S1: Obtain a self-inductance of the transmitting coil, and obtain at least one parameter: a current of the transmitting coil before charging, efficiency of a wireless charging system formed by the transmit end and the receive end, and a direct current output voltage at the receive end.

The Applicant finds, through research, that each of the following parameters varies homogeneously with a change in a relative position between the transmit end and the receive end.

The following parameters include the self-inductance of the transmitting coil, the current of the transmitting coil before charging, the efficiency of the wireless charging system, and the direct current output voltage at the receive end. Before performing wireless power transmission, the wireless charging apparatus may directly or indirectly obtain the self-inductance of the transmitting coil, the current of the transmitting coil, the efficiency of the wireless charging system, and the direct current output voltage at the receive end. Then, the relative position between the transmit end and the receive end is obtained based on a pre-obtained relationship between a change in the foregoing parameter and the relative position.

The obtaining a self-inductance of the transmitting coil includes: obtaining the self-inductance of the transmitting coil based on a resonance frequency of the transmit end resonant network and a resonance capacitance of the transmit end resonant network before charging. For a specific process of obtaining the self-inductance of the transmitting coil based on the resonance frequency of the transmit end resonant network and the resonance capacitance of the transmit end resonant network, refer to Apparatus Embodiment 1 and FIG. 8 of this application. Details are not described herein again.

The obtaining a current of the transmitting coil before the charging includes: controlling the direct current output voltage at the receive end to be fixed, to obtain the current of the transmitting coil, where the current of the transmitting coil before charging is positively correlated with a horizontal relative position. When the direct current output voltage is controlled to be in a preset voltage range, it is considered that the direct current output voltage is fixed.

The obtaining efficiency of a wireless charging system formed by the transmit end and the receive end includes: controlling the direct current output voltage at the receive end to be fixed, to obtain the efficiency of the wireless charging system, where the efficiency of the wireless charging system before charging is negatively correlated with the horizontal relative position. When the direct current output voltage is controlled to be in the preset voltage range, it is considered that the direct current output voltage is fixed.

The obtaining a direct current output voltage at the receive end includes: controlling the current of the transmitting coil to be fixed, to obtain the direct current output voltage at the receive end, where the direct current output voltage at the receive end before charging is negatively correlated with the horizontal relative position. When the current of the transmitting coil is controlled to be in a preset current range, it is considered that the current is fixed.

S2: Obtain the relative position between the transmit end and the receive end based on the self-inductance of the transmitting coil and the at least one parameter, where the at least one parameter includes the current of the transmitting coil before charging, the efficiency of the wireless charging system, and the direct current output voltage at the receive end.

In an embodiment of this application, the relative position between the transmit end and the receive end is obtained in the following two manners.

In a first manner, a vertical relative position is obtained based on the self-inductance of the transmitting coil, and the horizontal relative position is obtained based on the current of the transmitting coil before charging, the efficiency of the wireless charging system, or the direct current output voltage at the receive end.

For a specific process of obtaining the vertical relative position based on the self-inductance of the transmitting coil, refer to Apparatus Embodiment 1 and FIG. 7 of this application. Details are not described herein again.

For a specific process of obtaining the horizontal relative position based on the current of the transmitting coil before charging, refer to Apparatus Embodiment 1 and FIG. 10 of this application. Details are not described herein again.

For a specific process of obtaining the horizontal relative position based on the efficiency of the wireless system before charging, refer to Apparatus Embodiment 1 and FIG. 11a of this application. Details are not described herein again.

For a specific process of obtaining the horizontal relative position based on the direct current output voltage at the receive end before charging, refer to Apparatus Embodiment 1 and FIG. 11b of this application. Details are not described herein again.

In an embodiment of this application, the self-inductance of the transmitting coil is more affected by a change in the vertical relative position between the transmit end and the receive end, and is less affected by a change in the horizontal relative position. Therefore, a correspondence between the self-inductance of the transmitting coil and the vertical relative position may be pre-obtained. With reference to the pre-obtained correspondence, the vertical relative position is obtained by using the self-inductance of the transmitting coil. At a same vertical relative position, there are a single change relationship between the current of the transmitting coil before charging and the horizontal relative position, a single change relationship between the efficiency of the wireless charging system and the horizontal relative position, and a single change relationship between the direct current output voltage at the receive end and the horizontal relative position. Therefore, a correspondence between the current of the transmitting coil before charging, the efficiency of the wireless charging system, or the direct current output voltage at the receive end and the horizontal relative position may be pre-obtained. With reference to the pre-obtained correspondence, the horizontal relative position is obtained by using the obtained current of the transmitting coil before charging, the obtained efficiency of the wireless charging system, or the obtained direct current output voltage at the receive end. A sequence of obtaining the vertical relative position and the horizontal relative position is not limited, and may be obtained sequentially or simultaneously. The vertical relative position and the horizontal relative position are combined to obtain the relative position between the transmit end and the receive end. This further improves relative position detection accuracy.

In a second manner, the relative position is directly obtained through three-dimensional positioning based on the self-inductance of the transmitting coil and the at least one parameter, where the at least one parameter includes the current of the transmitting coil before charging, the efficiency of the wireless charging system formed by the transmit end and the receive end, and the direct current output voltage at the receive end.

A specific obtaining process is similar to that in Apparatus Embodiment 1 of this application, and details are not described herein again.

In an embodiment of this application, both the self-inductance of the transmitting coil and the current of the transmitting coil before charging are affected by the relative position between the transmit end and the receive end. Therefore, a relationship between the self-inductance of the transmitting coil, the current of the transmitting coil before charging, and the relative position may be pre-obtained. With reference to the relationship, after the self-inductance of the transmitting coil and the current of the transmitting coil are obtained, the relative position corresponding to the self-inductance of the transmitting coil and the current of the transmitting coil may be determined. Based on a similar principle, the relative position may alternatively be determined by using the self-inductance of the transmitting coil and the efficiency of the wireless charging system before charging. The relative position may alternatively be determined by using the self-inductance of the transmitting coil and the direct current output voltage at the receive end before charging. This further improves relative position detection efficiency.

In addition, a process of obtaining the relative position between the transmit end and the receive end may further include the following two manners. The following separately describes in detail the two manners in Method Embodiment 2 and Method Embodiment 3.

Method Embodiment 2

Figure 21:
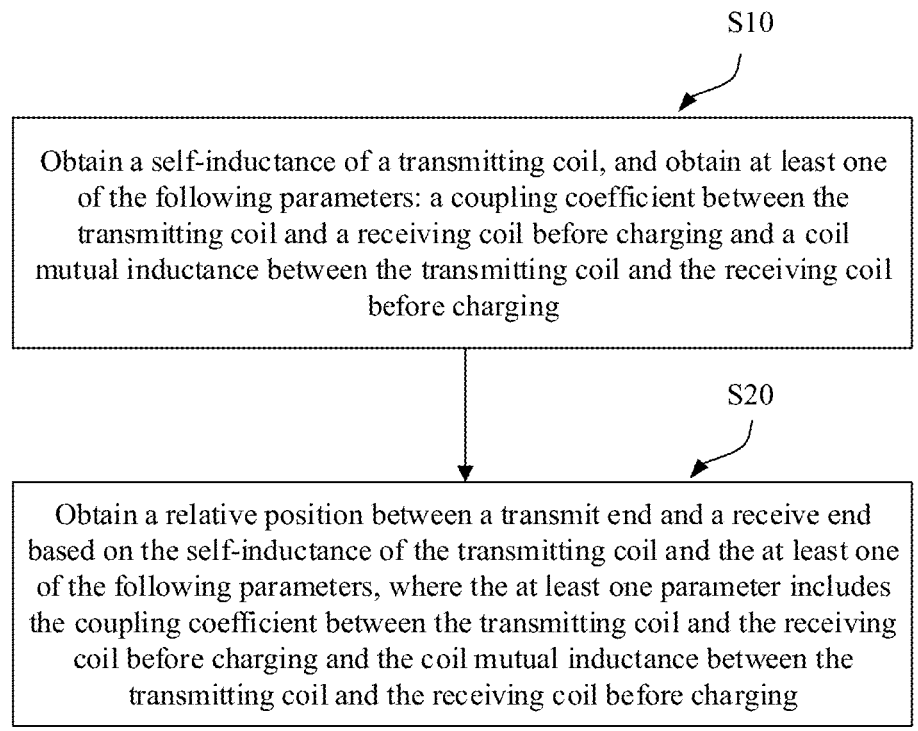
FIG. 21 is a flowchart of another position detection method according to an embodiment of this application.

FIG. 21 is a flowchart of another position detection method according to an embodiment of this application.

The position detection method includes the following operations.

S10: Obtain the self-inductance of the transmitting coil, and obtain at least one parameter: a coupling coefficient between the transmitting coil and the receiving coil before charging and a coil mutual inductance between the transmitting coil and the receiving coil before charging.

The Applicant finds, through research, that each of the following parameters varies homogeneously with the change in the relative position between the transmit end and the receive end. The following parameters include the coupling coefficient between the transmitting coil and the receiving coil, and the coil mutual inductance between the transmitting coil and the receiving coil. Before performing wireless power transmission, the wireless charging apparatus may directly or indirectly obtain the coupling coefficient between the transmitting coil and the receiving coil and the coil mutual inductance between the transmitting coil and the receiving coil. Then, the relative position between the transmit end and the receive end is obtained based on a pre-obtained relationship between a change in the foregoing parameter and the relative position.

The obtaining the self-inductance of the transmitting coil includes: obtaining the self-inductance of the transmitting coil based on the resonance frequency of the transmit end resonant network and the resonance capacitance of the transmit end resonant network before charging. For the specific process of obtaining the self-inductance of the transmitting coil based on the resonance frequency of the transmit end resonant network and the resonance capacitance of the transmit end resonant network, refer to Apparatus Embodiment 1 and FIG. 8 of this application. Details are not described herein again.

For a specific process of obtaining the coupling coefficient between the transmitting coil and the receiving coil and the coil mutual inductance between the transmitting coil and the receiving coil, refer to Apparatus Embodiment 6 and FIG. 16 of this application. Details are not described herein again.

S20: Obtain the relative position between the transmit end and the receive end based on the self-inductance of the transmitting coil and the at least one parameter, where the at least one parameter includes the coupling coefficient between the transmitting coil and the receiving coil before charging and the coil mutual inductance between the transmitting coil and the receiving coil before charging.

In this embodiment of this application, the relative position between the transmit end and the receive end is obtained in the following two manners.

In a first manner, the vertical relative position is obtained based on the self-inductance of the transmitting coil, and a horizontal relative position is obtained based on the coupling coefficient between the transmitting coil and the receiving coil before charging or the coil mutual inductance between the transmitting coil and the receiving coil before charging.

For the specific process of obtaining the vertical relative position based on the self-inductance of the transmitting coil, refer to Apparatus Embodiment 1 and FIG. 7 of this application. Details are not described herein again.

For a specific process of obtaining the horizontal relative position based on the coupling coefficient between the transmitting coil and the receiving coil before charging, refer to Apparatus Embodiment 6 and FIG. 14 of this application. Details are not described herein again.

For a specific process of obtaining the horizontal relative position based on the coil mutual inductance between the transmitting coil and the receiving coil before charging, refer to Apparatus Embodiment 6 and FIG. 15 of this application. Details are not described herein again.

For a process of obtaining the coupling coefficient between the transmitting coil and the receiving coil and the coil mutual inductance between the transmitting coil and the receiving coil, refer to Apparatus Embodiment 6 and FIG. 16 of this application. Details are not described herein again.

In an embodiment of this application, the self-inductance of the transmitting coil is more affected by the change in the vertical relative position between the transmit end and the receive end, and is less affected by the change in the horizontal relative position. Therefore, the correspondence between the self-inductance of the transmitting coil and the vertical relative position may be pre-obtained. With reference to the pre-obtained correspondence, the vertical relative position is obtained by using the self-inductance of the transmitting coil. The coupling coefficient between the transmitting coil and the receiving coil before charging is more affected by the horizontal relative position between the transmit end and the receive end, and is less affected by the vertical relative position. Therefore, a correspondence between the coupling coefficient before charging and the horizontal relative position may be pre-obtained. With reference to the pre-obtained correspondence, the horizontal relative position is obtained by using the coupling coefficient before charging. The horizontal relative position may alternatively be obtained based on the coil mutual inductance between the transmitting coil and the receiving coil before charging. A sequence of obtaining the vertical relative position and the horizontal relative position is not limited, and may be obtained sequentially or simultaneously. The vertical relative position and the horizontal relative position are combined to obtain the relative position between the transmit end and the receive end. This further improves the relative position detection accuracy.

In a second manner, the relative position between the transmit end and the receive end is directly obtained through three-dimensional positioning based on the self-inductance of the transmitting coil and the at least one parameter.

The at least one parameter includes the coupling coefficient between the transmitting coil and the receiving coil before charging and the coil mutual inductance between the transmitting coil and the receiving coil before charging.

A specific obtaining process is similar to that in Apparatus Embodiment 6 of this application, and details are not described herein again.

In an embodiment of this application, both the self-inductance of the transmitting coil and the coupling coefficient between the transmitting coil and the receiving coil before charging are affected by the relative position between the transmit end and the receive end. Therefore, a relationship between the self-inductance of the transmitting coil, the coupling coefficient between the transmitting coil and the receiving coil before charging, and the relative position may be pre-obtained. With reference to the relationship, after the self-inductance of the transmitting coil and the coupling coefficient between the transmitting coil and the receiving coil before charging are obtained, the relative position corresponding to the self-inductance of the transmitting coil and the coupling coefficient may be determined. Based on a similar principle, the relative position may alternatively be determined by using the self-inductance of the transmitting coil and the coil mutual inductance between the transmitting coil and the receiving coil before charging. This further improves the relative position detection efficiency.

The following describes Method Embodiment 3.

Method Embodiment 3

Figure 22:
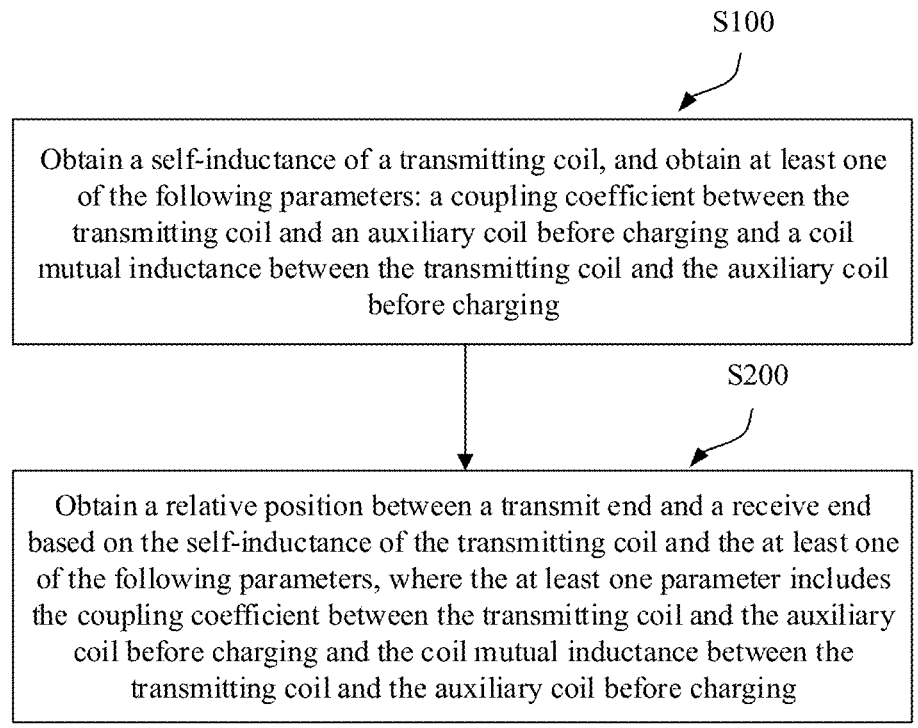
FIG. 22 is a flowchart of still another position detection method according to an embodiment of this application.

FIG. 22 is a flowchart of still another position detection method according to an embodiment of this application.

The position detection method includes the following operations.

S100: Obtain the self-inductance of the transmitting coil, and obtain at least one parameter: a coupling coefficient between the transmitting coil and an auxiliary coil before charging and a coil mutual inductance between the transmitting coil and the auxiliary coil before charging.

The Applicant finds, through research, that each of the following parameters varies homogeneously with the change in the relative position between the transmit end and the receive end. The following parameters include the coupling coefficient between the transmitting coil and the auxiliary coil, and the coil mutual inductance between the transmitting coil and the auxiliary coil. Before performing wireless power transmission, the wireless charging apparatus may directly or indirectly obtain the coupling coefficient between the transmitting coil and the auxiliary coil and the coil mutual inductance between the transmitting coil and the auxiliary coil. Then, the relative position between the transmit end 101 and the receive end 102 is obtained based on a pre-obtained relationship between a change in the foregoing parameter and the relative position.

The obtaining the self-inductance of the transmitting coil includes: obtaining the self-inductance of the transmitting coil based on the resonance frequency of the transmit end resonant network and the resonance capacitance of the transmit end resonant network before charging. For the specific process of obtaining the self-inductance of the transmitting coil based on the resonance frequency of the transmit end resonant network and the resonance capacitance of the transmit end resonant network, refer to Apparatus Embodiment 1 and FIG. 8 of this application. Details are not described herein again.

S200: Obtain the relative position between the transmit end and the receive end based on the self-inductance of the transmitting coil and the at least one parameter, where the at least one parameter includes the coupling coefficient between the transmitting coil and the auxiliary coil before charging and the coil mutual inductance between the transmitting coil and the auxiliary coil before charging.

In an embodiment of this application, the relative position between the transmit end and the receive end is obtained in the following two manners.

In a first manner, the vertical relative position is obtained based on the self-inductance of the transmitting coil, and a horizontal relative position is determined based on the coupling coefficient between the transmitting coil and the auxiliary coil before charging or the coil mutual inductance between the transmitting coil and the auxiliary coil before charging.

For the specific process of obtaining the vertical relative position based on the self-inductance of the transmitting coil, refer to Apparatus Embodiment 1 and FIG. 7 of this application. Details are not described herein again.

For a specific process of obtaining the horizontal relative position based on the coupling coefficient between the transmitting coil and the auxiliary coil before charging, refer to Apparatus Embodiment 8 and FIG. 17 of this application. Details are not described herein again.

For a specific process of obtaining the horizontal relative position based on the coil mutual inductance between the transmitting coil and the auxiliary coil before charging, refer to Apparatus Embodiment 8 and FIG. 18 of this application. Details are not described herein again.

For a process of obtaining the coupling coefficient between the transmitting coil and the auxiliary coil and the coil mutual inductance between the transmitting coil and the auxiliary coil, refer to Apparatus Embodiment 8 and FIG. 18 of this application. Details are not described herein again.

In an embodiment of this application, the self-inductance of the transmitting coil is more affected by the change in the vertical relative position between the transmit end and the receive end, and is less affected by the change in the horizontal relative position. Therefore, the correspondence between the self-inductance of the transmitting coil and the vertical relative position may be pre-obtained. With reference to the pre-obtained correspondence, the vertical relative position is obtained by using the self-inductance of the transmitting coil. The coupling coefficient between the transmitting coil and the auxiliary coil before charging is more affected by the horizontal relative position between the transmit end and the receive end, and is less affected by the vertical relative position. Therefore, a correspondence between the coupling coefficient and the horizontal relative position may be pre-obtained. With reference to the pre-obtained correspondence, the horizontal relative position is obtained by using the coupling coefficient. The horizontal relative position may alternatively be obtained based on the coil mutual inductance between the transmitting coil and the auxiliary coil before charging. A sequence of obtaining the vertical relative position and the horizontal relative position is not limited, and may be obtained sequentially or simultaneously. The vertical relative position and the horizontal relative position are combined to obtain the relative position between the transmit end and the receive end. This further improves the relative position detection accuracy.

In a second manner, the relative position between the transmit end and the receive end is directly obtained through three-dimensional positioning based on the self-inductance of the transmitting coil and the at least one parameter.

The at least one parameter includes the coupling coefficient between the transmitting coil and the auxiliary coil before charging and the coil mutual inductance between the transmitting coil and the auxiliary coil before charging.

A specific obtaining process is similar to that in Apparatus Embodiment 8 of this application, and details are not described herein again.

In an embodiment of this application, both the self-inductance of the transmitting coil and the coupling coefficient between the transmitting coil and the auxiliary coil before charging are affected by the relative position between the transmit end and the receive end. Therefore, a relationship between the self-inductance of the transmitting coil, the coupling coefficient between the transmitting coil and the auxiliary coil before charging, and the relative position may be pre-obtained. With reference to the relationship, after the self-inductance of the transmitting coil and the coupling coefficient between the transmitting coil and the auxiliary coil before charging are obtained, the relative position corresponding to the self-inductance of the transmitting coil and the coupling coefficient may be determined. Based on a similar principle, the relative position may alternatively be determined by using the self-inductance of the transmitting coil and the coil mutual inductance between the transmitting coil and the auxiliary coil before charging. This further improves the relative position detection efficiency.

Method Embodiments 1, 2, and 3 describe how to obtain the relative position between the transmit end and the receive end. The following describes a foreign object detection process with reference to the obtained relative position. In a process in which the wireless charging apparatus performs foreign object detection, a required alternating current impedance of the transmitting coil, a required alternating current impedance of the receiving coil, and parameters such as a Q value at the transmit end 101 are all affected by the relative position between the transmit end 101 and the receive end 102. When a deviation of the relative position between the transmit end 101 and the receive end 102 is relatively large, impact of the relative position on foreign object detection is greater than impact of the alternating current impedance of the transmitting coil, the alternating current impedance of the receiving coil, and the parameters such as the Q value at the transmit end 101 on foreign object detection. Even if a foreign object exists between the transmit end 101 and the receive end 102, the wireless charging apparatus cannot detect the foreign object. Therefore, after the relative position between the transmit end 101 and the receive end 102 is determined, the wireless charging apparatus performs foreign object detection, so that foreign object detection accuracy can be improved.

The following includes three cases: Method Embodiment 4, Method Embodiment 5, and Method Embodiment 6.

The following describes Method Embodiment 4.

Method Embodiment 4

Figure 23:
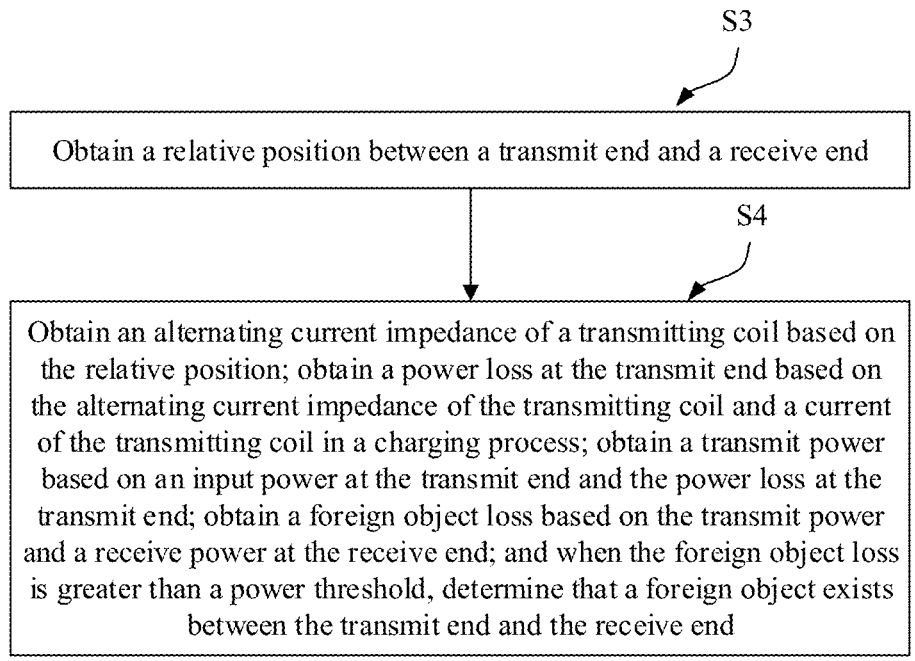
FIG. 23 is a flowchart of a foreign object detection method according to an embodiment of this application.

FIG. 23 is a flowchart of a foreign object detection method according to an embodiment of this application.

The foreign object detection method includes the following operations.

S3: Obtain the relative position between the transmit end and the receive end.

The relative position between the transmit end and the receive end includes the horizontal relative position and the vertical relative position. For the process of obtaining the relative position between the transmit end and the receive end, refer to Method Embodiment 1, 2, or 3 of this application. Details are not described herein again.

In addition, in the process of obtaining the relative position between the transmit end and the receive end, a metal foreign object may affect accuracy of obtaining the relative position between the transmit end and the receive end, especially when the metal foreign object is located at a central part of the transmit end. Therefore, before the relative position between the transmit end and the receive end is determined, the Q value at the transmit end may be first obtained, to further determine whether a metal foreign object close to the central part of the transmit end or a relatively large metal foreign object exists between the transmit end and the receive end. Specifically, a minimum Q threshold may be pre-obtained. If the obtained Q value at the transmit end is less than the minimum Q threshold, it may be directly determined that the metal foreign object exists between the transmit end and the receive end. This improves foreign object detection efficiency.

S4: Obtain the alternating current impedance of the transmitting coil based on the relative position; obtain a power loss at the transmit end based on the alternating current impedance of the transmitting coil and a current of the transmitting coil in a charging process; obtain a transmit power based on an input power at the transmit end and the power loss at the transmit end; obtain a foreign object loss based on the transmit power and a receive power at the receive end; and when the foreign object loss is greater than a power threshold, determine that the foreign object exists between the transmit end and the receive end.

For a process of obtaining the alternating current impedance of the transmitting coil based on the relative position and obtaining the power loss at the transmit end based on the alternating current impedance of the transmitting coil and the current of the transmitting coil in the charging process, refer to Apparatus Embodiment 2 of this application. Details are not described herein again. An error of the alternating current impedance of the transmitting coil obtained by using the relative position is relatively small, and an error of a calculated receive power is also relatively small, and an error of an obtained foreign object loss is also relatively small, thereby improving accuracy of the obtained foreign object loss.

To further improve the accuracy of obtaining the foreign object loss, an alternating current impedance with a relatively small error of the receiving coil may be obtained based on a pre-obtained correspondence between the relative position between the transmit end and the receive end and the alternating current impedance of the receiving coil, and a power loss at the receive end is obtained by using the alternating current impedance with the relatively small error of the receiving coil and the current of the receiving coil in the charging process. In this way, an error of the calculated receive power is also relatively small, and an error of an obtained foreign object loss is also relatively small, thereby improving accuracy of the obtained foreign object loss.

Although there may be an error in a coil resistance at the receive end, considering that the alternating current impedance of the receiving coil has relatively little impact on calculation of the power loss at the receive end, there is also relatively little impact on calculation of the receive power.

Therefore, to further improve efficiency of obtaining the power loss by the controller, the coil resistance at the receive end may be directly used as the alternating current impedance of the receiving coil, thereby simplifying a process of obtaining the receive power and improving efficiency of obtaining the receive power.

In an embodiment of this application, the power loss at the transmit end is obtained based on the alternating current impedance of the transmitting coil and the current of the transmitting coil in the charging process. The alternating current impedance of the transmitting coil is obtained based on the relative position between the transmit end and the receive end, instead of directly using a coil resistance at the transmit end as an alternating current impedance at the transmit end. In this way, an error of obtaining the alternating current impedance at the transmit end is reduced, an error of the power loss at the transmit end is further reduced, and an error of the transmit power is further reduced. In addition, the alternating current impedance of the receiving coil is obtained based on the horizontal relative position and the vertical relative position, the power loss at the receive end is obtained based on the alternating current impedance of the receiving coil and the current of the receiving coil in the charging process, and a receive power at the receive end is obtained based on the power loss at the receive end and an output power at the receive end. This further reduces an error of the receive power. A foreign object loss is obtained based on a transmit power with a relatively low error and a receive power with a relatively low error, so that an error of the foreign object loss is also relatively low. This further improves the foreign object detection accuracy.

The following describes Method Embodiment 5.

Method Embodiment 5

Figure 24:
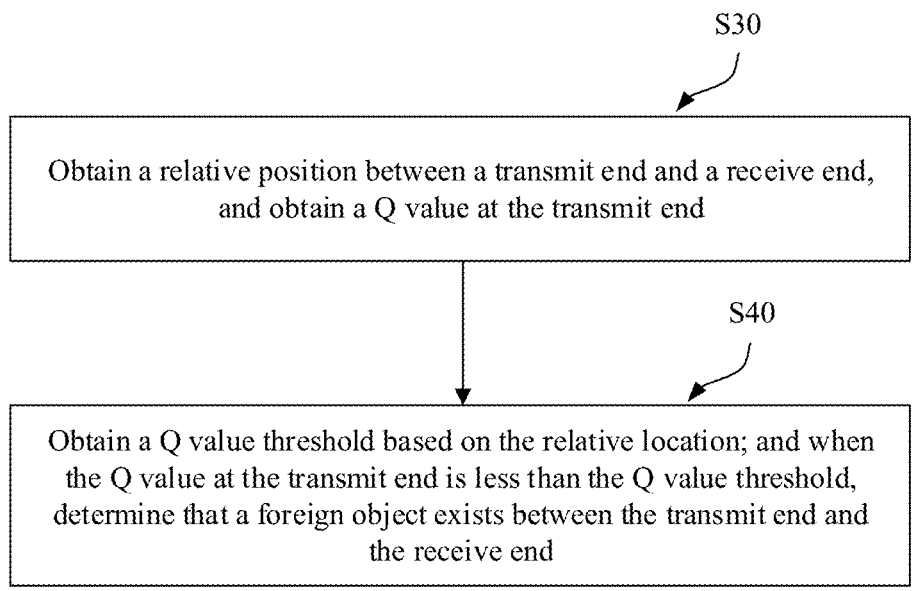
FIG. 24 is a flowchart of another foreign object detection method according to an embodiment of this application.

FIG. 24 is a flowchart of another foreign object detection method according to an embodiment of this application.

The foreign object detection method includes the following operations.

S30: Obtain the relative position between the transmit end and the receive end, and obtain the Q value at the transmit end.

The relative position between the transmit end and the receive end includes the horizontal relative position and the vertical relative position. For the process of obtaining the relative position between the transmit end and the receive end, refer to Method Embodiment 1, 2, or 3 of this application. Details are not described herein again.

For the process of obtaining the Q value at the transmit end, refer to Apparatus Embodiment 3 of this application. Details are not described herein again.

A sequence of obtaining the relative position between the transmit end and the receive end and obtaining the Q value at the transmit end is not limited, and may be obtained sequentially or simultaneously.

S40: Obtain a Q value threshold based on the relative position; and when the Q value at the transmit end is less than the Q value threshold, determine that the foreign object exists between the transmit end and the receive end.

For a process of obtaining the Q value threshold based on the relative position, refer to Apparatus Embodiment 3 and FIG. 13a of this application. Details are not described herein again.

When the Q value at the transmit end is greater than the Q value threshold, the alternating current impedance of the transmitting coil is obtained based on the horizontal relative position and the vertical relative position. A power loss at the transmit end is obtained based on the alternating current impedance of the transmitting coil and a current of the transmitting coil in a charging process. A transmit power is obtained based on an input power at the transmit end and the power loss at the transmit end. A power difference between the transmit power and a receive power is obtained based on the transmit power and the receive power at the receive end. Power consumption calibration is performed based on the power difference. A foreign object loss is obtained by using calibrated power consumption. A process of obtaining the foreign object loss is similar to the process described in Method Embodiment 4 of this application, and details are not described herein again. A difference between obtaining the foreign object loss in Method Embodiment 5 of this application and obtaining the foreign object loss in Method Embodiment 4 of this application lies in: performing the power consumption calibration by using the power difference between the transmit power and the receive power, and obtaining the foreign object loss by using the calibrated power consumption. The power consumption calibration performed based on the power difference is a relatively mature technology, and a power consumption calibration process is not described herein in detail.

In an embodiment of this application, this prevents all obtained Q values at the transmit end from being compared with a same Q value threshold. A Q value at the transmit end obtained when the foreign object does not exist between the transmit end and the receive end is used as a Q value threshold at the horizontal relative position and the vertical relative position. That is, different relative positions correspond to different Q value thresholds. The Q value threshold at the relative position is obtained based on the relative position, and the Q value at the transmit end is compared with the Q value threshold at the relative position. This improves the foreign object detection accuracy. When the foreign object is not detected through Q-value FOD, an alternating current impedance at the transmit end corresponding to the relative position is obtained based on the relative position, instead of a coil impedance at the transmit end. Different relative positions correspond to different alternating current impedances at the transmit end. An alternating current impedance with a relatively small error at the transmit end is used, to improve accuracy of obtaining a power loss at the transmit end, so that an error of an obtained foreign object loss is relatively small, and the foreign object detection accuracy is further improved.

The following describes Method Embodiment 6.

Method Embodiment 6

Figure 25:
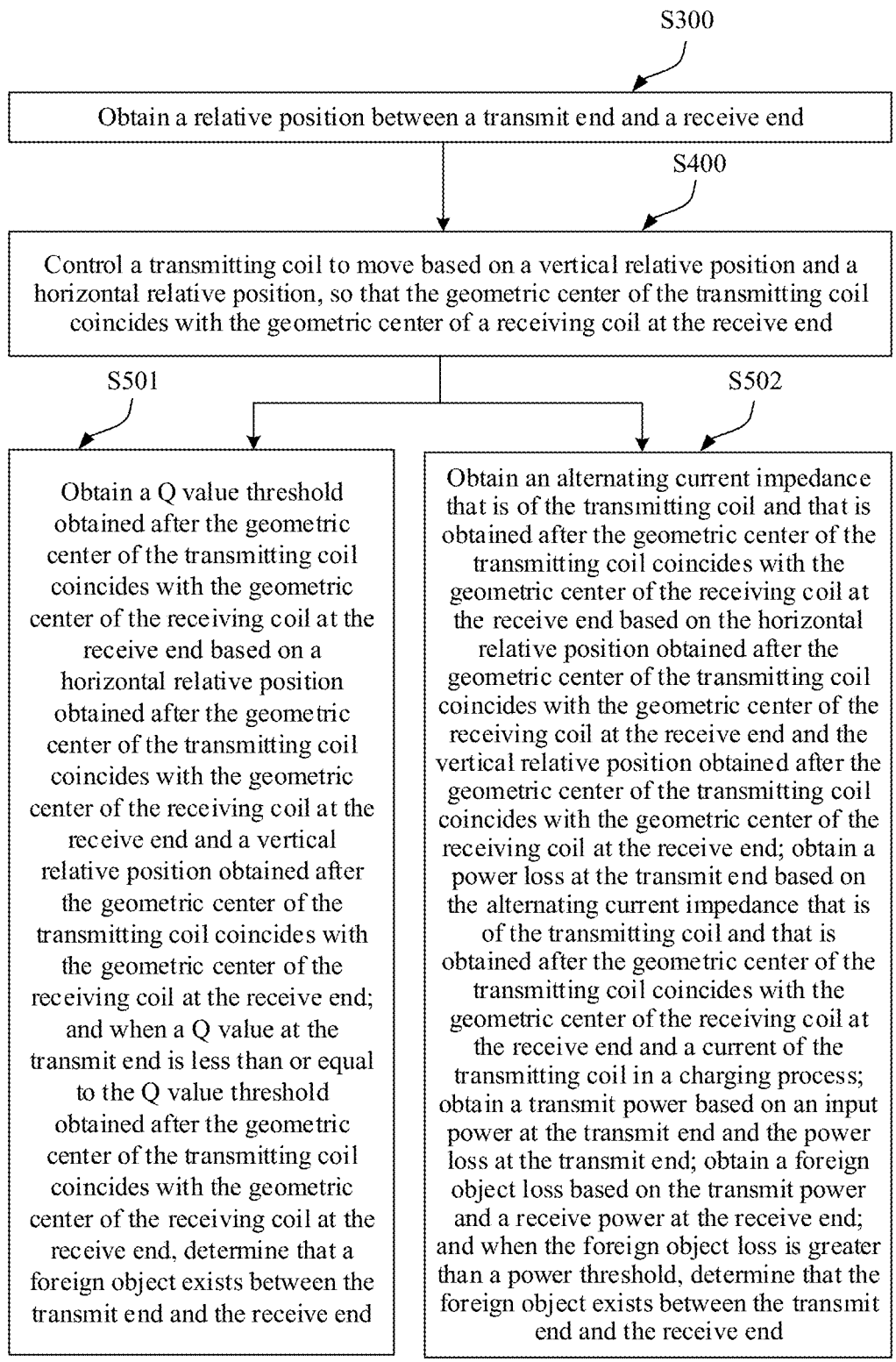
FIG. 25 is a flowchart of still another foreign object detection method according to an embodiment of this application.

FIG. 25 is a flowchart of still another foreign object detection method according to an embodiment of this application.

The foreign object detection method includes the following operations.

S300: Obtain the relative position between the transmit end and the receive end.

The relative position between the transmit end and the receive end includes the horizontal relative position and the vertical relative position. For the process of obtaining the relative position between the transmit end and the receive end, refer to Method Embodiment 1, 2, or 3 of this application. Details are not described herein again.

S400: Control the transmitting coil to move based on the vertical relative position and the horizontal relative position, so that the geometric center of the transmitting coil coincides with the geometric center of the receiving coil at the receive end.

After the relative position between the transmit end and the receive end is obtained, the transmitting coil is driven to move based on the vertical relative position and the horizontal relative position, to reduce a deviation of the relative position between the transmitting coil and the receiving coil, and enable the geometric center of the transmitting coil to coincide with the geometric center of the receiving coil as much as possible.

S501: Obtain a Q value threshold obtained after the geometric center of the transmitting coil coincides with the geometric center of the receiving coil at the receive end based on a horizontal relative position obtained after the geometric center of the transmitting coil coincides with the geometric center of the receiving coil at the receive end and a vertical relative position obtained after the geometric center of the transmitting coil coincides with the geometric center of the receiving coil at the receive end; and when the Q value at the transmit end is less than or equal to the Q value threshold obtained after the geometric center of the transmitting coil coincides with the geometric center of the receiving coil at the receive end, determine that the foreign object exists between the transmit end and the receive end.

For a process of obtaining the Q value threshold obtained after the geometric center of the transmitting coil coincides with the geometric center of the receiving coil at the receive end based on the horizontal relative position obtained after the geometric center of the transmitting coil coincides with the geometric center of the receiving coil at the receive end and the vertical relative position obtained after the geometric center of the transmitting coil coincides with the geometric center of the receiving coil at the receive end, and performing foreign object detection based on a value relationship between the Q value at the transmit end and the Q value threshold obtained after the geometric center of the transmitting coil coincides with the geometric center of the receiving coil at the receive end, refer to Apparatus Embodiment 4 of this application. Details are not described herein again.

S502: Obtain an alternating current impedance that is of the transmitting coil and that is obtained after the geometric center of the transmitting coil coincides with the geometric center of the receiving coil at the receive end based on the horizontal relative position obtained after the geometric center of the transmitting coil coincides with the geometric center of the receiving coil at the receive end and the vertical relative position obtained after the geometric center of the transmitting coil coincides with the geometric center of the receiving coil at the receive end; obtain a power loss at the transmit end based on the alternating current impedance that is of the transmitting coil and that is obtained after the geometric center of the transmitting coil coincides with the geometric center of the receiving coil at the receive end and a current of the transmitting coil in a charging process; obtain a transmit power based on an input power at the transmit end and the power loss at the transmit end; obtain a foreign object loss based on the transmit power and a receive power at the receive end; and when the foreign object loss is greater than a power threshold, determine that the foreign object exists between the transmit end and the receive end.

For a process of obtaining the alternating current impedance that is of the transmitting coil and that is obtained after the geometric center of the transmitting coil coincides with the geometric center of the receiving coil at the receive end based on the horizontal relative position obtained after the geometric center of the transmitting coil coincides with the geometric center of the receiving coil at the receive end and the vertical relative position obtained after the geometric center of the transmitting coil coincides with the geometric center of the receiving coil at the receive end, and performing the foreign object detection based on a value relationship between the foreign object loss indirectly obtained based on the alternating current impedance obtained after the geometric center of the transmitting coil coincides with the geometric center of the receiving coil at the receive end and the power threshold, refer to Apparatus Embodiment 4 of this application. Details are not described herein again.

S501 and S502 are two parallel operations, and either of the two operations may be selected to perform the foreign object detection, or both of the two operations may be selected to perform mutual verification foreign object detection.

In this embodiment of this application, after the relative position between the transmit end and the receive end is obtained, the transmitting coil may be driven based on the relative position to move, so that the geometric center of the transmitting coil coincides with the geometric center of the receiving coil. Therefore, a Q value threshold corresponding to each relative position, an alternating current impedance of the receiving coil, and an alternating current impedance of the transmitting coil do not need to be set based on the relative position. Foreign object detection may be performed based on a unified Q value threshold, the alternating current impedance of the receiving coil, and the alternating current impedance of the transmitting coil. This improves a capability and efficiency of foreign object detection.

In all of the foregoing embodiments, the process of performing foreign object detection before charging is described. In Method Embodiment 7 of this application, how to perform foreign object detection after the wireless charging apparatus enters a power transmission phase is described in detail below.

Method Embodiment 7

With reference to Method Embodiment 1 of this application, Method Embodiment 7 of this application provides yet another foreign object detection method.

Figure 26:
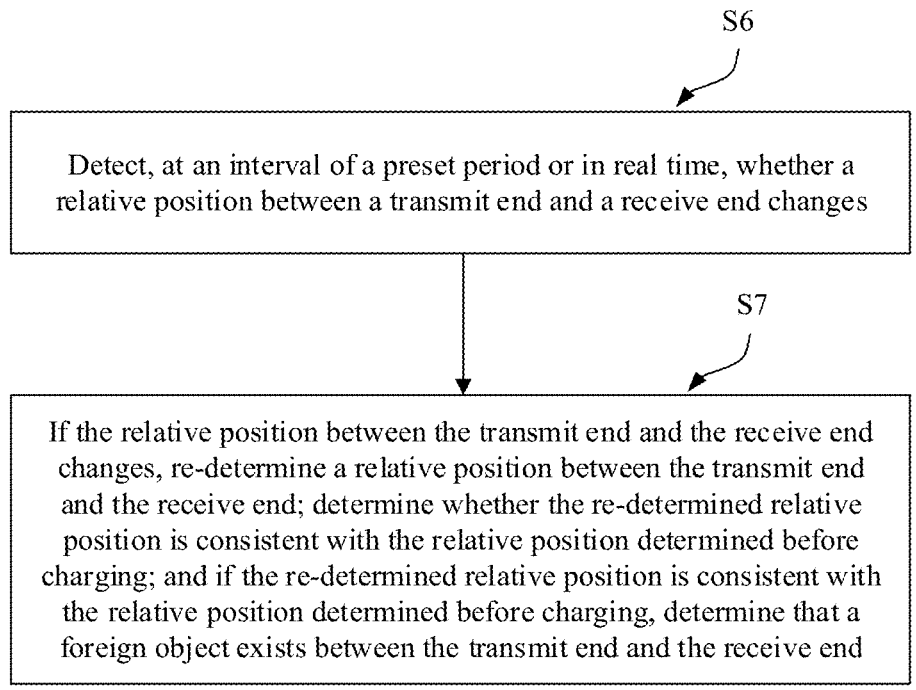
FIG. 26 is a flowchart of yet another foreign object detection method according to an embodiment of this application.

FIG. 26 is a flowchart of yet another foreign object detection method according to an embodiment of this application.

The foreign object detection method includes the following operations.

S6: Detect whether the relative position between the transmit end and the receive end changes at an interval of a preset period or in real time.

If the relative position between the transmit end and the receive end changes after the wireless charging apparatus enters the power transmission phase, an error in performing foreign object detection based on parameters such as an alternating current impedance of the transmitting coil and an alternating current impedance of the receiving coil at an original position is relatively large. A case that the foreign object is falsely reported or the foreign object exists but cannot be detected may occur.

Therefore, whether the relative position between the transmit end and the receive end change needs to be detected at the interval of the preset period or in real time.

For a process of detecting whether the relative position between the transmit end and the receive end changes, refer to Apparatus Embodiment 5, 7, or 9 of this application. Details are not described herein again.

S7: If the relative position between the transmit end and the receive end changes, re-determine a relative position between the transmit end and the receive end; determine whether the re-determined relative position is consistent with the relative position determined before charging; and if the re-determined relative position is consistent with the relative position determined before charging, determine that the foreign object exists between the transmit end and the receive end.

Because the parameters used to determine whether the relative position between the transmit end and the receive end changes are affected by the foreign object between the transmit end and the receive end. Therefore, the re-determined relative position is compared with the relative position determined before charging. If the re-determined relative position is consistent with the relative position determined before charging, it is determined that the foreign object exists between the transmit end and the receive end. If the re-determined relative position is inconsistent with the relative position determined before charging, foreign object detection is performed according to the process in Method Embodiment 4, 5, or 6 of this application.

For a process of re-obtaining the relative position between the transmit end and the receive end, refer to Method Embodiment 1, 2, or 3 of this application. Details are not described herein again.

In this embodiment of this application, after the wireless charging apparatus enters the power transmission phase, whether the relative position between the transmit end and the receive end changes is detected at the interval of the preset period or in real time, to avoid still using the parameters such as the alternating current impedance of the transmitting coil and the alternating current impedance of the receiving coil at the original position to perform foreign object detection when the relative position between the transmit end and the receive end changes in the power transmission phase, thereby avoiding the case in which the foreign object cannot be detected or foreign object detection accuracy is poor. The relative position between the transmit end and the receive end is re-detected, and whether the foreign object exists based on the re-detected relative position and the relative position determined before charging is determined. This effectively avoids the case in which foreign object detection cannot be performed after the wireless charging apparatus enters the power transmission phase, and further improves the foreign object detection capability and accuracy in the wireless charging process.

System Embodiment 1

System Embodiment 1 of this application provides a wireless charging system. The wireless charging system includes any wireless charging apparatus in Apparatus Embodiments 1 to 9.

Figure 27:
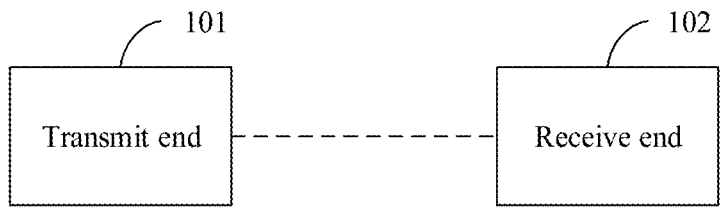
FIG. 27 is a schematic diagram of a wireless charging system according to an embodiment of this application.

FIG. 27 is a schematic diagram of the wireless charging system according to an embodiment of this application.

When the wireless charging apparatus includes a transmit end 101, the wireless charging system further includes a receive end 102.

In this case, a controller of the wireless charging apparatus is a transmit end controller, and a receive end controller may send a parameter obtained at the receive end 102 to the transmit end controller. For example, the receive end controller sends a direct current output voltage at the receive end 102 to the transmit end controller.

When the wireless charging apparatus includes a receive end 102, the wireless charging system further includes a transmit end 101.

In this case, a controller of the wireless charging apparatus is a receive end controller, and a transmit end controller may send a parameter obtained at the transmit end 101 to the receive end controller. For example, the transmit end controller sends a current of a transmitting coil to the receive end controller.

The transmit end 101 is configured to wirelessly charge the receive end 102.

In this embodiment, a self-inductance of the transmitting coil is more affected by a change in a vertical relative position between the transmit end and the receive end, and is less affected by a change in a horizontal relative position. Therefore, the controller may pre-obtain a correspondence between the self-inductance of the transmitting coil and the vertical relative position. With reference to the correspondence pre-obtained by the controller, the vertical relative position is obtained by using the self-inductance of the transmitting coil. At a same vertical relative position, there are a single change relationship between the current of the transmitting coil before charging and the horizontal relative position, a single change relationship between efficiency of the wireless charging system formed by the transmit end and the receive end and the horizontal relative position, and a single change relationship between the direct current output voltage at the receive end and the horizontal relative position. Therefore, the controller may pre-obtain the correspondence between the current of the transmitting coil before charging, the efficiency of the wireless charging system, or the direct current output voltage at the receive end and the horizontal relative position. With reference to the correspondence pre-obtained by the controller, the horizontal relative position is obtained by using the obtained current of the transmitting coil before charging, the obtained efficiency of the wireless charging system, or the obtained direct current output voltage at the receive end. After obtaining the vertical relative position and the horizontal relative position, the controller may obtain a relative position between the transmit end and the receive end, and further, the controller accurately determines, based on the relative position, whether a foreign object exists.

It should be understood that, in this application, "at least one (item)" means one or more, and "a plurality of" means two or more. The term "and/or" is used to describe an association relationship between associated objects, and indicates that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A wireless charging apparatus, comprising:
a transmit end or a receive end, wherein the transmit end comprises a transmit end resonant network and an inverter circuit, and the transmit end resonant network comprises a transmitting coil, wherein the receive end comprises a receive end resonant network and a rectifier circuit, and the receive end resonant network comprises a receiving coil; and
a controller configured to:
obtain a relative position between the transmit end and the receive end through three-dimensional (3D) positioning comprising a horizontal relative position and a vertical relative position based on a self-inductance of the transmitting coil and at least one parameter comprising one or more of a current of the transmitting coil, an efficiency of a wireless charging system formed by the transmit end and the receive end, or a direct current (DC) output voltage at the receive end;
obtain the vertical relative position based on the self-inductance of the transmitting coil and obtain the horizontal relative position based on the at least one parameter;
obtain a Q value at the transmit end;
obtain a corresponding Q value threshold based on the horizontal relative position and the vertical relative position;
when the Q value at the transmit end is less than or equal to the Q value threshold, determine that a foreign object exists between the transmit end and the receive end; and
when the Q value at the transmit end is greater than the Q value threshold:
obtain an AC impedance of the transmitting coil based on the horizontal relative position and the vertical relative position;
obtain a power loss at the transmit end based on the AC impedance of the transmitting coil and the current of the transmitting coil in a charging process;
obtain the transmit power based on an input power at the transmit end and the power loss at the transmit end;
obtain a receive power at the receive end;
obtain a power difference between the transmit power and the receive power;
perform a power consumption calibration based on the power difference;
obtain a foreign object loss using the calibrated power consumption; and
determine if a foreign object exists between the transmit end and the receive end based on whether the foreign object loss is greater than a power threshold.

2. The apparatus according to claim 1, wherein the controller is further configured to:
obtain a Q value at the transmit end; and
when the Q value at the transmit end is less than a minimum Q threshold, determine that the foreign object exists between the transmit end and the receive end, wherein the minimum Q threshold is obtained based on the Q value at the transmit end when the foreign object does not exist in a charging degree of a freedom range.

3. The apparatus according to claim 1, further comprising a driving apparatus, wherein the controller is further configured to:
control, based on the vertical relative position and the horizontal relative position, the driving apparatus to drive the transmitting coil to move, so that a first geometric center of the transmitting coil coincides with a second geometric center of the receiving coil at the receive end;
obtain a Q value threshold obtained after the first geometric center coincides with the second geometric center by using the horizontal relative position obtained after the first geometric center coincides with the second geometric center and the vertical relative position obtained after the first geometric center coincides with the second geometric center; and
determine that the foreign object exists between the transmit end and the receive end when a Q value at the transmit end is less than or equal to the Q value threshold obtained after the first geometric center coincides with the second geometric center.

4. The apparatus according to claim 1, wherein the controller is further configured to control the DC output voltage at the receive end to be fixed, to obtain the current of the transmitting coil in the at least one parameter, wherein the current of the transmitting coil is positively correlated with the horizontal relative position.

5. The apparatus according to claim 1, wherein the controller is further configured to control the DC output voltage at the receive end to be fixed, to obtain the efficiency of the wireless charging system in the at least one parameter, wherein the efficiency of the wireless charging system is negatively correlated with the horizontal relative position.

6. The apparatus according to claim 1, wherein the controller is further configured to control the current of the transmitting coil to be fixed, to obtain the DC output voltage at the receive end in the at least one parameter, wherein the DC output voltage at the receive end is negatively correlated with the horizontal relative position.

7. The apparatus according to claim 1, wherein the controller is further configured to obtain the self-inductance of the transmitting coil based on a resonance frequency of the transmit end resonant network and a resonance capacitance of the transmit end resonant network.

8. A position detection method, applied to a transmit end or a receive end of a wireless charging apparatus, wherein the transmit end comprises a transmit end resonant network and an inverter circuit, and the transmit end resonant network comprises a transmitting coil; the receive end comprises a receive end resonant network and a rectifier circuit, and the receive end resonant network comprises a receiving coil; and the method comprises:
   obtaining a relative position between the transmit end and the receive end through three-dimensional (3D) positioning comprising a horizontal relative position and a vertical relative position based on a self-inductance of the transmitting coil and at least one parameter comprising one or more of a current of the transmitting coil, efficiency of a wireless charging system formed by the transmit end and the receive end, and a direct current output voltage at the receive end;
   obtaining the vertical relative position based on the self-inductance of the transmitting coil and obtaining the horizontal relative position based on the at least one parameter;
   obtaining a Q value at the transmit end;
   obtaining a corresponding Q value threshold based on the horizontal relative position and the vertical relative position;
   when the Q value at the transmit end is less than or equal to the Q value threshold, determining that a foreign object exists between the transmit end and the receive end; and
   when the Q value at the transmit end is greater than the Q value threshold:
      obtaining an AC impedance of the transmitting coil based on the horizontal relative position and the vertical relative position;
      obtaining a power loss at the transmit end based on the AC impedance of the transmitting coil and the current of the transmitting coil in a charging process;
      obtaining the transmit power based on an input power at the transmit end and the power loss at the transmit end;
      obtaining a receive power at the receive end;
      obtaining a power difference between the transmit power and the receive power;
      performing a power consumption calibration based on the power difference;
      obtaining a foreign object loss using the calibrated power consumption; and
      determining if a foreign object exists between the transmit end and the receive end based on whether the foreign object loss is greater than a power threshold.

9. A wireless charging system, comprising:
   a wireless charging apparatus, wherein the wireless charging apparatus comprises:
      a transmit end or a receive end wherein the transmit end comprises a transmit end resonant network and an inverter circuit, and the transmit end resonant network comprises a transmitting coil, the receive end comprises a receive end resonant network and a rectifier circuit, and the receive end resonant network comprises a receiving coil;
   a controller configured to:
      obtain a relative position between the transmit end and the receive end through three-dimensional (3D) positioning comprising a horizontal relative position and a vertical relative position based on a self-inductance of the transmitting coil and at least one parameter comprising one or more of a current of the transmitting coil, efficiency of the wireless charging system formed by the transmit end and the receive end, and a direct current (DC) output voltage at the receive end, wherein the transmit end is configured to wirelessly charge the receive end;
      obtain the vertical relative position based on the self-inductance of the transmitting coil and obtain the horizontal relative position based on the at least one parameter;
      obtain a Q value at the transmit end;
      obtain a corresponding Q value threshold based on the horizontal relative position and the vertical relative position;
      when the Q value at the transmit end is less than or equal to the Q value threshold, determine that a foreign object exists between the transmit end and the receive end; and
      when the Q value at the transmit end is greater than the Q value threshold:
         obtain an AC impedance of the transmitting coil based on the horizontal relative position and the vertical relative position;
         obtain a power loss at the transmit end based on the AC impedance of the transmitting coil and the current of the transmitting coil in a charging process;
         obtain the transmit power based on an input power at the transmit end and the power loss at the transmit end;
         obtain a receive power at the receive end;
         obtain a power difference between the transmit power and the receive power;
         perform a power consumption calibration based on the power difference;
         obtain a foreign object loss using the calibrated power consumption; and
         determine if a foreign object exists between the transmit end and the receive end based on whether the foreign object loss is greater than a power threshold.

10. The wireless charging system according to claim 9, further comprising a driving apparatus, wherein the controller is further configured to:
   control, based on the vertical relative position and the horizontal relative position, the driving apparatus to drive the transmitting coil to move, so that a first geometric center of the transmitting coil coincides with a second geometric center of the receiving coil at the receive end;
   obtain a Q value threshold obtained after the first geometric center coincides with the second geometric center by using the horizontal relative position obtained after the first geometric center coincides with the second geometric center and the vertical relative position obtained after the first geometric center coincides with the second geometric center; and determine that the foreign object exists between the transmit end and the receive end when a Q value at the transmit end is less than or equal to the Q value threshold obtained after the first geometric center coincides with the second geometric center.

11. The wireless charging system according to claim 9, wherein the controller is further configured to control the DC output voltage at the receive end to be fixed, to obtain the current of the transmitting coil in the at least one parameter, wherein the current of the transmitting coil is positively correlated with the horizontal relative position.

12. The wireless charging system according to claim 9, wherein the controller is further configured to control the DC output voltage at the receive end to be fixed, to obtain the efficiency of the wireless charging system in the at least one parameter, wherein the efficiency of the wireless charging system is negatively correlated with the horizontal relative position.

* * * * *